United States Patent
Noh

(10) Patent No.: US 10,154,497 B2
(45) Date of Patent: Dec. 11, 2018

(54) TRANSMISSION OF UPLINK SOUNDING REFERENCE SIGNAL

(71) Applicant: KT CORPORATION, Gyeonggi-do (KR)

(72) Inventor: Min Seok Noh, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 392 days.

(21) Appl. No.: 13/913,648

(22) Filed: Jun. 10, 2013

(65) Prior Publication Data

US 2013/0329660 A1 Dec. 12, 2013

(30) Foreign Application Priority Data

Jun. 11, 2012 (KR) .................. 10-2012-0062278
Aug. 31, 2012 (KR) .................. 10-2012-0096443
Dec. 6, 2012 (KR) .................. 10-2012-0141262

(51) Int. Cl.
*H04W 72/04* (2009.01)
*H04L 5/00* (2006.01)
*H04L 27/26* (2006.01)
*H04W 72/12* (2009.01)

(52) U.S. Cl.
CPC ......... *H04W 72/048* (2013.01); *H04L 5/0035* (2013.01); *H04L 5/0048* (2013.01); *H04L 5/0053* (2013.01); *H04L 27/2613* (2013.01); *H04W 72/12* (2013.01)

(58) Field of Classification Search
CPC ..... H04L 5/001; H04L 5/0048; H04L 5/0053; H04L 5/0073; H04L 5/0091; H04L 5/0035; H04L 27/2613; H04W 48/12; H04W 48/16; H04W 72/12; H04W 72/048; H04W 74/085
See application file for complete search history.

(56) References Cited

U.S. PATENT DOCUMENTS

| | | | |
|---|---|---|---|
| 9,426,818 B2 | 8/2016 | Lee et al. | |
| 2011/0090862 A1 | 4/2011 | Liang et al. | |
| 2011/0098054 A1 | 4/2011 | Gorokhov et al. | |
| 2011/0249581 A1 | 10/2011 | Jen | |
| 2011/0249639 A1 | 10/2011 | Jen | |
| 2011/0249648 A1 | 10/2011 | Jen | |
| 2011/0294529 A1 | 12/2011 | Luo et al. | |
| 2011/0312316 A1* | 12/2011 | Baldemair | H04L 5/001 455/422.1 |

(Continued)

FOREIGN PATENT DOCUMENTS

JP 2013-236289 A 11/2013
KR 10-2011-0048421 A 5/2011

(Continued)

OTHER PUBLICATIONS

Korean Intellectual Property Office, International Search Report for International Application No. PCT/KR2013/005028, dated Sep. 24, 2013.

(Continued)

*Primary Examiner* — Michael Thier
*Assistant Examiner* — Prince A Mensah
(74) *Attorney, Agent, or Firm* — IP Legal Services, LLC

(57) ABSTRACT

The disclosure is related to transmission of a sounding reference signal (SRS) being independent of or separated from an uplink channel.

8 Claims, 38 Drawing Sheets

(56) References Cited

U.S. PATENT DOCUMENTS

| | | | |
|---|---|---|---|
| 2012/0051265 A1* | 3/2012 | Shen | H04L 5/0035 370/254 |
| 2012/0051319 A1* | 3/2012 | Kwon | H04W 72/0406 370/329 |
| 2012/0093119 A1* | 4/2012 | Kim | H04L 27/2613 370/329 |
| 2012/0113950 A1 | 5/2012 | Skov et al. | |
| 2012/0129561 A1 | 5/2012 | Peng et al. | |
| 2012/0140660 A1 | 6/2012 | Kang et al. | |
| 2012/0213190 A1 | 8/2012 | Yoon et al. | |
| 2012/0236741 A1* | 9/2012 | Xu | H04B 7/024 370/252 |
| 2012/0287799 A1 | 11/2012 | Chen et al. | |
| 2012/0300743 A1 | 11/2012 | Kim et al. | |
| 2013/0021986 A1 | 1/2013 | Bhattad et al. | |
| 2013/0077571 A1* | 3/2013 | Papasakellariou | H04W 52/325 370/328 |
| 2013/0078913 A1 | 3/2013 | Lee et al. | |
| 2013/0114523 A1* | 5/2013 | Chatterjee | H04J 11/0053 370/329 |
| 2013/0242895 A1* | 9/2013 | Chen | H04L 5/0051 370/329 |
| 2014/0376356 A1 | 12/2014 | Park et al. | |
| 2014/0376484 A1 | 12/2014 | Park et al. | |
| 2015/0023270 A1 | 1/2015 | Park et al. | |
| 2015/0029968 A1 | 1/2015 | Park et al. | |
| 2015/0029969 A1 | 1/2015 | Park et al. | |
| 2015/0036607 A1 | 2/2015 | Park et al. | |
| 2015/0085787 A1 | 3/2015 | Ouchi | |

FOREIGN PATENT DOCUMENTS

| | | | | |
|---|---|---|---|---|
| KR | 10-2012-0023794 A | 3/2012 | | |
| WO | 2010/147411 A2 | 12/2010 | | |
| WO | 2011/009486 A1 | 1/2011 | | |
| WO | 2011/099695 A2 | 8/2011 | | |
| WO | 2011/152685 A2 | 12/2011 | | |
| WO | 2012/036704 A1 | 3/2012 | | |
| WO | 2013/125845 A1 | 8/2013 | | |
| WO | WO 2013/125840 | * | 8/2013 | H04L 1/00 |

OTHER PUBLICATIONS

Korean Intellectual Property Office, Written Opinion of the International Searching Authority for International Application No. PCT/KR2013/005028, dated Sep. 24, 2013.
3GPP TR 36.819 V11.0.0, "3rd Generation Partnership Project; Technical Specification Group Radio Access Network; Coordinated multi-point operation for LTE physical layer aspects (Release 11)", Sep. 27, 2011, pp. 1-68, 3GPP, France.
Ericsson et al., "Potential Enhancements for SRS", R1-114255, 3GPP TSG RAN WG1 Meeting #66bis, San Francisco, USA, Nov. 14-18, 2011, pp. 1-7.
Intel Corporation, "CSI-RS configuration/reconfiguration in distributed RRH systems", R1-111593, 3GPP TSG RAN WG1 Meeting #65, Barcelona, Spain, May 9-13, 2011, pp. 1-3.
Qualcomm Incorporated, "On the standardization impact of UL CoMP operation", R1-113389, 3GPP TSG RAN WG1 Meeting #66bis, Zhuhai, China, Oct. 10-14, 2011, pp. 1-2.
European Patent Office, European Search Report of European Patent Application No. 13804562.0, dated Jan. 5, 2016.
3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.5.0, Mar. 2012, pp. 1-125.
3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, pp. 1-101.
KDDI, "SRS Enhancements for UL CoMP", R1-122533, 3GPP TSG RAN WG1 Meeting #69, Prague, Czech Republic, May 21-26, 2012, pp. 1-5.

* cited by examiner

TRANSMISSION OF UPLINK SOUNDING REFERENCE SIGNAL

CROSS REFERENCE TO PRIOR APPLICATIONS

The present application claims priority under 35 U.S.C. § 119 to Korean Patent Application No. 10-2012-0062278 (filed on Jun. 11, 2012), Korean Patent Application No. 10-2012-0096443 (filed on Aug. 31, 2012), and Korean Patent Application No. 10-2012-0141262 (filed on Dec. 6, 2012), which are hereby incorporated by reference in their entirety.

BACKGROUND

The present invention relates to a physical uplink channel, and particularly, to transmission of uplink sounding reference signal.

In a coordinated multi-point transmission/reception system (CoMP system), at least two of transmission and reception points cooperate with each other to transmit signals. Such a CoMP system measures an uplink channel state for uplink frequency-dependent schedule and measures an uplink/downlink channel for downlink beam-forming using channel reciprocity. In order to measure the uplink channel state and the uplink/downlink channel, transmission of a sounding reference signal (SRS) is required.

SUMMARY

In accordance with at least one embodiment, a method may be provided for transmitting an uplink sounding reference signal (SRS) in user equipment (UE). The method may include receiving UE-specific configuration information indicating an uplink reference signal identity from one transmission/reception point of a plurality of different transmission/reception points, wherein the uplink reference signal identity is independent of a physical cell identity of the one transmission/reception point and is associated with an uplink channel; transmitting the uplink channel to a transmission/reception point indicated by the uplink reference signal identity, using the uplink reference signal identity; generating a sounding reference signal (SRS) independent of the uplink channel, using the physical cell identity of the one transmission/reception point; and transmitting the generated SRS to the one transmission/reception point.

The SRS may include at least one of a periodic SRS and an aperiodic SRS. The generating an SRS may include generating both the periodic SRS and the aperiodic SRS using the physical cell identity of the one transmission/reception point. The transmitting the generated SRS may include transmitting one of the periodic SRS and the aperiodic SRS to the one transmission/reception point indicated by the physical cell identity.

The SRS may include at least one of a periodic SRS and an aperiodic SRS. The generating an SRS may include generating one of the periodic SRS and the aperiodic SRS using the physical cell identity of the one transmission/reception point, and the other SRS using the uplink reference signal identity. The transmitting the generated SRS may include transmitting one of the periodic SRS and the aperiodic SRS to the one transmission/reception point, and the other SRS to the transmission/reception point indicated by the uplink reference signal identity.

The uplink channel may be at least one of a physical uplink shared channel and a physical uplink control channel.

The receiving UE-specific configuration information may include receiving the UE-specific configuration information either through a UE-specific parameter, or dynamically through at least one of a physical downlink control channel (PDCCH) and an enhanced physical downlink control channel (EPDCCH).

In accordance with another embodiment, a method may be provided for transmitting an uplink sounding reference signal (SRS) in user equipment (UE). The method may include receiving UE-specific configuration information indicating a sounding reference signal (SRS) identity from one transmission/reception point of a plurality of different transmission/reception points, wherein the SRS identity is independently distinguished from an uplink reference signal identity for an uplink channel; generating an SRS using the SRS identity; and transmitting the generated SRS to a transmission/reception point indicated by the SRS identity.

The SRS may include at least one of a periodic SRS and an aperiodic SRS. The UE-specific configuration information indicating the SRS identity may indicate a same reference signal identity for each of the periodic SRS and the aperiodic SRS.

The SRS may include at least one of a periodic SRS and an aperiodic SRS. The UE-specific configuration information indicating the SRS identity may indicate a different reference signal identity for each of the periodic SRS and the aperiodic SRS.

The SRS may include at least one of a periodic SRS and an aperiodic SRS. The generating an SRS may include generating one of the periodic SRS and the aperiodic SRS using the SRS identity, and the other SRS using the physical cell identity of the one transmission/reception point. The transmitting the generated SRS may include transmitting one of the periodic SRS and the aperiodic SRS to the transmission/reception point indicated by the SRS identity, and the other SRS to the one transmission/reception point.

The uplink channel may be at least one of a physical uplink shared channel and a physical uplink control channel.

The receiving UE-specific configuration information may include receiving the UE-specific configuration information either through a UE-specific parameter, or dynamically through at least one of a physical downlink control channel (PDCCH) and an enhanced physical downlink control channel (EPDCCH).

In accordance with still another embodiment, user equipment may be provided. The user equipment may include a receiving unit configured to receive UE-specific configuration information indicating an uplink reference signal identity from one transmission/reception point of a plurality of different transmission/reception points, wherein the uplink reference signal identity is independent of a physical cell identity of the one transmission/reception point and is associated with an uplink channel; an uplink channel transmission unit configured to transmit the uplink channel to a transmission/reception point indicated by the uplink reference signal identity, using the uplink reference signal identity; an SRS generating unit configured to generate a sounding reference signal (SRS) being independent of the uplink channel, using a physical cell identity of the one transmission/reception point; and an SRS transmitting unit configured to transmit the generated SRS to the one transmission/reception point.

The SRS may include at least one of a periodic SRS and an aperiodic SRS. The SRS generating unit may be configured to generate both the periodic SRS and the aperiodic SRS using the physical cell identity of the one transmission/reception point. The SRS transmitting unit may be configured to transmit one of the periodic SRS and the aperiodic SRS to the one transmission/reception point indicated by the physical cell identity.

The SRS may include at least one of a periodic SRS and an aperiodic SRS. The SRS generating unit may be configured to generate one of the periodic SRS and the aperiodic SRS using the physical cell identity of the one transmission/reception point, and to generate the other SRS using the uplink reference signal identity. The SRS transmitting unit may be configured to transmit one of the periodic SRS and the aperiodic SRS to the one transmission/reception point, and to transmit the other SRS to the transmission/reception point indicated by the uplink reference signal identity.

The uplink channel may be at least one of a physical uplink shared channel and a physical uplink control channel.

The receiving unit may be configured to receive information for the UE-specific configuration information through a UE-specific parameter, or to dynamically receive through at least one of a physical downlink control channel (PDCCH) and an enhanced physical downlink control channel (EPDCCH).

In accordance with still another embodiment, user equipment may be provided. The user equipment may include a receiving unit configured to receive UE-specific configuration information indicating a sounding reference signal (SRS) identity from one transmission/reception point of a plurality of different transmission/reception points, wherein the SRS identity is independently distinguished from an uplink reference signal identity for an uplink channel; a control unit configured to generate an SRS using the uplink reference signal identity; and a transmitting unit configured to transmit the generated SRS to a transmission/reception point indicated by the SRS identity.

The SRS may include at least one of a periodic SRS and an aperiodic SRS. The UE-specific configuration information indicating the SRS identity may indicate a same reference signal identity for the periodic SRS and the aperiodic SRS.

The SRS may include at least one of a periodic SRS and an aperiodic SRS. The UE-specific configuration information indicating the SRS identity may indicate a different reference signal identity for the periodic SRS and the aperiodic SRS.

The SRS may include at least one of a periodic SRS and an aperiodic SRS. The control unit may be configured to generate one of the periodic SRS and the aperiodic SRS using the SRS identity, and to generate the other SRS using the physical cell identity of the one transmission/reception point. The transmitting unit may be configured to transmit one of the periodic SRS and the aperiodic SRS to the transmission/reception point indicated by the SRS identity, and to transmit the other SRS to the one transmission/reception point.

The uplink channel may be at least one of a physical uplink shared channel and a physical uplink control channel.

The receiving unit may be configured to receive information for the UE-specific configuration information through a UE-specific parameter, or to dynamically receive through at least one of a physical downlink control channel (PDCCH) and an enhanced physical downlink control channel (EPDCCH).

In accordance with still another embodiment, a method may be provided for transmitting an uplink reference signal in user equipment (UE). The method may include receiving UE-specific configuration information indicating an uplink reference signal identity from one transmission/reception point of a plurality of different transmission/reception points, wherein the uplink reference signal identity is independent of a physical cell identity of the one transmission/reception point; generating an uplink reference signal associated with an uplink channel, using the uplink reference signal identity; and transmitting the generated uplink reference signal to a transmission/reception point indicated by the uplink reference signal identity.

The uplink channel may be at least one of a physical uplink shared channel and a physical uplink control channel.

The uplink reference signal identity may be a reference signal identity of an uplink demodulation reference signal, and the uplink reference signal may be the uplink demodulation reference signal.

the transmission/reception point indicated by the uplink reference signal identity may be a transmission/reception point different from the one transmission/reception point.

In accordance with still another embodiment, user equipment may be provided. The user equipment may include a receiving unit configured to receive UE-specific configuration information indicating an uplink reference signal identity from one transmission/reception point of a plurality of different transmission/reception points, wherein the uplink reference signal identity is independent of a physical cell identity of the one transmission/reception point; a control unit configured to generate an uplink reference signal associated with an uplink channel, using the uplink reference signal identity; and a transmitting unit configured to transmit the generated uplink reference signal and the uplink channel to a transmission/reception point indicated by the uplink reference signal identity.

The uplink channel may be at least one of a physical uplink shared channel and a physical uplink control channel.

The uplink reference signal identity may be a reference signal identity of an uplink demodulation reference signal, and the uplink reference signal may be the uplink demodulation reference signal.

The transmission/reception point indicated by the uplink reference signal identity may be a transmission/reception point different from the one transmission/reception point.

DETAILED DESCRIPTION OF EMBODIMENTS

Figure 1:
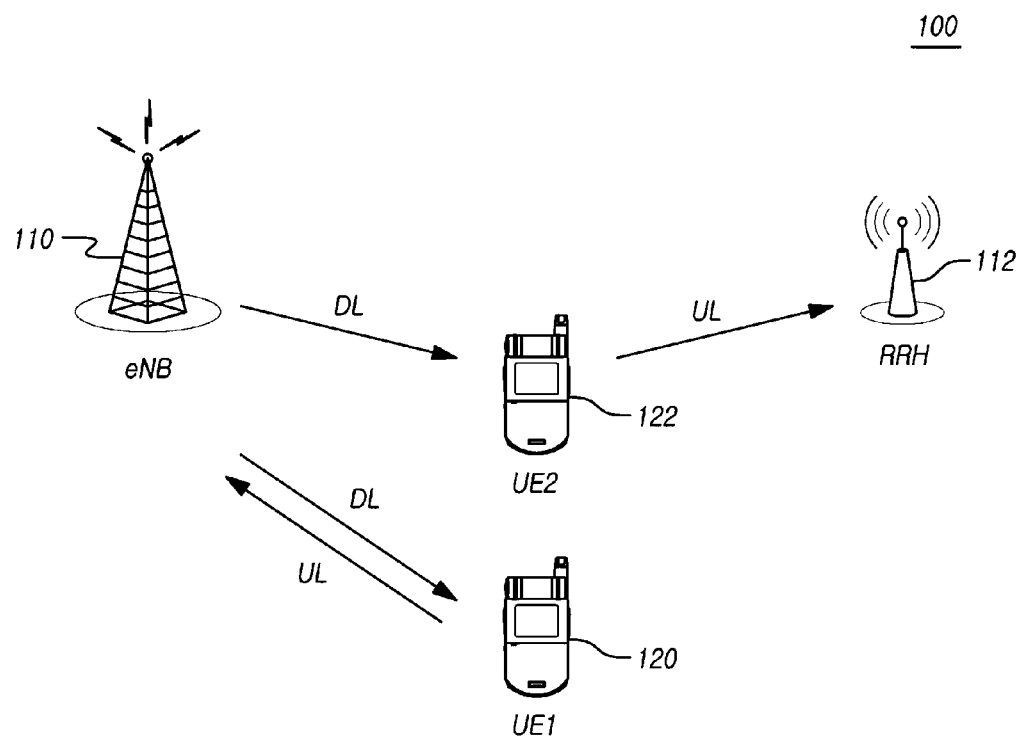
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present invention, a detailed description of known functions and configurations incorporated herein will be omitted when it may make the subject matter of the present invention rather unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in a wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point generally may indicate a station communicating with the user equipment. However, the transmission/reception point may be referred to as different terms such as a base station (BS), a cell, a Node-B, an evolved Node-B (eNB), a sector, a site, a base transceiver system (BTS), an access point (AP), a relay node (RN), a remote radio head (RRH), a radio unit (RU), an antenna, and the like.

That is, in the present description, the transmission/reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present invention, and may not be limited to a specific term or word. Herein, an uplink (UL) transmission/reception is a scheme in which data is transmitted from user equipment to a base station. Unlike this, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present invention should not be construed as being limited to or restricted by a particular wireless communication field, and should be construed as including all technical fields to which the spirit of the present invention can be applied.

In case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

In the description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of eNB 110 and RRH 112. Herein, eNB 110 may be a base station or a macrocell (or macronode). RRH 112 may be at least one picocell which is wiredly controlled by coupling to eNB 110 through an optical cable or an optical fiber. Furthermore, RRH 112 may have either a high transmission power, or a low transmission power within a macrocell region. Transmission/reception points eNB 110 and RRH 112 may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to as the expression of "transmit or receive PUCCH, PUSCH, PDCCH, and/or PDSCH."

eNB 110 corresponding to one of transmission/reception points (e.g., 110, 112) may perform a downlink transmission to user equipment 120 and 122. eNB 110 may transmit PDSCH corresponding to a primary physical channel, for unicast transmission. Furthermore, eNB 110 may transmit PDCCH in order to transmit downlink control information, such as scheduling information required for receiving PDSCH, and to transmit scheduling grant information for an uplink shared channel (e.g., PUSCH) transmission. Hereinafter, "transmit or receive a signal through a channel" may be referred to as the expression of "transmit or receive a channel."

UE 1 (120) may transmit an uplink signal to eNB 110. UE 2 (122) may transmit an uplink signal to RRH 112 corresponding to one of transmission/reception points 110 and 112. Alternatively, UE 1 (120) may transmit an uplink signal to RRH 112, and UE 2 (122) may transmit an uplink signal to eNB 110. The number of user equipment may be "2" or more. In the following embodiments, descriptions will be given under the assumption that one of two user equipment transmits an uplink signal to eNB 110, and the other transmits an uplink signal to RRH 112, though the present invention is not so limited.

Meanwhile, in LTE communication systems corresponding to wireless communication systems, a demodulation reference signal (DMRS or DM-RS) and an SRS may be defined for an uplink. Three types of reference signals (RSs) may be defined for a downlink. Herein, the three types of the reference signals (RSs) may include a cell-specific reference signal (CRS), a multicast/broadcast over single frequency network reference signal (MBSFN-RS), and a UE-specific reference signal.

In a wireless communication system, when performing an uplink transmission, user equipment may transmit an uplink demodulation reference signal (UL DMRS or UL DM-RS) per slot such that channel information for demodulation of data channels is recognized. In case of an uplink DM-RS associated with PUSCH, user equipment may transmit a reference signal through one symbol per slot. In case of an uplink DM-RS associated with PUCCH, user equipment may transmit reference signals through a different number of symbols according to PUCCH formats. For example, in case of PUCH formats 1, 1a, and 1b, a reference signal may be transmitted through three symbols per slot. In case of PUCCH formats 2, 2a, 2b, and 3, a reference signal may be transmitted through two symbols per slot.

Figure 2:
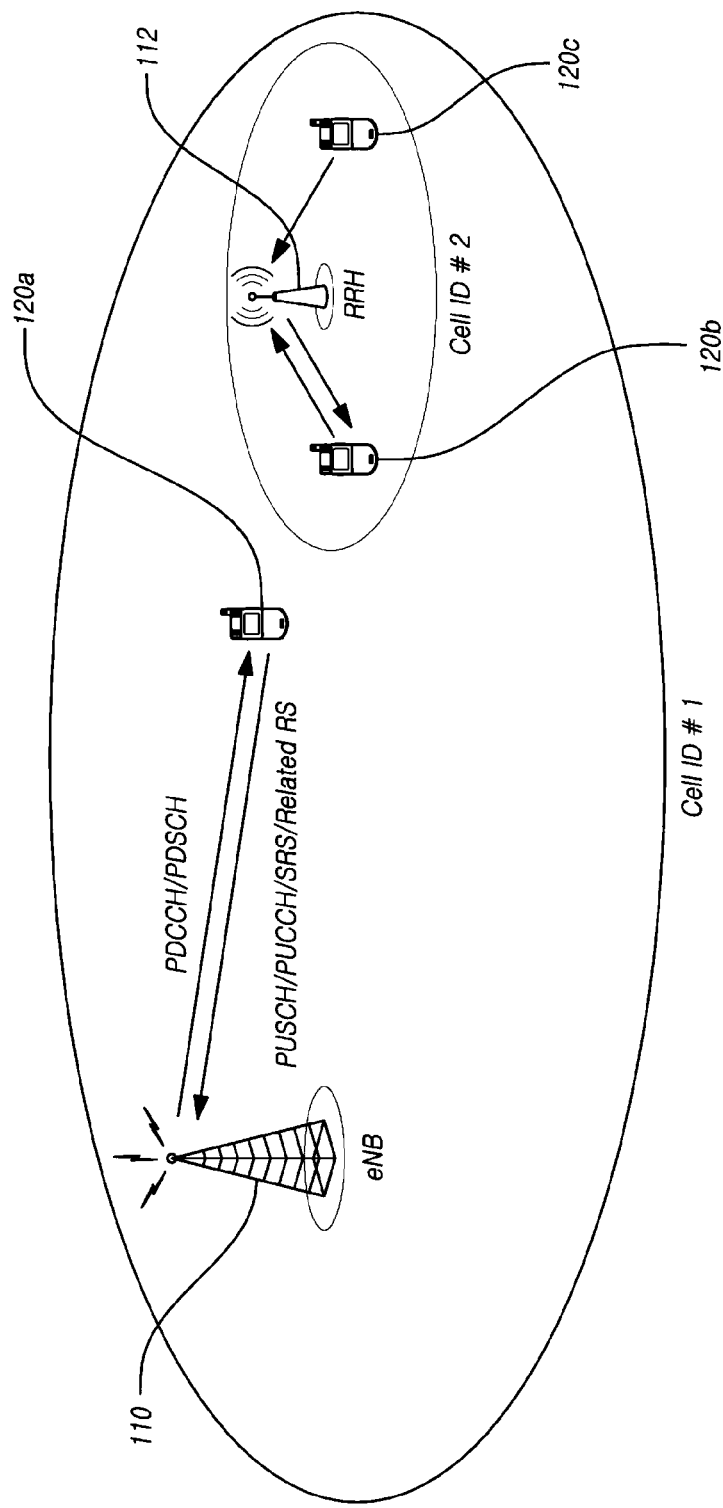
FIG. 2 illustrates a typical method of performing uplink/downlink data transmission in a CoMP scenario environment and/or a heterogeneous network environment in which transmission/reception points use different cell identities.

FIG. 2 illustrates a typical method of performing uplink/downlink data transmissions in a CoMP scenario environment and/or a heterogeneous network environment in which transmission/reception points use different cell identities.

Referring to FIG. 2, wireless communication system 100 to which at least one embodiment is applied may be a CoMP system implementing a CoMP scenario or a heterogeneous network in which eNB110 and RRH 112 have different cell identities.

Figure 3:
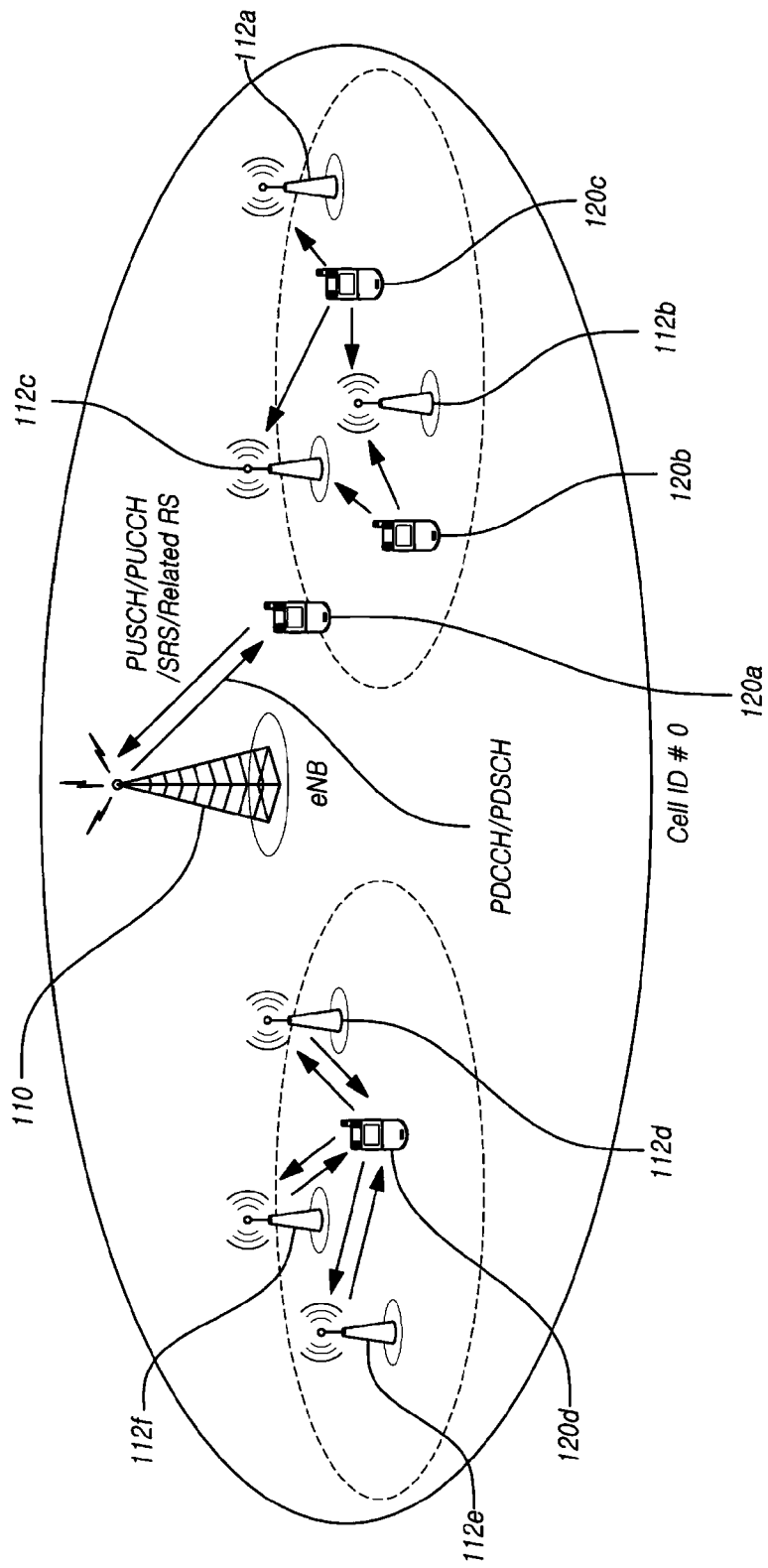
FIG. 3 illustrates a method of performing uplink/downlink data transmissions in a CoMP scenario environment in which transmission/reception points use the same cell identity.

FIG. 3 illustrates a method of performing uplink/downlink data transmissions in a CoMP scenario environment in which transmission/reception points use the same cell identity.

Referring to FIG. 3, wireless communication system 100 to which at least one embodiment is applied may be a CoMP system implementing a CoMP scenario in which eNB 110 and RRHs 112a through 112f have the same cell identity.

In the CoMP system shown in FIG. 2 and FIG. 3, in case of DM-RS for PUSCH data demodulation, user equipment may receive parameters for generation of reference signals, from a corresponding transmission/reception point to which the user equipment belongs. Herein, the parameter for reference signal generation may include information on at least one of a sequence group number, a base sequence number, a cyclic shift index, and an orthogonal cover code (OCC) index. The reference signals transmitted by user equipment in wireless communication system 100 may be generated based on the parameters for reference signal generation. The corresponding transmission/reception point may be eNB 110 corresponding to a serving transmission/reception point. Meanwhile, in the case of illustrating a plurality of user equipment in figures, each user equipment may be classified by reference numerals 120a, 120b, 120c, or the like. In the case of illustrating one user equipment in figures, the one user equipment may be denoted by reference numeral 120.

In a certain operation ("operation 1"), eNB 110 may inform user equipment of a corresponding cell identity such that eNB 110 can be identified, and inform the user equipment of a sequence group number and a base sequence number, according to the configuration of sequence-group hopping and sequence hopping determined through radio resource control (RRC). Furthermore, in another operation ("operation 2"), eNB 110 may inform user equipment of PDCCH for an uplink grant, transmitted through a downlink. For example, eNB 110 may inform user equipment of a cyclic shift index and an OCC index for generation of a reference signal to be transmitted by user equipment 120a, through downlink control information (DCI) format 0 and DCI format 4. User equipment may generate an uplink DM-RS, and transmit the generated uplink DM-RS and PUSCH to eNB 110, through the operation 1 and the operation 2.

In the case of an uplink SRS, a certain transmission/reception point or a certain cell in wireless communication system 100 may transmit parameters for SRS generation (i.e., parameters for generation of the SRS transmitted by user equipment) to the user equipment. Herein, the parameters for SRS generation may include a cell-specific SRS bandwidth, a transmission comb, a UE-specific SRS bandwidth, hopping related configuration parameters, a frequency domain position, a periodicity, a subframe configuration (designating which subframe will transmit an SRS), an antenna configuration (designating the number of antennas transmitting an SRS and the number of antenna ports), a base sequence index, a cyclic shift index (i.e., a reference signal to be used for SRS generation), and so forth. Herein, transmission comb may designate frequency positions assigned at intervals of two types of subcarrier spacing. For example, "0" may denote even subcarriers and "1" denote odd subcarriers. The base sequence index may be an SRS sequence index for generating a corresponding SRS. The SRS sequence index may be determined, based on sequence group number u used in PUCCH and base sequence number v defined according to a sequence hopping configuration used for PUSCH. More specifically, a corresponding transmission/reception point (e.g., eNB 110) may transmit the parameters for SRS generation, as RRC parameters, to user equipment 120a. User equipment 120a may receive the parameters for SRS generation from eNB 110, and transmit an uplink SRS to eNB 110.

Furthermore, an aperiodic SRS may be defined along with a periodic SRS. In case of the aperiodic SRS, like a case of the periodic SRS, parameters to be used for generation of the aperiodic SRS may be transmitted, as RRC parameters, to user equipment 120a by a certain transmission/reception point. Herein, the parameters for generation of the aperiodic SRS may include a UE-specific SRS bandwidth of aperiodic SRS, a transmission comb, a frequency domain position, a periodicity, a subframe configuration, an antenna configuration, a base sequence index, a cyclic shift index, and so forth, as defined in wireless communication system 100.

In addition, a certain transmission/reception point may dynamically trigger user equipment 120a through PDCCH such that user equipment 120a can transmit a periodic SRS. When receiving a triggering signal through the PDCCH and RRC parameters, user equipment 120a may transmit an uplink aperiodic SRS.

According to the above-described uplink/downlink data transmission method, when user equipment 120a belonging to a certain transmission/reception point transmits a reference signal, only the certain transmission/reception point may receive the reference signal. Other transmission/reception points may not receive the reference signal because other transmission/reception points cannot know information for generation of the reference signal. Herein, the expression "receive the reference signal" may mean that the reference signal is received not as interference but as a desired signal. That is, the expression may mean that the reference signal is received to meet a purpose of the reference signal transmitted by user equipment.

When receiving parameters from a certain transmission/reception point, user equipment may generate reference signals, such as an uplink DM-RS and/or periodic/aperiodic SRSs, based on the received parameters. Accordingly, user equipment may perform an uplink transmission only through an uplink associated with a downlink of the certain transmission/reception point to which the user equipment belongs. In other words, user equipment may not perform an uplink transmission through an uplink not being associated with the downlink of the certain transmission/reception point to which the user equipment belongs.

Typically, user equipment 120a belonging to the certain transmission/reception point (i.e., user equipment 120a receiving a downlink control channel from the certain transmission/reception point) may not perform an uplink transmission to a different transmission/reception point (i.e., a transmission/reception point different from the certain transmission/reception point). Herein, the different transmission/reception point may provide an uplink channel having a comparatively better uplink channel quality and/or a comparatively better geometry.

Meanwhile, in at least one embodiment, a method may be provided for supporting an uplink transmission to a different transmission/reception point. More specifically, according to the method, user equipment 120a belonging to a certain transmission/reception point (i.e., user equipment 120a receiving a downlink control channel from the certain transmission/reception point) may perform an uplink transmission to a different transmission/reception point which provides an uplink channel having a comparatively better channel quality and/or a comparatively higher geometry. Furthermore, in at least one embodiment, a method and an apparatus may be provided for differentiating channels transmitted to different transmission/reception points.

Furthermore, in at least one embodiment, a method and an apparatus may be provided for differentiating between an uplink channel (e.g., PUSCH, PUCCH, SRS, and/or an uplink related RS) which user equipment transmits to a corresponding transmission/reception (i.e., a corresponding transmission/reception to which the user equipment belongs) and an uplink channel which the user equipment transmits to a transmission/reception points other than the corresponding transmission/reception. Herein, such channel differentiation may be differentiation between the same type channels such as between SRSs, between PUSCHs, between PUCCHs, between related RSs, and so forth. Such channel differentiation may be differentiation between different type channels such as between SRS and PUSCH, between PUCCH and PUSCH, between PUCCH and SRS, and so forth. For example, a sequence group number and a base sequence number used for periodic and aperiodic SRSs may be defined from a sequence group number u and a base sequence number v, respectively. Herein, the sequence group number u may be used for PUCCH. The base sequence number v may be defined in sequence hopping used for PUSCH. In at least one embodiment, a method and an apparatus may be provided for differently defining the sequence group number u and the base sequence number v used for periodic and aperiodic SRSs.

Hereinafter, the present invention will be described through the following two embodiments: i) Embodiment 1 determines a receiving subject (i.e., a target transmission/reception point) of an SRS independently from receiving subjects of PUCCH and/or PUSCH by generating an SRS sequence independently from the PUCCH, a reference signal sequence associated with the PUCCH, the PUSCH, and a reference signal sequence associated with the PUSCH; and ii) Embodiment 2 transmits an SRS without association with PUCCH and PUSCH, to a serving transmission/reception point.

Embodiment 1: Independent Configuration

In the case of transmitting a periodic SRS or an aperiodic SRS according to Embodiment 1, a sequence group number and a base sequence number for SRS generation may be independently generated, without deriving from PUCCH sequence group number or PUSCH base sequence number based on a cell identity of a serving cell. In order to generate an independent sequence from PUCCH/PUSCH sequences, a sequence group number and a base sequence number for SRS generation may be further included in RRC configuration parameters. Alternatively, in the case that a certain parameter is predefined through PDCCH transmitted dynamically or through RRC parameters, a sequence group number and a base sequence number for SRS generation may be dynamically indicated by transmitting the predefined parameter through PDCCH or EPDCCH.

Figure 4:
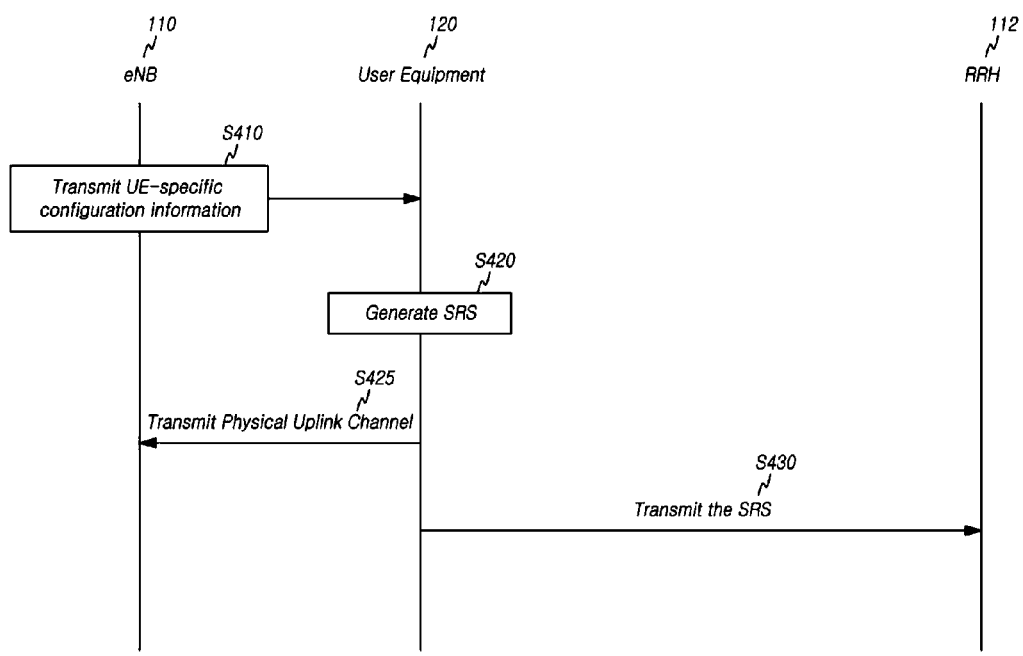
FIG. 4 is a flowchart illustrating a method of transmitting a sounding reference signal (SRS) in accordance with a first embodiment.

FIG. 4 is a flowchart illustrating a method of transmitting an SRS in accordance with Embodiment 1 of the present invention.

Referring to FIG. 4, in an SRS transmission method according to Embodiment 1, user equipment 120 may receive UE-specific configuration information indicating an SRS identity from one transmission/reception point (e.g., eNB110) of a plurality of different transmission/reception points at step S410. Herein, the SRS identity is independently determined to be distinguished from an uplink reference signal identity for an uplink channel. At step S420, user equipment 120 may generate an SRS using the independently determined SRS identity. At step S425, user equipment 120 may perform a physical uplink channel transmission to eNB110. Meanwhile, at step S430, user equipment 120 may transmit the generated SRS to a transmission/reception point (e.g., RRH 112) indicated by the independently determined SRS identity.

According to the SRS transmission method as shown in FIG. 4, an uplink reference signal identity for an uplink channel and an SRS identity may be independently determined. Accordingly, a receiving subject (e.g., eNB 110) of the uplink channel and a receiving subject (e.g., RRH 112) of the SRS may be different.

In the present description, the expressions "independent," and "independently" may mean that an SRS identity is separately defined without association with other uplink reference signal identities and/or a physical cell identity of a serving transmission/reception point serving user equipment. Accordingly, the SRS identity may be the same as or different from the other uplink reference signal identities and/or the physical cell identity of the serving transmission/reception point.

That is, in the present description, the expression "an SRS is transmitted independently from an uplink channel" may mean that receiving subjects are independently determined. However, such expression may not mean that transmission timings should be different each other. Accordingly, in an SRS transmission method in accordance with at least one embodiment, an SRS may be independently transmitted when other channel transmissions are not performed. Alternatively, an SRS and at least a portion of an uplink channel (i.e., all or a portion of an uplink channel) may be simultaneously transmitted in one subframe.

In an SRS transmission method in accordance with at least one embodiment, an uplink channel may correspond to at least one of PUSCH and PUCCH. An SRS may be at least one of a periodic SRS and an aperiodic SRS.

Hereinafter, a variety of cases of transmitting an SRS according to Embodiment 1 illustrated in FIG. 4 will be described with reference to FIG. 5 to FIG. 10.

Figure 5:
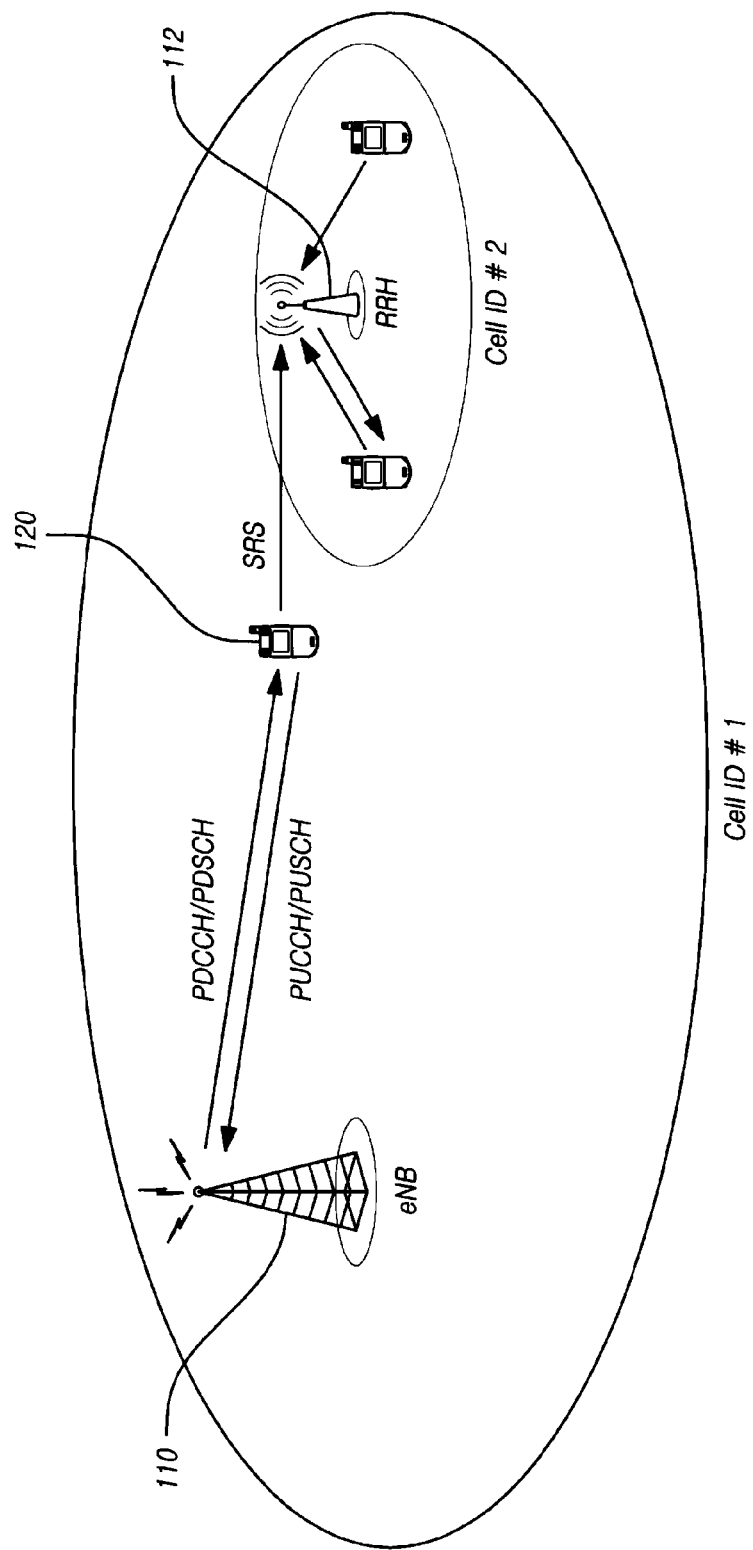
FIG. 5 illustrates independently transmitting a physical uplink channel and an SRS in a CoMP environment in which transmission/reception points use different cell identities (e.g., cell ID #1 and cell ID #2)

FIG. 5 illustrates independently transmitting a physical uplink channel and an SRS in a CoMP environment in which transmission/reception points use different cell identities (e.g., cell ID #1 and cell ID #2).

Figure 6:
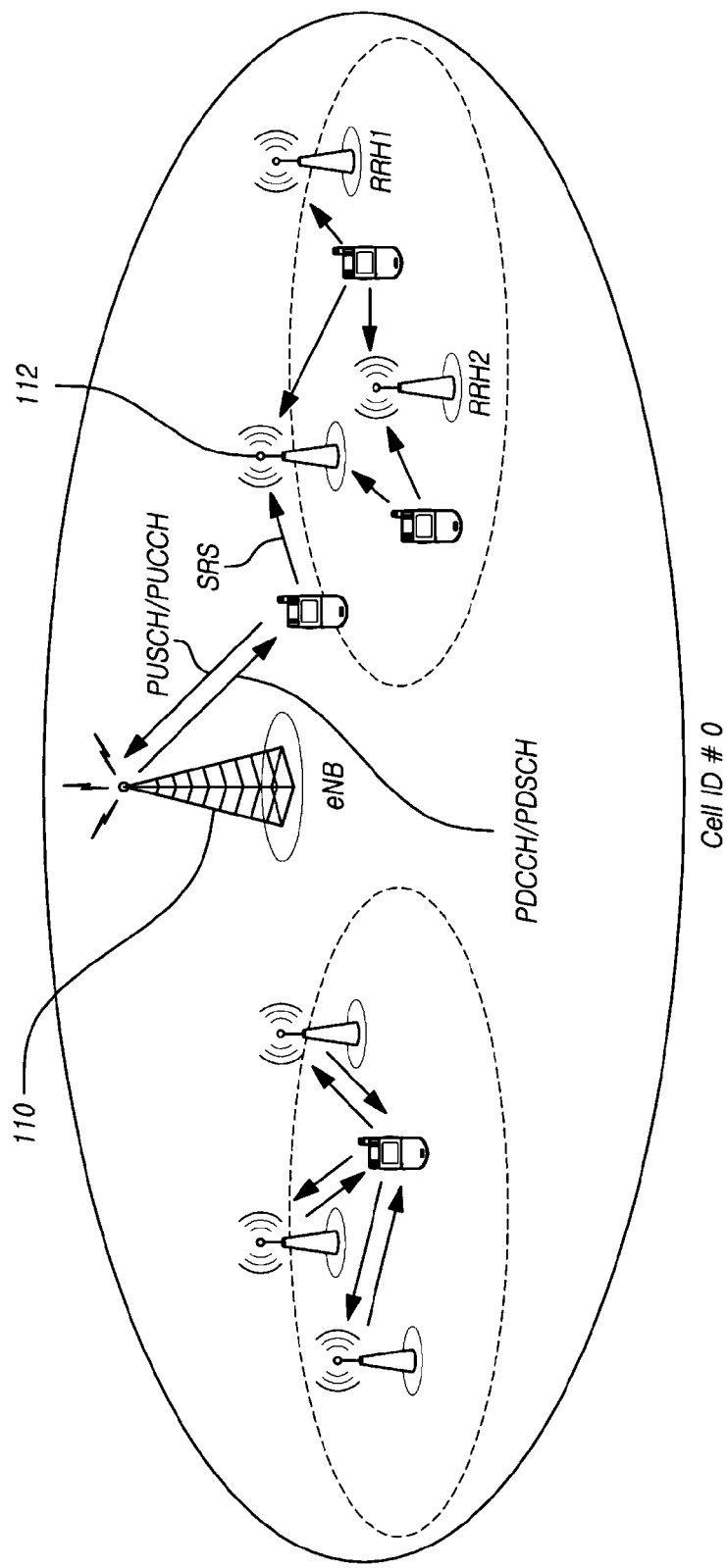
FIG. 6 illustrates independently transmitting a physical uplink channel and an SRS in a CoMP environment in which transmission/reception points use the same cell identity (e.g., cell ID #0)

FIG. 6 illustrates independently transmitting a physical uplink channel and an SRS in a CoMP environment in which transmission/reception points use the same cell identity (e.g., cell ID #0).

Referring to FIG. 5 and FIG. 6, a receiving subject of a physical uplink channel and a receiving subject of an SRS may be independently determined since an identity for SRS generation is determined independently from an identity for a physical uplink reference signal. Accordingly, even though it is not shown in figures, the physical uplink channel and the SRS may be transmitted to different receiving subjects or the same receiving subject. In this case, it may be necessary to independently determine each receiving subject of the physical uplink channel and the SRS.

According to an SRS transmission method as shown in FIG. 5 and FIG. 6, an SRS sequence may be determined independently from DM-RS associated with PUCCH and/or PUSCH. Accordingly, a TDD system may independently measure a downlink channel quality of a serving transmission/reception point and a downlink channel quality of a different transmission/reception point (i.e., a transmission/reception point different from the serving transmission/reception point). Herein, the TDD system may use an uplink channel quality measurement and a channel reciprocity for the serving transmission/reception point and the different transmission/reception point. Furthermore, the SRS transmission method may allow for recognition of a location or a geometry of user equipment, using an SRS. Accordingly, in the case that user equipment is located on edge of a cell or at the center of the cell, improvement of data throughput in a downlink by using a UE-specific downlink transmission method may be possible.

In embodiments shown in FIG. 5 and FIG. 6, receiving subjects of a periodic SRS and an aperiodic SRS may be the same. That is, a UE-specific parameter indicating an SRS identity may indicate the same reference signal identity for the periodic SRS and the aperiodic SRS.

Unlike the embodiment shown in FIG. 5 and FIG. 6, SRS identities for generating a periodic SRS and an aperiodic SRS may be independent each other.

Figure 7:
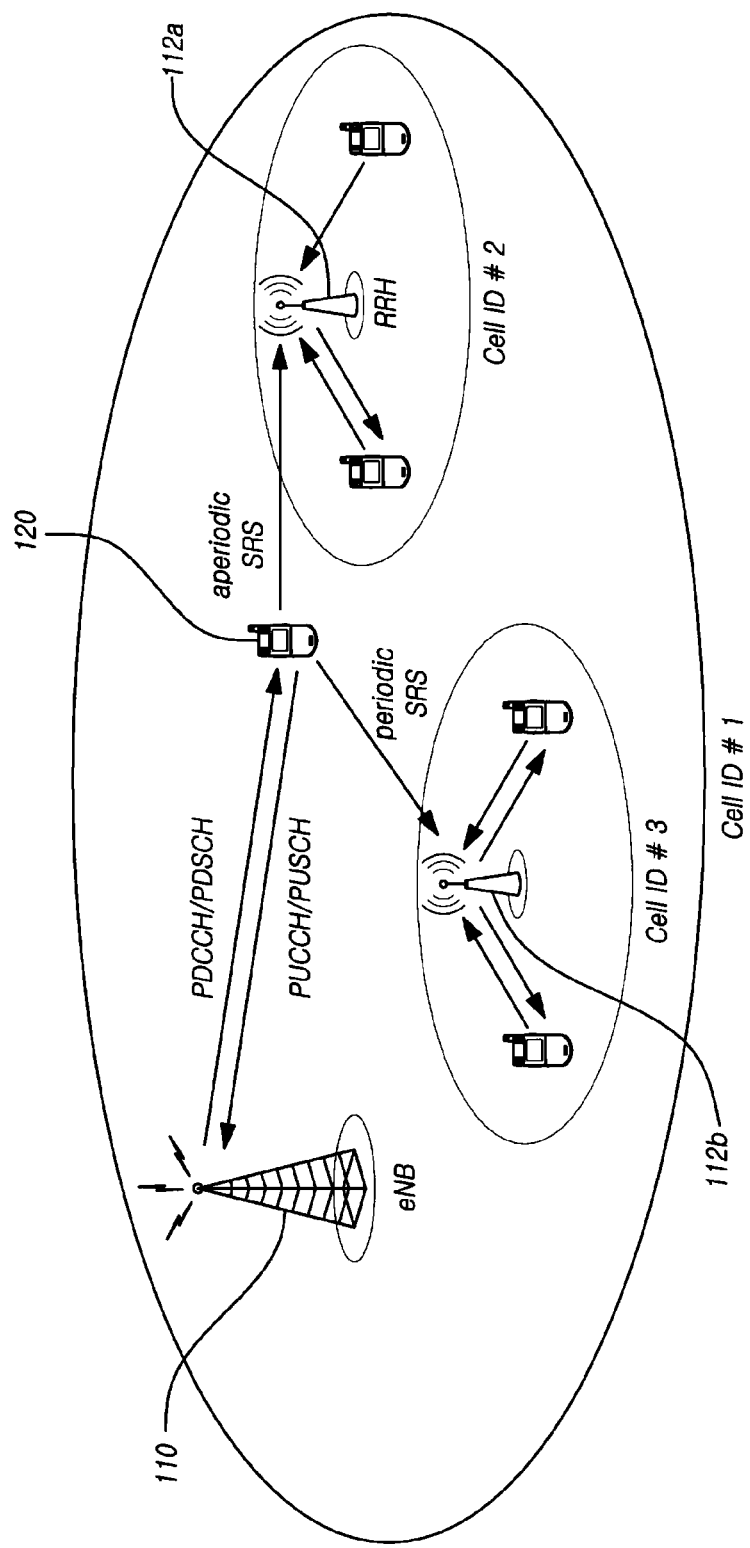
FIG. 7 illustrates independently transmitting not only a physical uplink channel and an SRS but also a periodic SRS and an aperiodic SRS in a CoMP environment in which transmission/reception points use different cell identities (e.g., cell ID #1, cell ID #2, and cell ID #3)

FIG. 7 illustrates independently transmitting not only a physical uplink channel and an SRS but also a periodic SRS and an aperiodic SRS, in a CoMP environment in which transmission/reception points use different cell identities (e.g., cell ID #1, cell ID #2, and cell ID #3).

Figure 8:
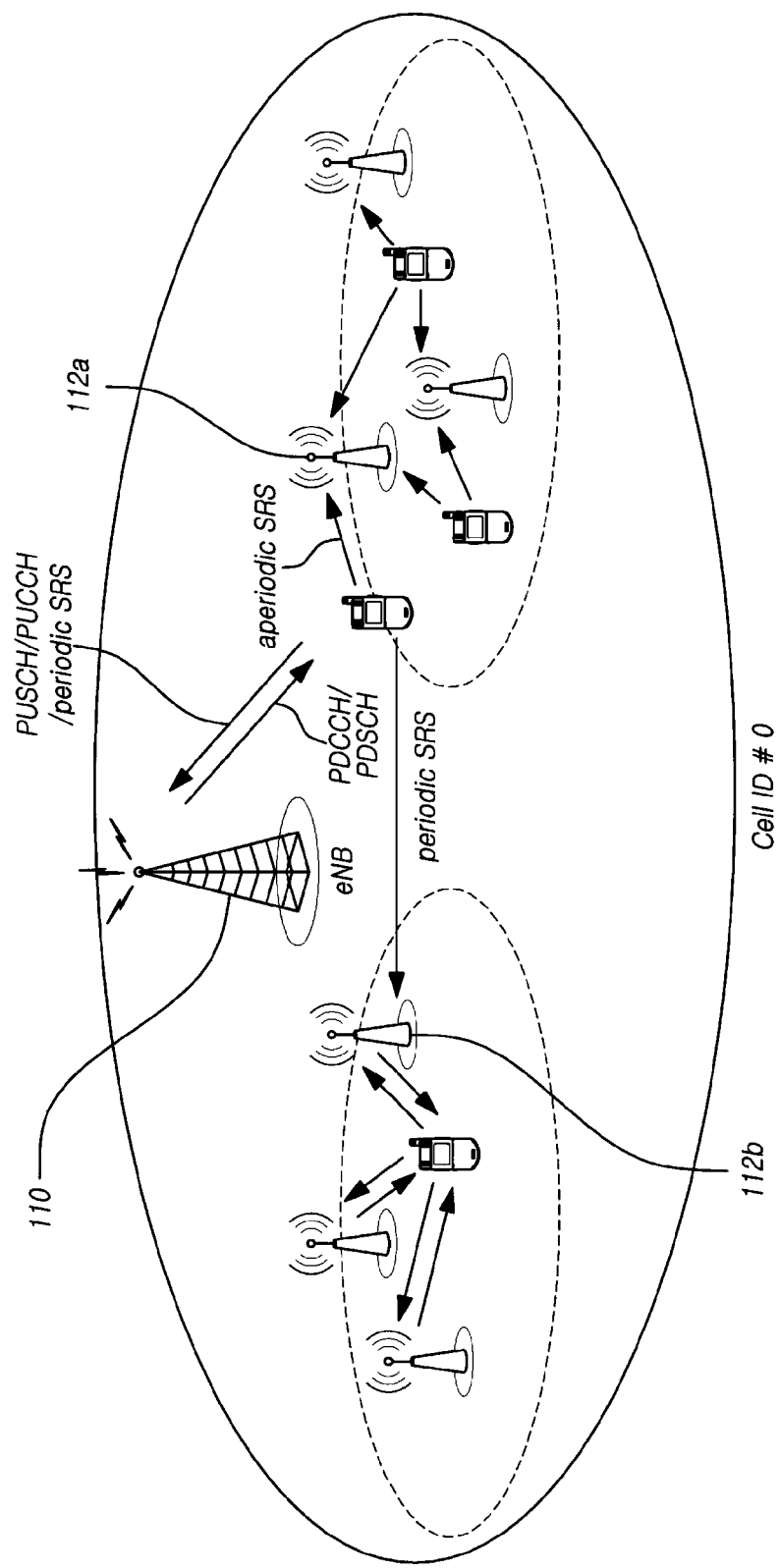
FIG. 8 illustrates independently transmitting a physical uplink channel, an SRS and also a periodic SRS and an aperiodic SRS in a CoMP environment in which transmission/reception points use the same cell identity (e.g., cell ID #0)

FIG. 8 illustrates independently transmitting not only a physical uplink channel and an SRS but also a periodic SRS and an aperiodic SRS, in a CoMP environment in which transmission/reception points use the same cell identity (e.g., cell ID #0).

Referring to FIG. 7 and FIG. 8, UE-specific configuration information indicating an SRS identity may indicate a different reference signal identity for each of the periodic SRS and the aperiodic SRS. Accordingly, the SRS may be transmitted independently from PUCCH and PUSCH. Furthermore, the periodic SRS and the aperiodic SRS may be transmitted independently from each other. FIG. 7 and FIG. 8 illustrate only a case that a receiving subject (e.g., 112b or 110) of the periodic SRS and a receiving subject (e.g., 112a) of the aperiodic SRS are different. However, in at least one embodiment, each receiving subject for periodic/aperiodic SRSs may be independently determined, and the two receiving subjects may be the same.

According to an SRS transmission method as shown in FIG. 7 and FIG. 8, an SRS sequence may be determined independently from DM-RS associated with PUCCH and/or PUSCH. Furthermore, sequences for a periodic SRS and an aperiodic SRS may be independently determined. Accordingly, a TDD system may independently measure a downlink channel quality of a serving transmission/reception point and a downlink channel quality of a different transmission/reception point. Herein, the TDD system may use an uplink channel quality measurement and a channel reciprocity for the serving transmission/reception point and the different transmission/reception point.

Furthermore, such SRS transmission method may allow for recognition of a location or a geometry of user equipment, using an SRS. Accordingly, in the case that user equipment is located on edge of a cell or at the center of the cell, improvement of data throughput for a downlink by using a UE-specific downlink transmission method may be possible.

Figure 9:
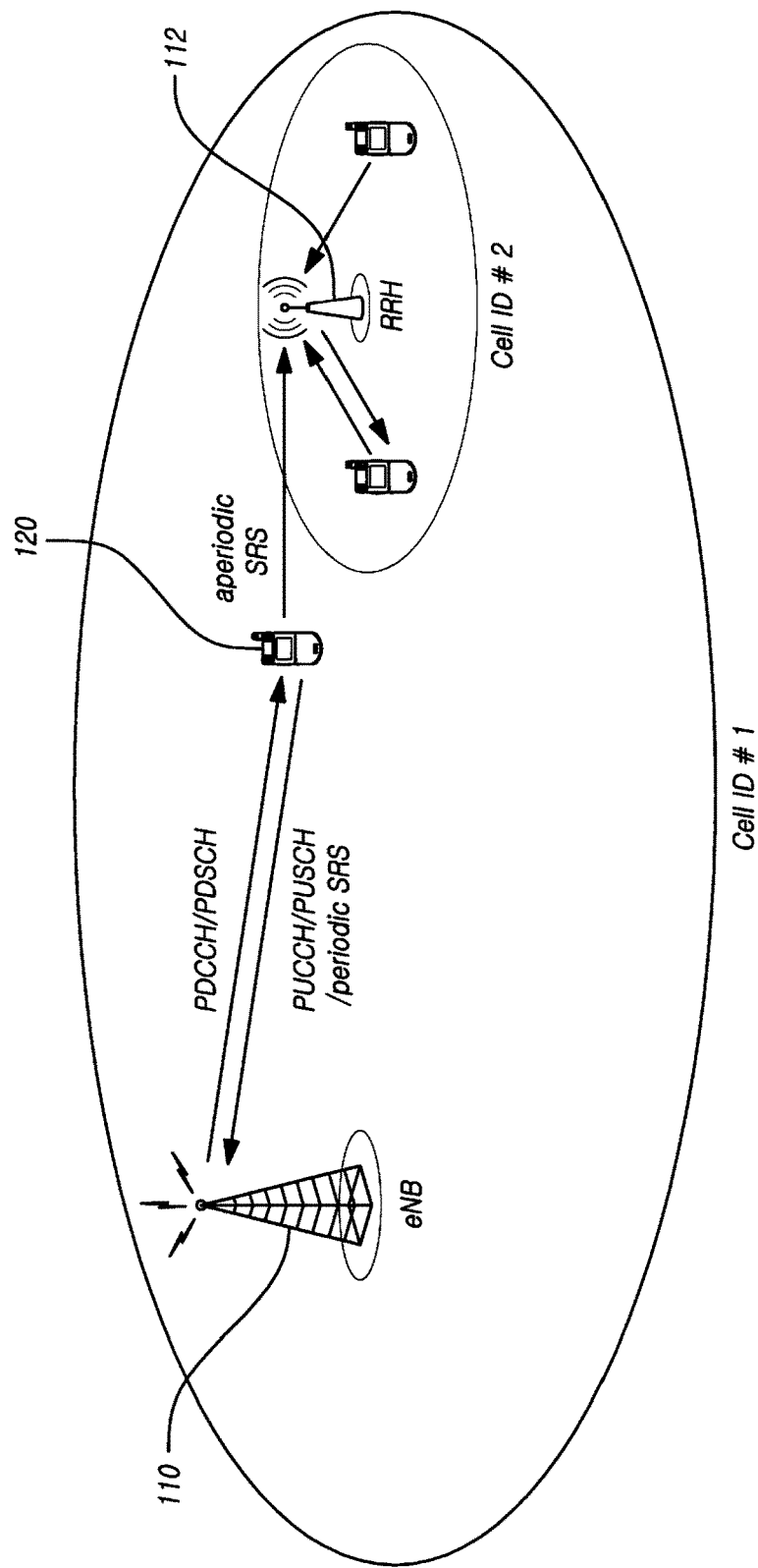
FIG. 9 illustrates transmitting a periodic SRS to a serving transmission/reception point serving user equipment, and transmitting an aperiodic SRS to a different transmission/reception point in a CoMP environment in which transmission/reception points use different cell identities (e.g., cell ID #1 and cell ID #2)

FIG. 9 illustrates transmitting a periodic SRS to a serving transmission/reception point serving user equipment, and transmitting an aperiodic SRS to a different transmission/reception point, in a CoMP environment in which transmission/reception points use different cell identities (e.g., cell ID #1 and cell ID #2).

Figure 10:
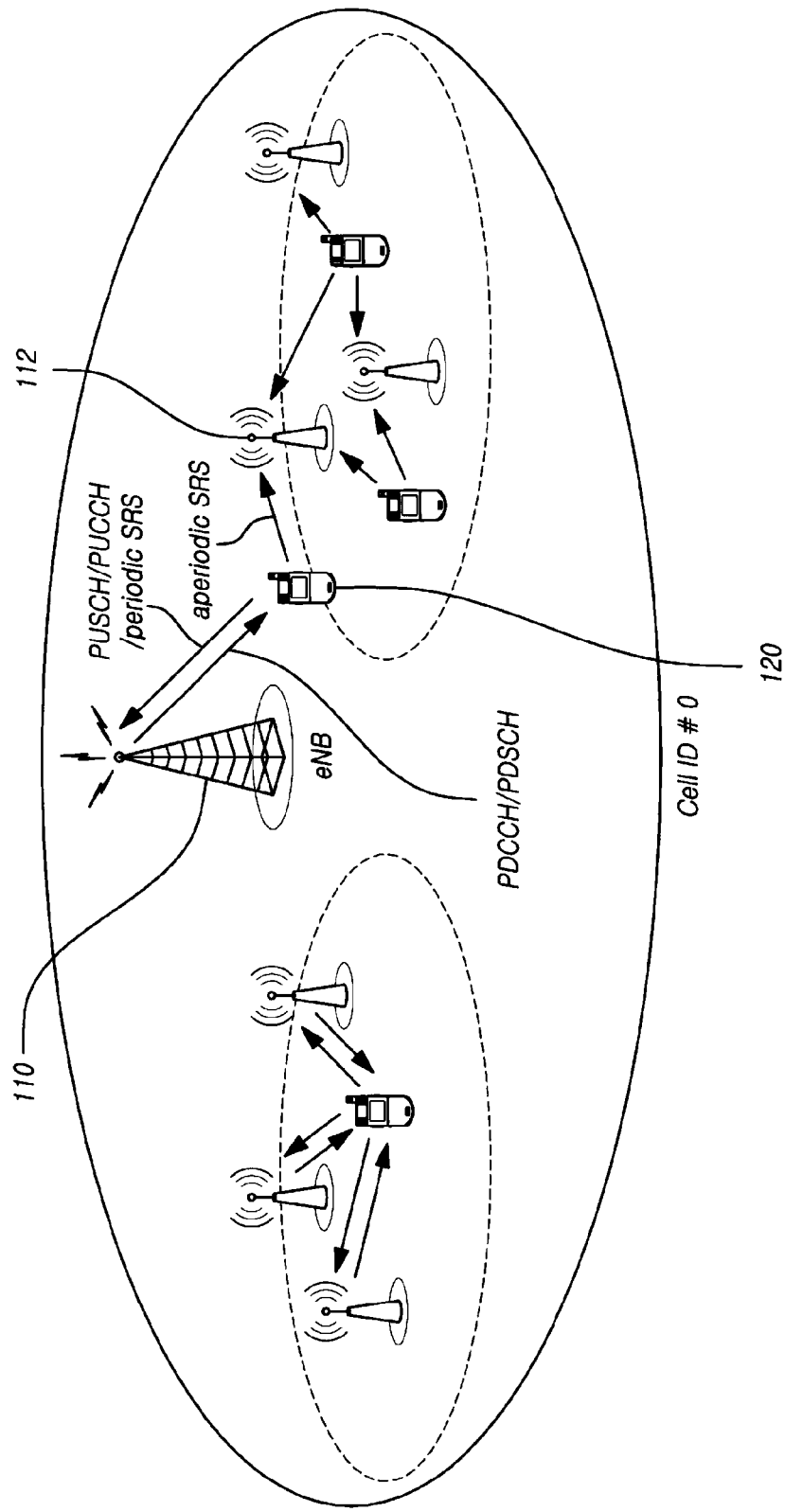
FIG. 10 illustrates transmitting a periodic SRS to a serving transmission/reception point serving user equipment, and transmitting, independently from a physical uplink channel, an aperiodic SRS to a different transmission/reception point in a CoMP environment in which transmission/reception points use the same cell identity (e.g., cell ID #0)

FIG. 10 illustrates transmitting a periodic SRS to a serving transmission/reception point serving user equipment, and transmitting, independently from a physical uplink channel, an aperiodic SRS to a different transmission/reception point, in a CoMP environment in which transmission/reception points use the same cell identity (e.g., cell ID #0).

In other embodiments, not shown in FIG. 9 and FIG. 10, an aperiodic SRS may be transmitted to a serving transmission/reception point serving user equipment. A periodic SRS may be independently transmitted from a physical uplink channel, to another transmission/reception point.

Referring to FIG. 4, FIG. 9, and FIG. 10, in an SRS generation procedure (S420) shown in FIG. 4, one of a periodic SRS and an aperiodic SRS may be generated using an SRS identity, and the other SRS may be generated using a cell identity of a serving transmission/reception point serving user equipment. Herein, the SRS identity may be independently distinguished from an identity for a physical uplink channel. In an SRS transmission procedure (S430), one of the periodic SRS and the aperiodic SRS may be transmitted to a transmission/reception point indicated by the SRS identity, and the other SRS may be transmitted to the serving transmission/reception point.

That is, according to embodiments shown in FIG. 9 and FIG. 10, one of the periodic SRS and the aperiodic SRS may be transmitted independently from a physical uplink channel, and the other may be transmitted to the serving transmission/reception point. In at least one embodiment, a receiving subject of the SRS transmitted independently may be the same as a receiving subject of the physical uplink channel. Furthermore, the SRS may be transmitted to the serving transmission/reception point.

Referring back to FIG. 4, in a procedure (S410) receiving a UE-specific configuration information indicating an SRS identity, the SRS identity may be independently distinguished from an uplink reference signal identity for a physical uplink channel. Herein, the uplink reference signal identity may be a reference signal identity of an uplink demodulation reference signal (UL DMRS or UL DM-RS).

In a UE-specific configuration information receiving procedure (S410), UE-specific configuration information may include UE-specific parameters which are specifically determined for user equipment 120 belonging to eNB 110. Such UE-specific configuration information may include reference signal identities associated with a physical uplink channel (e.g., PUCCH or PUSCH). Herein, the reference signal identities associated with the physical uplink channel may be used to determine a UE-specific physical uplink channel sequence and a UE-specific reference signal sequence associated with a physical uplink channel. More specifically, the UE-specific configuration information may include UE-specific parameters indicating the reference signal identity $n_{ID}^{RS}$ associated with PUCCH or a virtual cell identity (VCID) (hereinafter, referred to as $n_{ID}^{RS}$), and a reference signal identity $n_{ID}^{RS'}$ associated with PUSCH. In this case, the reference signal identity $n_{ID}^{RS}$ associated with the PUCCH and the reference signal identity $n_{ID}^{RS'}$ associated with the PUSCH may be different from or the same as a cell-specific parameter indicating a cell identity $N_{ID}^{cell}$ of a cell to which user equipment 120 belongs.

eNB 110 may dynamically transmit UE-specific configuration information to user equipment 120 through PDCCH/EPDCCH. Herein, the UE-specific configuration information may include UE-specific parameters indicating a reference signal identity $n_{ID}^{RS}$ associated with PUCCH and a reference signal identity $n_{ID}^{RS'}$ associated with PUSCH.

Alternatively, the UE-specific configuration information may be determined semi-statically by higher layers such as RRC layer, or be determined in advance through RRC. In this case, eNB 110 may provide indication information for use of the pre-determined UE-specific configuration information, through PDCCH/EPDCCH.

For each of PUCCH and PUSCH, user equipment 120 may generate a base sequence for each of a reference signal associated with PUCCH and/or a reference signal associated with PUSCH, using UE-specific configuration information. Herein, the UE-specific configuration information may include a reference signal identity $n_{ID}^{RS}$ associated with the PUCCH and/or a reference signal identity $n_{ID}^{RS'}$ associated with the PUSCH. For example, in each case of the PUSCH and the PUCCH, user equipment 120 may generate a base sequence $\bar{r}_{u,v}(n)$ for DM-RS. Such base sequence (e.g., a base sequence for the PUSCH and a base sequence for the PUCCH) may be differently generated according to a sequence group number u and a base sequence number v within a corresponding sequence group. The reference signal identity $n_{ID}^{RS}$ associated with the PUCCH and/or the reference signal identity $n_{ID}^{RS'}$ associated with the PUSCH may be used in place of a cell ID $N_{ID}^{cell}$, to determine the sequence group number u and the base sequence number v within the corresponding sequence group.

User equipment 120 may transmit a DM-RS through an assigned radio resource to a transmission/reception point (e.g., RRH 112) indicated by a reference signal identity. Herein, the DM-RS may be generated using a base sequence, a cyclic shift, and an orthogonal code (or an orthogonal cover code). In case of an uplink DM-RS, user equipment 120 may transmit the uplink DM-RS using a maximum of three symbols per slot.

In addition, user equipment 120 may transmit PUCCH or PUSCH through the same frequency band as a frequency band assigned for an uplink DM-RS associated with each of PUCCH and PUSCH. A transmission/reception point (e.g., RRH 112) capable of receiving DM-RS, among transmission/reception points may receive the PUCCH and the PUSCH, using a received DM-RS.

In this case, receiving subjects of PUCCH/PUSCH may be determined as a serving transmission/reception point 110, but the present invention is not limited thereto. Receiving subjects of PUCCH/PUSCH may be arbitrarily determined based on a reference signal identity $n_{ID}^{RS}$ associated with the PUCCH and/or a reference signal identity $n_{ID}^{RS'}$ associated with the PUSCH. Accordingly, the receiving subjects of the PUCCH and the PUSCH may be determined as a transmission/reception point other than a serving transmission/reception point 110.

At step S410, user equipment 120 may receive UE-specific configuration information. Herein, the UE-specific configuration information may include an SRS identity $n_{ID}^{SRS}$ determined independently.

At step S420, user equipment 120 may generate an SRS, using the received UE-specific configuration information including the independently determined SRS identity $n_{ID}^{SRS}$. Hereinafter, such SRS generation procedure (S420) will be described in more detail.

An SRS sequence may be generated by a cyclic shift (CS) of a base sequence $\bar{r}_{u,v}(n)$ based on Zadoff-Chu sequence, as described by Formula 1 and Formula 2 below. Herein, the generated SRS sequence may have length $M_{sc}^{RS}$ based on resource blocks (RBs) used for an SRS transmission. For example, the length $M_{sc}^{RS}$ of the SRS sequence=[Number of RSs]×[Number of subcarriers (typically, 12) within an RB]/2.

$$r_{SRS}^{(\tilde{p})}(n)=r_{u,v}^{(\alpha \tilde{p})}(n) \quad \text{[Formula 1]}$$

$$r_{u,v}^{(\alpha \tilde{p})}(n)=e^{j\alpha \tilde{p} n}\bar{r}_{u,v}(n) \quad \text{[Formula 2]}$$

where, $r_{u,v}^{(\alpha \tilde{p})}(n)$ denotes a reference signal (RS) sequence, $\alpha_{\tilde{p}}$ denotes a cyclic shift (CS), $\bar{r}_{u,v}(n)$ denotes a base sequence, $0 \leq n < M_{sc}^{RS}$, $M_{sc}^{RS}=mN_{sc}^{RB}$, $1 \leq m \leq N_{RB}^{max,UL}$, and $M_{sc}^{RS}$ is the number of subcarriers assigned for UL RS sequence in the frequency domain.

Base sequences may be differently generated according to the sequence group number u, the base sequence number v within the group, and a sequence length n.

In a sequence group hopping, 30 sequence groups may be hopped per slot regardless of the number of resource blocks (RBs) assigned to user equipment.

More specifically, the sequence group number u in slot $n_s$ may be defined by a group hopping pattern $f_{gh}(n_s)$ and a sequence-shift pattern $f_{ss}$, according to Formula 3 below.

$$u=(f_{gh}(n_s)+f_{ss})\bmod 30 \quad \text{[Formula 3]}$$

The sequence group hopping pattern $f_{gh}(n_s)$ may be the same for PUCCH and PUSCH. However, the sequence-shift pattern $f_{ss}$ may be different for PUCCH and PUSCH.

The group-hopping pattern $f_{gh}(n_s)$ may be given by Formula 4 below for PUSCH and PUCCH.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Formula 4]}$$

In Formula 4, c(i) denotes a pseudo-random sequence. When user equipment 120 receives $n_{ID}^{SRS}$ for an SRS transmission from eNB 110, the pseudo-random sequence c(i) may be initialized using a UE-specific parameter $n_{ID}^{SRS}$ in each radio frame. More specifically, the pseudo-random sequence may be initialized with $$c_{init} = \left\lfloor \frac{n_{ID}^{SRS}}{30} \right\rfloor.$$

Definition of the sequence-shift pattern $f_{ss}$ may be different between PUCCH, PUSCH and SRS. For an SRS, the sequence-shift pattern $f_{ss}^{SRS}$ may be given by $f_{ss}^{SRS}=n_{ID}^{SRS}$ mod 30.

Sequence hopping may be applied for reference signals of length 6 RBs or larger ($M_{sc}^{RS} \geq 6N_{sc}^{RB}$). For reference-signals of length less than 6 RBs ($M_{sc}^{RS}<6N_{sc}^{RB}$), the base sequence number v within the base sequence group may be given by v=0.

For reference-signals of length 6 RBs or larger ($M_{sc}^{RS} \geq 6N_{sc}^{RB}$), the base sequence number v within the base sequence group in slot $n_s$ may be defined by Formula 5 below.

$$v = \begin{cases} c(n_s) & \text{if group hopping is disabled} \\ & \text{and sequence hopping is enabled} \\ 0 & \text{otherwise} \end{cases} \quad \text{[Formula 5]}$$

In Formula 5, c(i) denotes a pseudo-random sequence. The pseudo-random sequence may be initialized with $$c_{init} = \left\lfloor \frac{n_{ID}^{SRS}}{30} \right\rfloor \cdot 2^5 + (n_{ID}^{SRS} + \Delta_{ss})\bmod 30$$

in each radio frame.

The cyclic shift $\alpha_{\tilde{p}}$ may be differently generated for each user equipment and for each antenna port, according to Formula 6 below.

$$\alpha_{\tilde{p}} = 2\pi \frac{n_{SRS}^{cs,\tilde{p}}}{8} \quad \text{[Formula 6]}$$

$$n_{SRS}^{cs,\tilde{p}} = \left(n_{SRS}^{cs} + \frac{8\tilde{p}}{N_{ap}}\right)\bmod 8$$

$$\tilde{p} \in \{0, 1, \ldots, N_{ap}-1\}$$

In Formula 6, $n_{SRS}^{CS}$ used to calculate the cyclic shift $\alpha_{\tilde{p}}$ a may be transmitted by higher-layer signaling (e.g., RRC). For example, in case of $n_{SRS}^{CS}$, a total of 8 values (e.g., $n_{SRS}^{CS}=\{0, 1, 2, 3, 4, 5, 6, 7\}$) for each user equipment may be transmitted. Cyclic shift $\alpha_{\tilde{p}}$ for each antenna port may be determined based on the transmitted $n_{SRS}^{CS}$ as described in Formula 6. $\tilde{p}$ denotes an antenna port number index, and $N_{ap}$ denotes the number of antenna ports used for an SRS transmission.

An SRS sequence may be generated according to Formula 1 using the base sequence of Formula 2 and the cyclic shift (CS) $\alpha_{\tilde{p}}$ of Formula 6. Such SRS sequence generation procedure may be performed in OFDM modulator 2010 shown in FIG. 20. At step S430, user equipment 120 may assign radio resources for SRS transmission, and transmit the generated SRS (e.g., an SRS generated at step S420) through the assigned radio resources, to a transmission/reception point (e.g., RRH 112) indicated by $n_{ID}^{SRS}$.

A UE-specific parameter indicating an uplink reference signal identity may indicate the same reference signal identity for a periodic SRS and an aperiodic SRS.

In this case, sequence group numbers and base sequence numbers for the periodic SRS and the aperiodic SRS may be determined as the same value. However, the sequence group numbers and the base sequence numbers for the periodic or aperiodic SRS may be determined independently from a sequence group number and a base sequence number for PUCCH and PUSCH.

That is, an SRS sequence may be determined independently from PUCCH and PUSCH. Accordingly, a TDD system may independently measure a downlink channel quality of a serving transmission/reception point and a downlink channel quality of a different transmission/reception point. Herein, the TDD system may use an uplink channel quality measurement and a channel reciprocity for the serving transmission/reception point and the different transmission/reception point. Furthermore, the SRS transmission method may allow for recognition of a location or a geometry of user equipment, using an SRS. Accordingly, in the case that the user equipment is located on edge of a cell or at the center of the cell, it may be possible to improve data throughput for a downlink by using a UE-specific downlink transmission method.

Meanwhile, sequence group numbers and base sequence numbers used for a periodic SRS and an periodic SRS may be assigned independently from each other, through RRC parameters. In at least one embodiment, indication information for corresponding base sequence numbers and sequence group numbers may be included in PDCCH transmitted dynamically. Alternatively, base sequence numbers and sequence group numbers used for a periodic SRS and an aperiodic SRS may be dynamically indicated through a RRC parameter (e.g., a parameter having a length of 1 bit) predefined by RRC signaling.

Accordingly, an SRS sequence may be generated independently from PUCCH and PUSCH. Furthermore, user equipment may transmit an SRS to a serving transmission/reception point or a different transmission/reception point. Therefore, a transmission/reception point (e.g., a base station) received the SRS may flexibly perform a scheduling procedure.

For a periodic SRS and an aperiodic SRS, a transmission to a serving transmission/reception point and a transmission to a different transmission/reception point (i.e., a transmission/reception point other than the serving transmission/reception point) may be independently performed.

In an SRS transmission method, a UE-specific parameter indicating an SRS identity may indicate different reference signal identities for a periodic SRS and an aperiodic SRS.

In this case, a sequence group number and a base sequence number for the periodic SRS may be determined independently form a sequence group number and a base sequence numbers for the aperiodic SRS. Furthermore, the sequence group numbers and the base sequence numbers for the periodic and aperiodic SRSs may be determined independently from a sequence group number and a base sequence number for PUCCH and PUSCH.

For example, in Formula 1 to Formula 6, an SRS may be generated using a periodic SRS identity $n_{ID}^{SRS}$, and the generated SRS may be transmitted to a transmission/reception point indicated by the periodic SRS identity $n_{ID}^{SRS}$. Meanwhile, an SRS may be generated using an aperiodic SRS identity $n_{ID}^{SRS'}$ being independent of a periodic SRS identity $n_{ID}^{SRS}$. The generated SRS may be transmitted to a transmission/reception point indicated by the aperiodic SRS identity n $n_{ID}^{SRS'}$. Herein, the periodic SRS identity $n_{ID}^{SRS}$ and the aperiodic SRS identity $n_{ID}^{SRS'}$ may independently indicate a corresponding transmission/reception point for SRS transmission. Furthermore, the periodic SRS identity $n_{ID}^{SRS}$ and/or the aperiodic SRS identity $n_{ID}^{SRS'}$ may not necessarily indicate a serving transmission/reception point. Accordingly, the periodic SRS identity $n_{ID}^{SRS}$ and/or the aperiodic SRS identity $n_{ID}^{SRS'}$ may indicate a certain transmission/reception points (e.g., eNB 110) other than the serving transmission/reception point.

That is, an SRS sequence may be determined independently from PUCCH and PUSCH. Furthermore, sequences for a periodic SRS and an aperiodic SRS may be independently determined from each other. Accordingly, a TDD system may independently measure a downlink channel quality of a serving transmission/reception point and a downlink channel quality of a different transmission/reception point. Herein, the TDD system may use an uplink channel quality measurement and a channel reciprocity for the serving transmission/reception point and the different transmission/reception point.

Furthermore, the SRS transmission method may allow for recognition of a location or a geometry of user equipment, using an SRS. Accordingly, in the case that user equipment is located on edge of a cell or at the center of the cell, it may be possible to improve data throughput for a downlink by using a UE-specific downlink transmission method.

Figure 21:
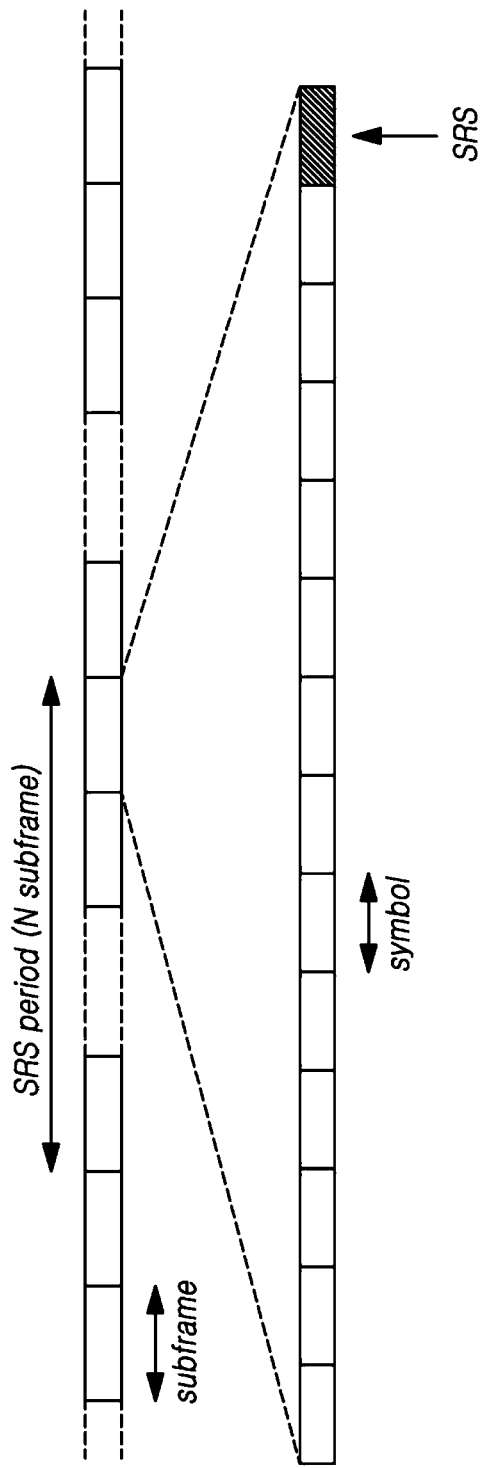
FIG. 21 illustrates a position of a symbol carrying an SRS.
Figure 22:
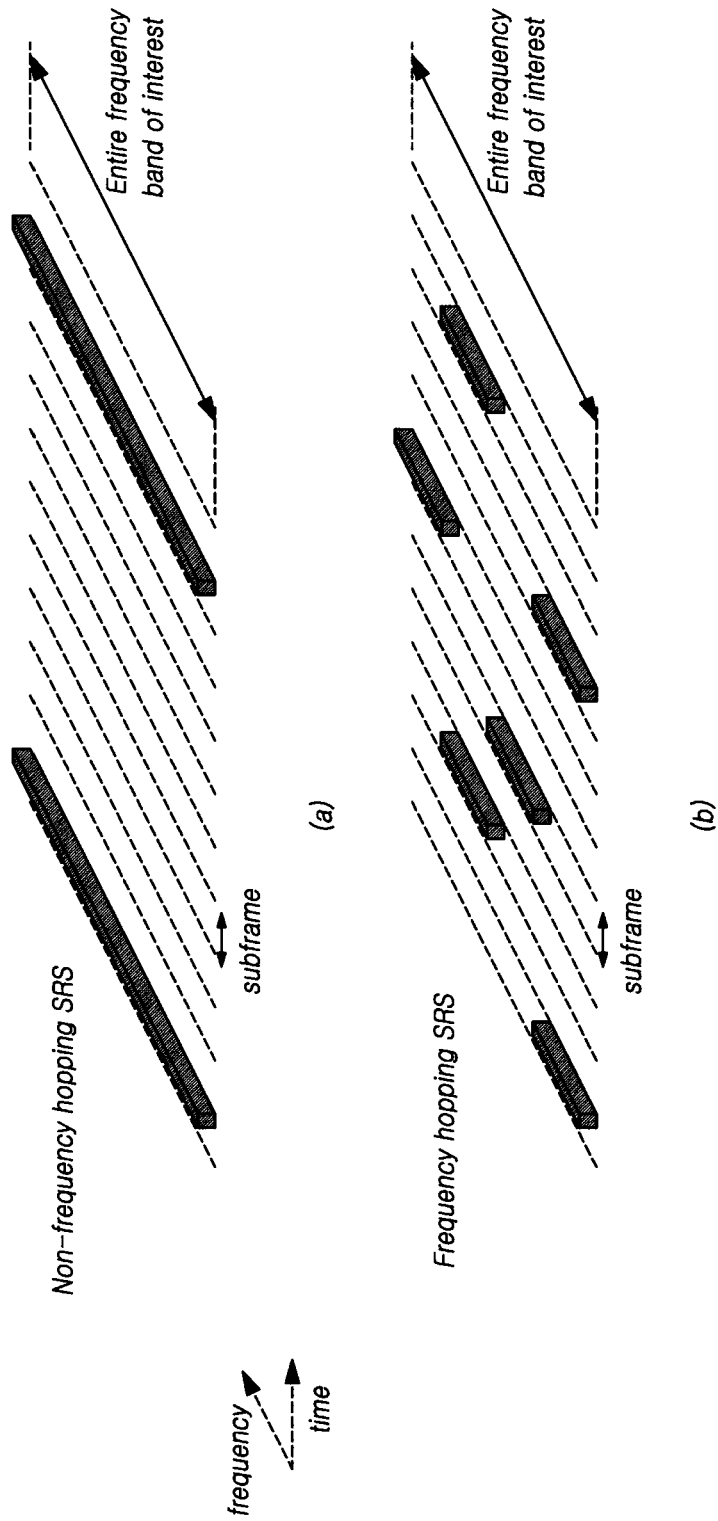
FIG. 22 illustrates a non-frequency hopping SRS and a frequency hopping SRS.

FIG. 21 illustrates a position of a symbol carrying an SRS. FIG. 22 illustrates a non-frequency hopping SRS and a frequency hopping SRS.

Referring to FIG. 21 and FIG. 22, an SRS may be transmitted by the last symbol of a subframe. In the frequency domain, SRS transmissions should cover the frequency band that is of interest for a frequency-domain scheduling. As illustrated in FIG. 22(a), a sufficiently wideband SRS transmission may be performed such that channel quality of an entire frequency band of interest can be estimated with a single SRS transmission. As illustrated in FIG. 22(b), a sequence of SRS transmissions may jointly cover the entire frequency band of interest, by transmitting a narrowband SRS using hopping in the frequency domain.

Figure 20:
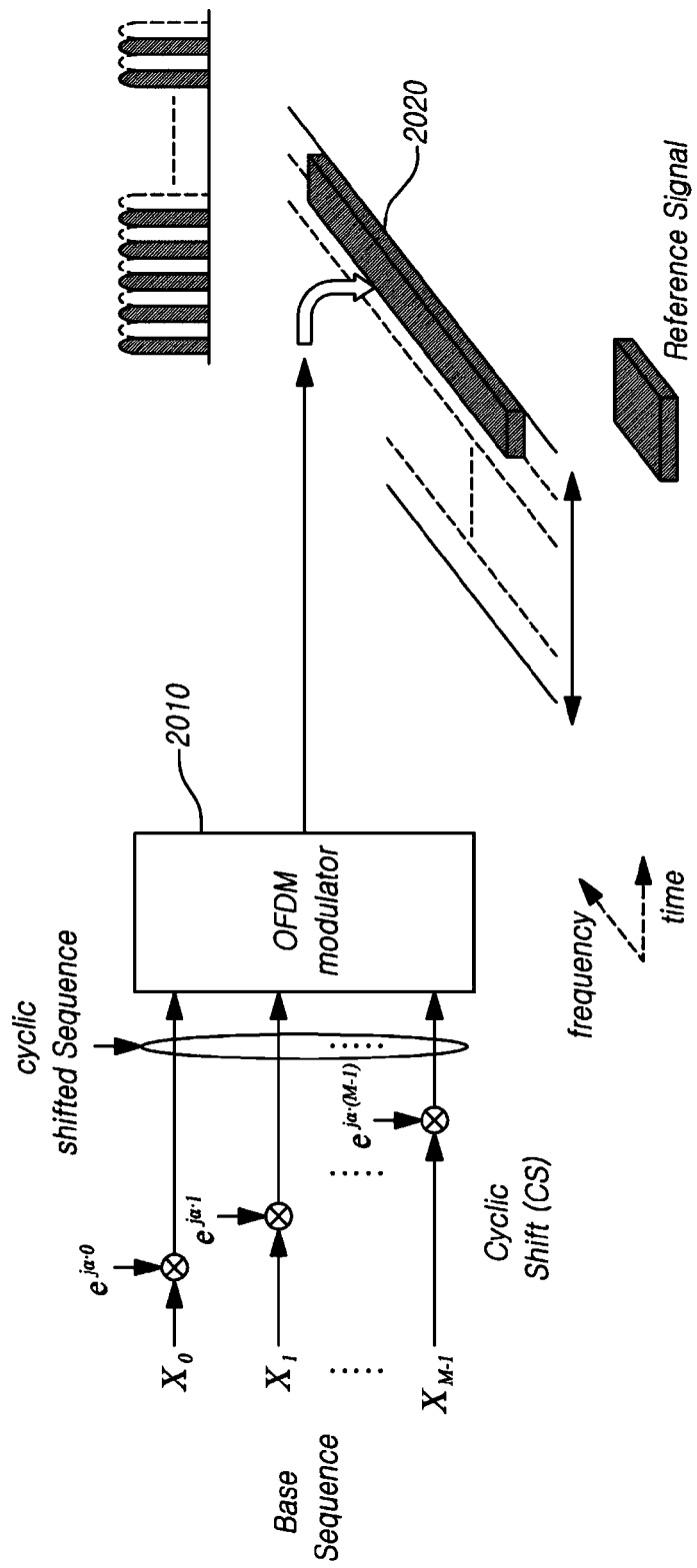
FIG. 20 is a block diagram illustrating user equipment performing an uplink SRS transmission shown in FIG. 4.

As described above, when an SRS is mapped to resource elements, SC-FDMA symbols may be generated by a SC-FDMA generator (not shown in FIG. 20). SRS signals corresponding to the generated SC-FDMA symbols may be transmitted to a corresponding transmission/reception point.

Specific subframes carrying SRSs may be periodically or aperiodically determined. For example, "cell-specific subframes for SRS transmission" (hereinafter, referred to as "cell-specific SRS subframes") may be configured or defined as shown in Table for Table 2 below. Herein, Table 1 and Table 2 may be associated with frequency division duplex (FDD) and time division duplex (TDD), respectively. An SRS may be periodically transmitted in subframes which have a specific configuration period $T_{SFC}$ and a specific transmission offset $\Delta_{SFC}$ in each user equipment. Such SRS may be referred to as a periodic SRS or a trigger type 0 SRS. Alternatively, an SRS may be transmitted in subframes which are aperiodically configured. In this case, such SRS may be referred to as an aperiodic SRS or a trigger type 1 SRS.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 2

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |

TABLE 2-continued

| srs-SubframeConfig | Binary | Configuration Period $T_{SFC}$ (subframes) | Transmission offset $\Delta_{SFC}$ (subframes) |
|---|---|---|---|
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Table 1 and Table 2 may represent cell-specific SRS subframes as configuration period $T_{SFC}$ and transmission offset $\Delta_{SFC}$ for FDD (frame structure type 1) and TDD (frame structure type 2). The total number of possible cases may be 16. The parameter "srs-SubframeConfig" for each case may be transmitted by higher-layer signaling of 4 bits, such as RRC signaling. For example, in Table 1, in the case that the parameter "srs-SubframeConfig" is 7 ("0111"), a corresponding configuration period $T_{SFC}$ may be "5" and a corresponding transmission offset $\Delta_{SFC}$ may be {0,1}. In this case, an SRS may be transmitted in the first and second subframes per five subframes corresponding to the configuration period.

The periodic SRS may represent an SRS transmitted in corresponding subframes which are periodically transmitted according to a specific configuration period $T_{SFC}$ and a specific transmission offset $\Delta_{SFC}$ in each user equipment, among the above-described cell-specific SRS subframes.

Meanwhile, Table 3 (FDD) and Table 4 (TDD) below may represent a periodicity and an offset of a UE-specific periodic SRS. Herein, the UE-specific periodic SRS may represent a periodic SRS defined according to each user equipment.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | Reserved | reserved |

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |

TABLE 4-continued

| SRS Configuration Index $I_{SRS}$ | SRS Periodicity $T_{SRS}$ (ms) | SRS Subframe Offset $T_{offset}$ |
|---|---|---|
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

Table 3 and Table 4 may represent UE-specific periodic SRS subframes as periodicity $T_{SRS}$ and offset $T_{offset}$ for FDD and TDD. Herein, UE-specific periodic SRS subframes may be subframes transmitting a UE-specific periodic SRS. The total number of possible cases may be 1024. SRS configuration index $I_{SRS}$ for each case may be transmitted by higher-layer signaling of 10 bits, such as RRC signaling. For example, in Table 3, in the case that the SRS configuration index $I_{SRS}$ is 3, a corresponding periodicity $T_{SRS}$ is "5" and a corresponding offset $T_{offset}$ is "1". In this case, a UE-specific periodic SRS may be transmitted in the second subframe per five subframes corresponding to a periodicity.

Information on resource blocks (RBs) when transmitting SRS may be transmitted by higher-layer signaling. Herein, the information on RBs may include the number of "cell-specific occupied RBs" (i.e., all RBs being used for certain cell). More specifically, in case of the cell-specific occupied RBs, occupied RBs (i.e., in-use RBs) may represent specific RBs corresponding to the number of higher-layer signaling among all RBs corresponding to an entire system bandwidth (BW). For example, in the case that system bandwidth is 50 RBs and the number of signaling RBs is 48, it may mean that 48 RBs are used among a total of 50 RBs. Furthermore, the information on RBs may include the number of and positions of "UE-specific occupied RBs" (i.e., RBs being used by a certain user equipment among the cell-specific occupied RBs).

For example, Table 5 may be used in the case that a system bandwidth (e.g., an uplink bandwidth) is 40 to 60 RBs.

In at least one embodiment, Table 5 may be differently defined according to corresponding system bandwidths. The number of cell-specific occupied RBs may be transmitted as the parameter $C_{SRS}$. The number of UE-specific occupied RBs may be defined as the parameter $B_{SRS}$. For example, in Table 5 below, in the case that $C_{SRS}$ is "1" and $B_{SRS}$ is "2", the number ($m_{SRS,0}$) of cell-specific RBs used for transmission of all SRSs is "48". The number ($m_{SRS,2}$) of RBs used for a specific user equipment among the cell-specific RBs used for transmission of all SRSs is "2". Furthermore, the parameter $n_{RRC}$ may be defined in order to represent positions of RBs used for each user equipment. Such parameters (e.g., $C_{SRS}$, $B_{SRS}$, $n_{RRC}$) may be transmitted by higher-layer signaling such as RRC signaling.

TABLE 5

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |

TABLE 5-continued

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Furthermore, information (i.e., a transmission comb) on subcarriers assigned for an SRS may be transmitted by higher-layer signaling such as RRC. The transmission comb may be expressed as the parameter $k_{TC}$, and the parameter $k_{TC}$ may be set as "0" or "1". For SRS transmission subframes and/or SRS transmission RBs, the parameter $k_{TC}$ may indicate whether subcarriers substantially transmitting an SRS sequence through a mapping process are even-numbered subcarriers or odd-numbered subcarriers. The transmission comb may also be transmitted by higher-layer signaling (e.g., RRC signaling) performed for each user equipment.

In summary, a transmission unit (e.g., a transmission/reception point) may transmit the following SRS transmission related parameters to user equipment such that the user equipment can transmit a periodic SRS or a trigger type 0 SRS. Herein, such SRS transmission related parameters may include i) parameters (e.g., srs-SubframeConfig, $I_{SRS}$) used for determination of subframes transmitting an SRS, ii) parameters (e.g., $C_{SRS}$, $B_{SRS}$, $n_{RRC}$) used for determination of resource blocks (RBs) transmitting an SRS, iii) a parameter (e.g., $k_{TC}$) used for determination of subcarriers assigned for SRS transmission, iv) a parameter (e.g., $n_{SRS}^{CS}$) used for determination of cyclic shifts between SRSs, and v) the number of antenna ports. Such SRS transmission related parameters may be transmitted by a higher-layer signaling (e.g., RRC signaling). Table 6 below may represent a summary of the above-described SRS transmission related parameters.

TABLE 6

| srs-SubframeConfig | $I_{SRS}$ | $C_{SRS}$ | $B_{SRS}$ | $n_{RRC}$ | $k_{TC}$ | $n_{SRS}^{CS}$ | Number of antenna ports |
|---|---|---|---|---|---|---|---|
| Indicated by higher-layer signaling (RRC signaling) | | | | | | | |

Meanwhile, an SRS may be transmitted in SRS subframes which are aperiodically configured, among cell-specific SRS subframes determined by Table 1 (FDD) or Table 2 (TDD). In this case, such SRS may be referred to as an aperiodic SRS or a trigger type 1SRS.

In this case, an SRS may be aperiodically transmitted in UE-specific subframes determined according to Table 7 (FDD) or Table 8 (TDD), among cell-specific SRS subframes determined by Table 1 or Table 2. Herein, the UE-specific subframes may have a specific periodicity and a specific offset defined according to a corresponding user equipment as described in Table 7 or Table 8. The expression "SRS is aperiodically transmitted" may mean that after some possible cases for SRS transmission are pre-defined, SRS transmission associated with such pre-defined cases may be triggered by dynamic signaling such as downlink control information (DCI), if necessary. As described above, in case of a periodic (trigger type 0) SRS, signaling information for SRS transmission may be directly transmitted by higher-layer signaling. Herein, the signaling information for SRS transmission may include at least one of i) information on SRS transmission subframes, ii) information on SRS transmission resource blocks (RBs), iii) information on subcarriers assigned for SRS transmission, iv) information on cyclic shift used for SRS sequence generation, and v) the number of antenna ports for SRS transmission. Alternatively, in case of an aperiodic (trigger type 1) SRS, some of signaling information for SRS transmission may not be directly transmitted to user equipment. However, the SRS parameter set associated with the some signaling information may be pre-defined by higher-layer signaling (e.g., RRC signaling). Accordingly, only when an SRS transmission is necessary, only a value indicating the pre-defined SRS parameter set may be transmitted by a dynamic signaling such as DCI.

TABLE 7

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-31 | reserved | reserved |

TABLE 8

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | reserved | reserved |

For example, in case of an aperiodic (trigger type 1) SRS, an SRS parameter set may include i) the parameter $I_{SRS}$ used to determine SRS transmission subframes, ii) the parameters $B_{SRS}$ and $n_{RRC}$ used to determine SRS transmission resource blocks (RBs), iii) the parameter $k_{TC}$ used to determine subcarriers assigned for SRS transmission, iv) the parameter $n_{SRS}^{CS}$ used to determine a cyclic shift of SRS, and v) the number of antenna ports. However, the parameters srs-SubframeConfig and $C_{SRS}$ may not be included in the SRS parameter set. In summary, Table 9 below may represent SRS parameters which are included or excluded in the SRS parameter set.

TABLE 9

| srs-SubframeConfig | $C_{SRS}$ | $I_{SRS}$ | $B_{SRS}$ | $n_{RRC}$ | $k_{TC}$ | $n_{SRS}^{CS}$ | Number of antenna ports |
|---|---|---|---|---|---|---|---|
| Indicated by higher-layer signaling (RRC signaling) | SRS parameter sets are configured by higher-layer signaling (RRC signaling) Indicate an SRS parameter set by dynamic signaling (DCI) | | | | | | |

In case of DCI format 0, a trigger signal of an aperiodic SRS may have a length of 1 bit. Herein, values transmitted through the trigger signal may be as described in Table 10 below. Meanwhile, in case of DCI format 4, a trigger signal of an aperiodic SRS may have a length of 2 bits. Herein, values transmitted through the trigger signal may be as described in Table 11 below.

TABLE 10

| Value of SRS request field (1 bit case) | Description |
|---|---|
| '0' | No type 1 SRS trigger |
| '1' | The 1$^{st}$ SRS parameter set configured by higher layers |

TABLE 11

| Value of SRS request field (2 bits case) | Description |
|---|---|
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

For example, in case of DCI format 4, when a value of an SRS request field is '00', an aperiodic SRS (or a type 1 SRS) may not be transmitted. When a value of the SRS request field is '01', '10', or '11', the aperiodic SRS (or the type 1 SRS) may be transmitted, according to parameters included in a corresponding SRS parameter set. Herein, the SRS parameter set may be configured by higher-layer signaling in advance.

In an SRS transmission method according to Embodiment 1, independent transmission of periodic/aperiodic SRS(s) may allow for estimation of a channel state of uplink associated with a transmission/reception points (i.e., a different transmission/reception point) other than a serving transmission/reception point. Accordingly, it may be possible to overcome a shortage of uplink coverage.

Further, a TDD system may independently measure a downlink channel quality of a serving transmission/reception point and a downlink channel quality of a different transmission/reception point. Herein, the TDD system may use an uplink channel quality measurement and a channel reciprocity for the serving transmission/reception point and the different transmission/reception point. Furthermore, the SRS transmission method may allow for recognition of a location or a geometry of user equipment, using an SRS. Accordingly, in the case that user equipment is located on edge of a cell or at the center of the cell, improvement of data throughput for a downlink by using a UE-specific downlink transmission method may be possible.

When performing a blind decoding of PDCCH according to a sequence configuration of a corresponding SRS, user equipment may perform the following procedure in order to detect a corresponding uplink grant.

In at least one embodiment, indication information for a related base sequence number may be included in PDCCH, or the related base sequence number may be dynamically indicated by RRC parameters (e.g., a parameter having a length of 1 bit) predefined by RRC signaling. In these cases, when performing a search for PDCCH, user equipment may not monitor a common search space but monitor a UE specific search space (or a UE dedicated search space) to find an uplink grant. Herein, the uplink grant may include uplink scheduling information for the user equipment. DCI format 0 and DCI format 4 may correspond to the uplink grant. Accordingly, the user equipment may be configured to monitor the UE specific search space for the uplink grant including the uplink scheduling information when performing a search for PDCCH.

Embodiment 2: Association Release

In an SRS transmission method according to Embodiment 2, a physical uplink channel may be generated using a reference signal identity, and an SRS may be generated using a physical cell identity of a serving transmission/reception point.

According to Embodiment 2, at least one of aperiodic and periodic SRSs may be not associated with PUCCH and PUSCH such that the at least one of the aperiodic and periodic SRSs is not subject to configuration of PUCCH/PUSCH sequences. Therefore, a receiving subject for the at least one of aperiodic and periodic SRSs may be determined as the serving transmission/reception point. Meanwhile, a reception point for PUSCH or PUCCH may be determined as a transmission/reception point other than the serving transmission/reception point (i.e., a downlink transmission subject). In other words, in case of generating sequences for PUSCH/PUCCH reference signals, a corresponding receiving subject may be determined as a different transmission/reception point (i.e., a transmission/reception points other than the serving transmission/reception point), by defining UE-specific PUSCH/PUCCH reference signal sequences. Accordingly, a receiving subject of PUSCH/PUCCH and a receiving subject of an SRS may differ, and therefore PUSCH/PUCCH transmissions and an SRS transmission may be separately performed.

Figure 11:
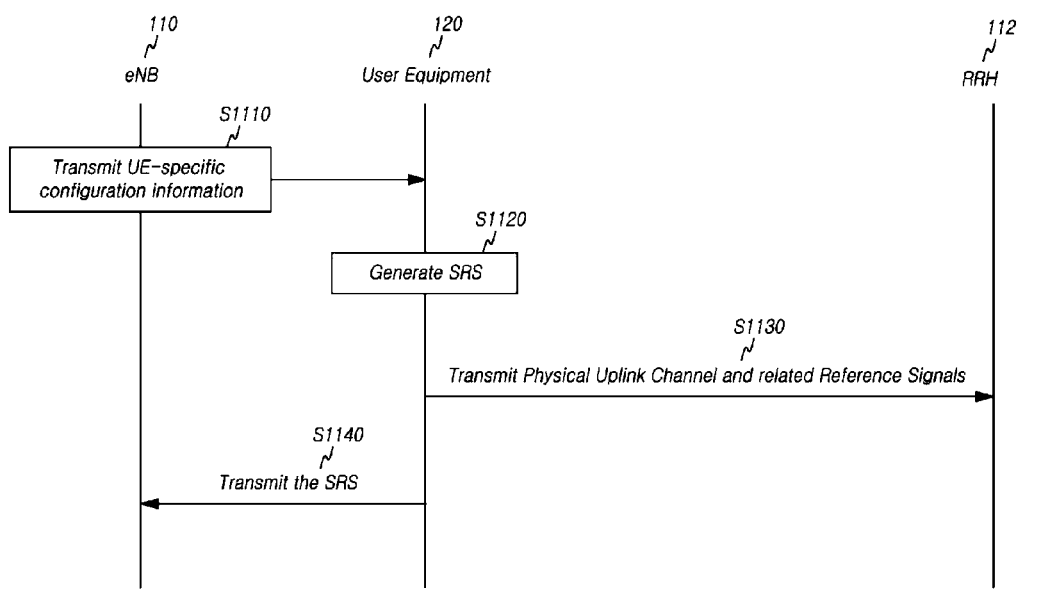
FIG. 11 is a flowchart illustrating a method of transmitting an SRS in accordance with Embodiment 2 of the present invention.

FIG. 11 is a flowchart illustrating a method of transmitting an SRS in accordance with Embodiment 2 of the present invention.

Referring to FIG. 11, at step S1110 in an SRS transmission method according to Embodiment 2, user equipment 120 may receive UE-specific configuration information indicating an uplink reference signal identity from one transmission/reception point (e.g., eNB 110) of a plurality of different transmission/reception points. Herein, the uplink reference signal identity may be independent of a physical cell identity of the one transmission/reception point (e.g., eNB 110) and is associated with an uplink channel. At step S1120, user equipment 120 may generate an SRS, using a physical cell identity of the one transmission/reception point. Herein, the one transmission/reception point may be a transmission/reception point serving user equipment 120. At step S1130, user equipment 120 may transmit an uplink channel and related reference signals (e.g., a demodulation reference signal (DM-RS) associated with the uplink channel), using the uplink reference signal identity. More specifically, user equipment 120 may transmit to a transmission/reception point (e.g., RRH 112) indicated by the uplink reference signal identity. At step S1140, user equipment 120 may transmit the generated SRS (S1120) to the one transmission/reception point, i.e., the serving transmission/reception point (e.g., eNB 110).

Herein, the SRS may include at least one of a periodic SRS and an aperiodic SRS. The uplink channel may include at least one of PUCCH and PUSCH.

A receiving subject of the uplink channel transmitted at step S1130 is determined to be a transmission/reception point (e.g., RRH 112) different from the serving transmission/reception point (e.g., eNB 110) serving user equipment 120. Thus, a receiving subject of an uplink channel may be independently determined by an uplink reference signal identity. However, a transmission/reception point (e.g., eNB 110) serving user equipment 120 may not necessarily be excluded from a receiving subject of the uplink channel.

In an SRS transmission method described with reference to FIG. 11, an SRS may be independently transmitted while other channels are not transmitted. Alternatively, the SRS and at least one of PUCCH and PUSCH may be simultaneously transmitted in one sub frame.

As described above, an SRS may include at least one of a periodic SRS and an aperiodic SRS. An uplink channel may include at least one of PUCCH and PUSCH. Accordingly, in the case that an SRS transmission is performed according to the method shown in FIG. 11, a variety of embodiments may be present.

Hereinafter, a variety of embodiments of transmitting an SRS according to an SRS transmission method illustrated in FIG. 11 will be described with reference to FIG. 12 to FIG. 19.

Figure 12:
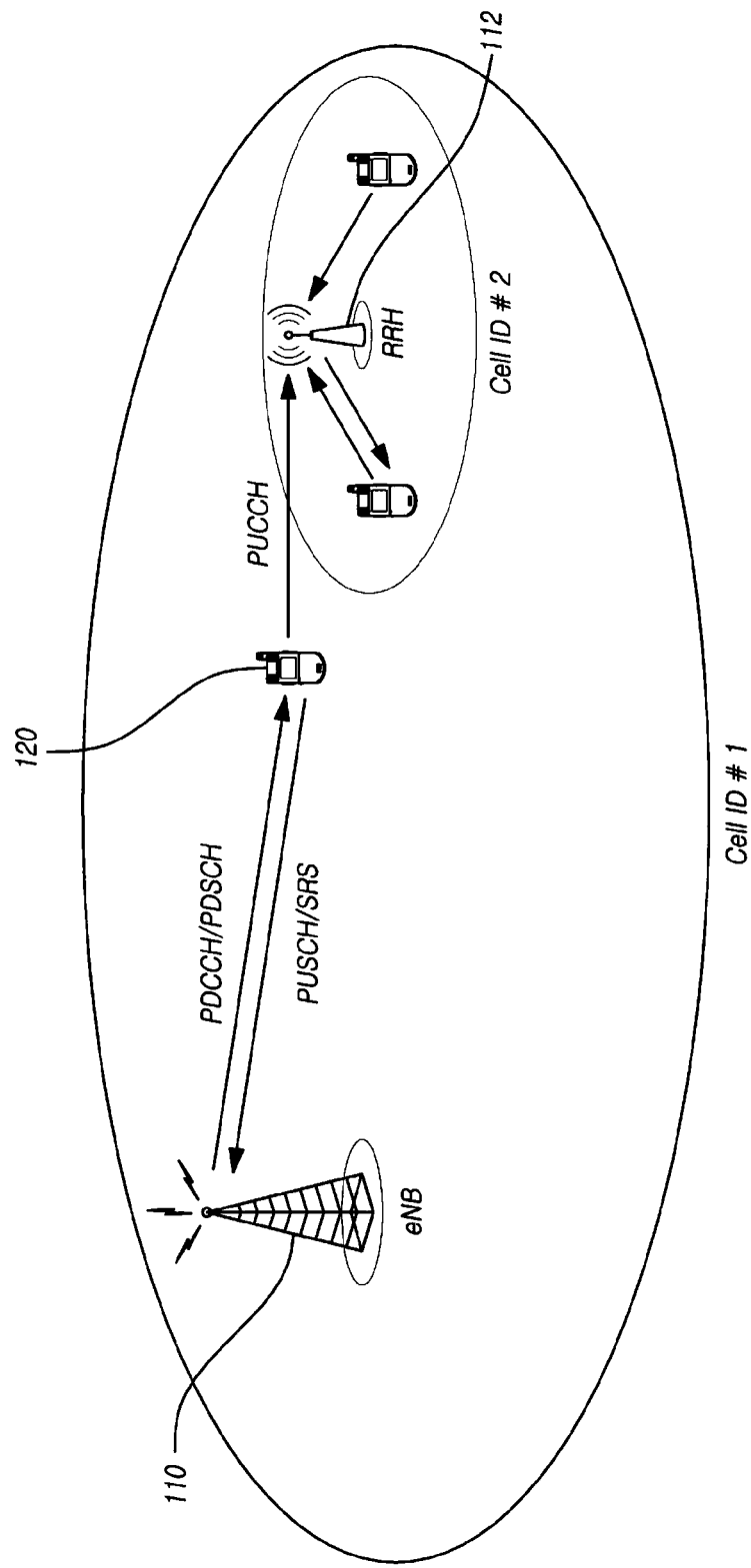
FIG. 12 illustrates transmitting an SRS to a serving transmission/reception point when PUCCH is transmitted to a transmission/reception point other than the serving transmission/reception point, in a CoMP environment in which transmission/reception points use different cell identities (e.g., cell ID #1 and cell ID #2)

FIG. 12 illustrates transmitting an SRS to a serving transmission/reception point when PUCCH is transmitted to a transmission/reception point other than the serving transmission/reception point, in a CoMP environment in which transmission/reception points use different cell identities (e.g., cell ID #1 and cell ID #2).

Figure 13:
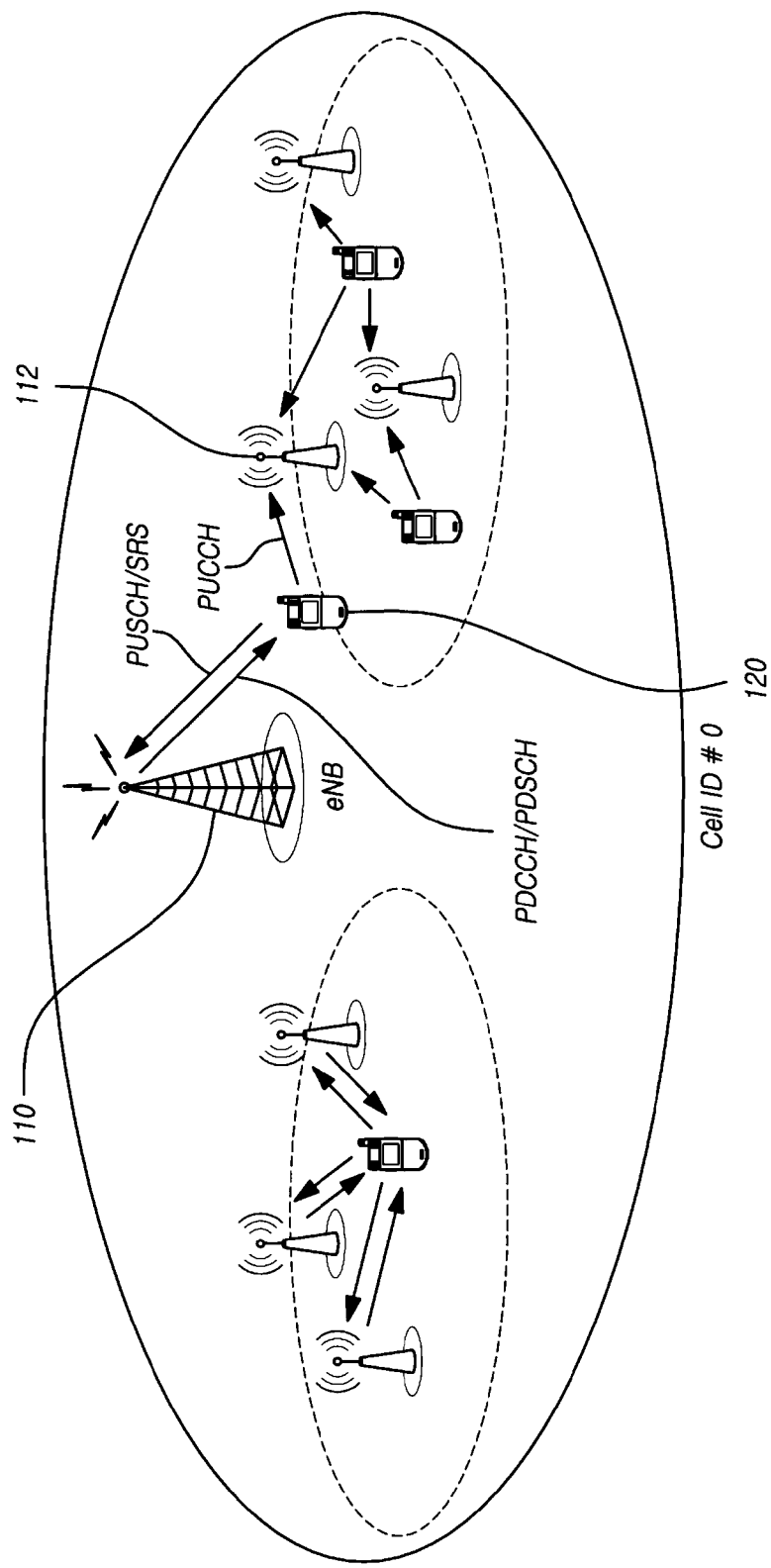
FIG. 13 illustrates transmitting an SRS to a serving transmission/reception point when PUCCH is transmitted to a transmission/reception point other than the serving transmission/reception point, in a CoMP environment in which transmission/reception points use the same cell identity (e.g., cell ID #0)

FIG. 13 illustrates transmitting an SRS to a serving transmission/reception point when PUCCH is transmitted to a transmission/reception point other than the serving transmission/reception point, in a CoMP environment in which transmission/reception points use the same cell identity (e.g., cell ID #0).

Referring to FIG. 12 and FIG. 13, in the case that DM-RS identity of PUCCH is defined to indicate a transmission/reception point different from a serving transmission/reception point, the SRS may be transmitted to the serving transmission/reception point. Accordingly, the SRS and PUCCH may be separately transmitted.

Figure 14:
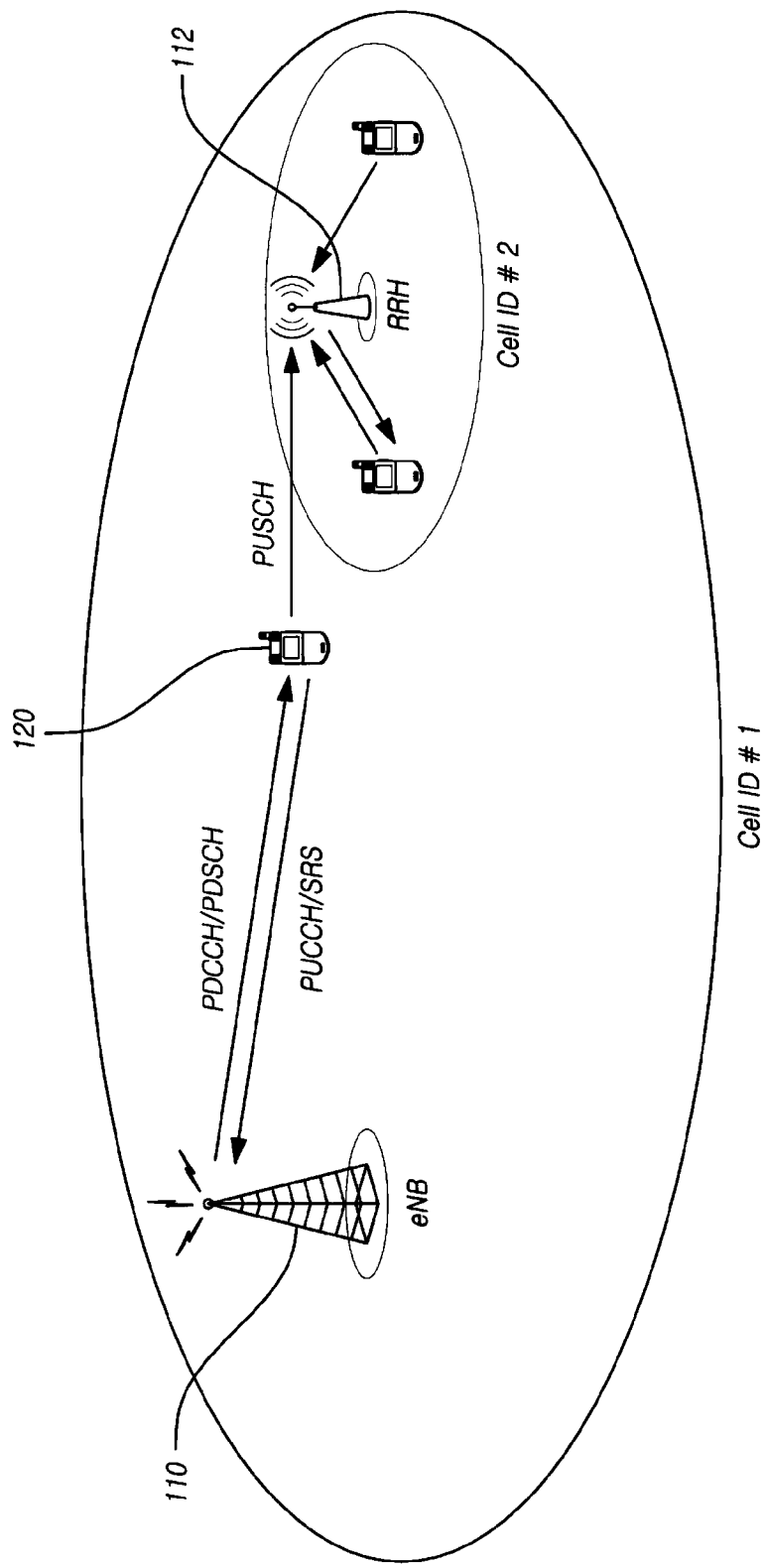
FIG. 14 illustrates transmitting an SRS to a serving transmission/reception point when PUSCH is transmitted to a transmission/reception point other than the serving transmission/reception point, in a CoMP environment in which transmission/reception points use different cell identities (e.g., cell ID #1 and cell ID #2)

FIG. 14 illustrates transmitting an SRS to a serving transmission/reception point when PUSCH is transmitted to a transmission/reception point other than the serving transmission/reception point, in a CoMP environment in which transmission/reception points use different cell identities (e.g., cell ID #1 and cell ID #2).

Figure 15:
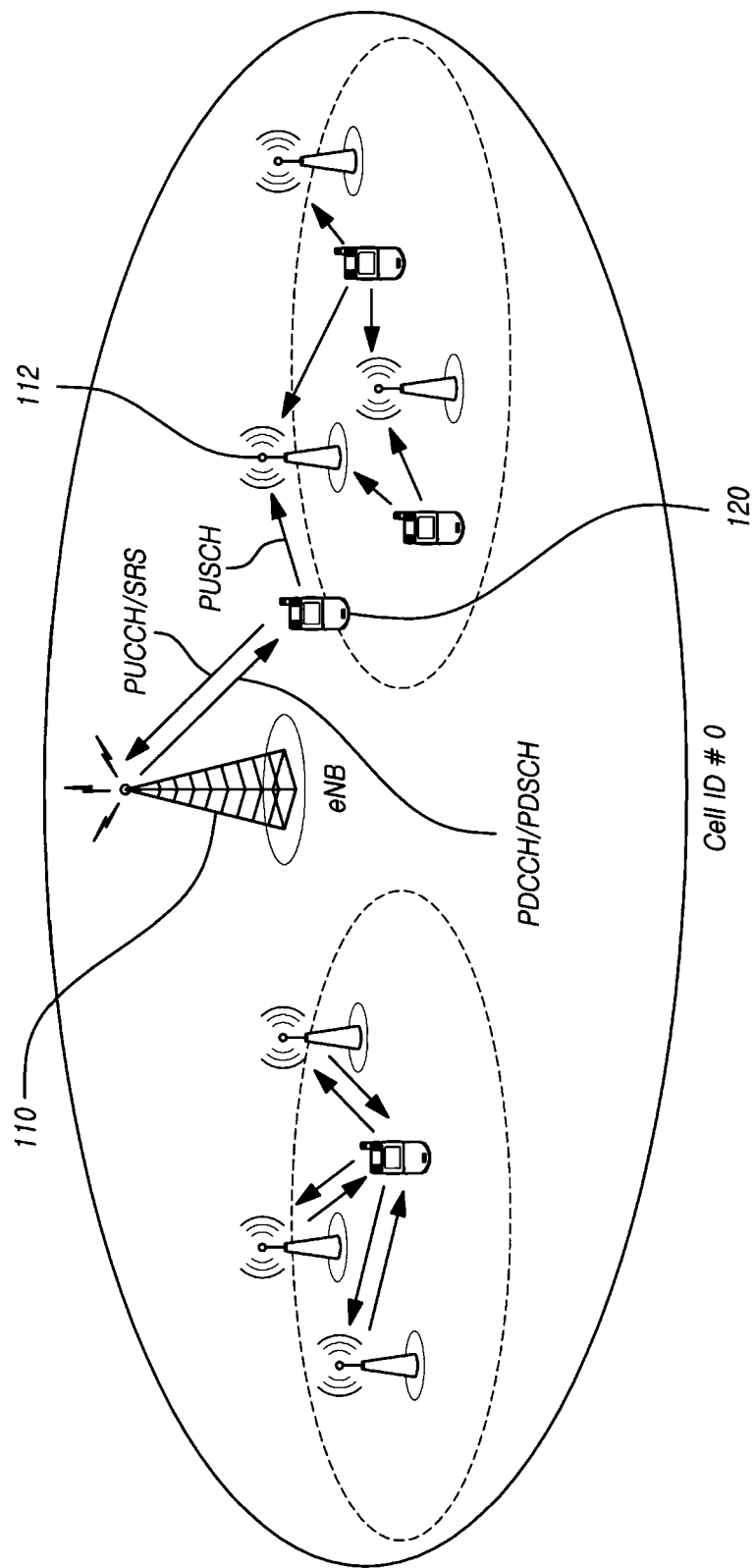
FIG. 15 illustrates transmitting an SRS to a serving transmission/reception point when PUSCH is transmitted to a transmission/reception point other than the serving transmission/reception point, in a CoMP environment in which transmission/reception points use the same cell identity (e.g., cell ID #0)

FIG. 15 illustrates transmitting an SRS to a serving transmission/reception point when PUSCH is transmitted to a transmission/reception point other than the serving transmission/reception point, in a CoMP environment in which transmission/reception points use the same cell identity (e.g., cell ID #0).

Referring to FIG. 14 and FIG. 15, in the case that DM-RS identity of PUSCH is defined to indicate a transmission/reception point different from the serving transmission/reception point, the SRS may be transmitted to the serving transmission/reception point. Accordingly, the SRS and PUSCH may be separately transmitted.

Figure 16:
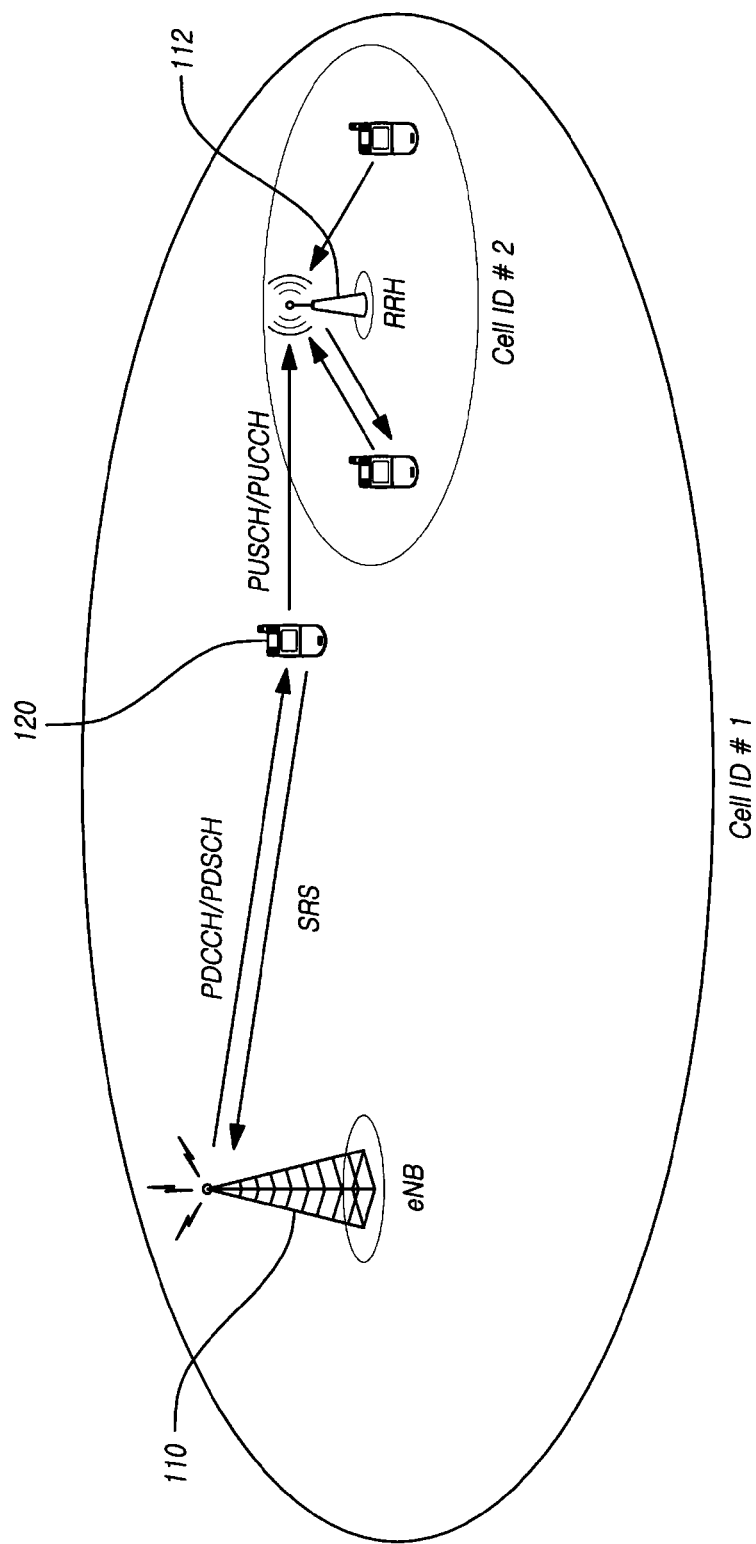
FIG. 16 illustrates transmitting an SRS to a serving transmission/reception point when PUSCH and PUCCH are transmitted to a transmission/reception point other than the serving transmission/reception point, in a CoMP environment in which transmission/reception points use different cell identities (e.g., cell ID #1 and cell ID #2)

FIG. 16 illustrates transmitting an SRS to a serving transmission/reception point when PUSCH and PUCCH are transmitted to a transmission/reception point other than the serving transmission/reception point, in a CoMP environment in which transmission/reception points use different cell identities (e.g., cell ID #1 and cell ID #2).

Figure 17:
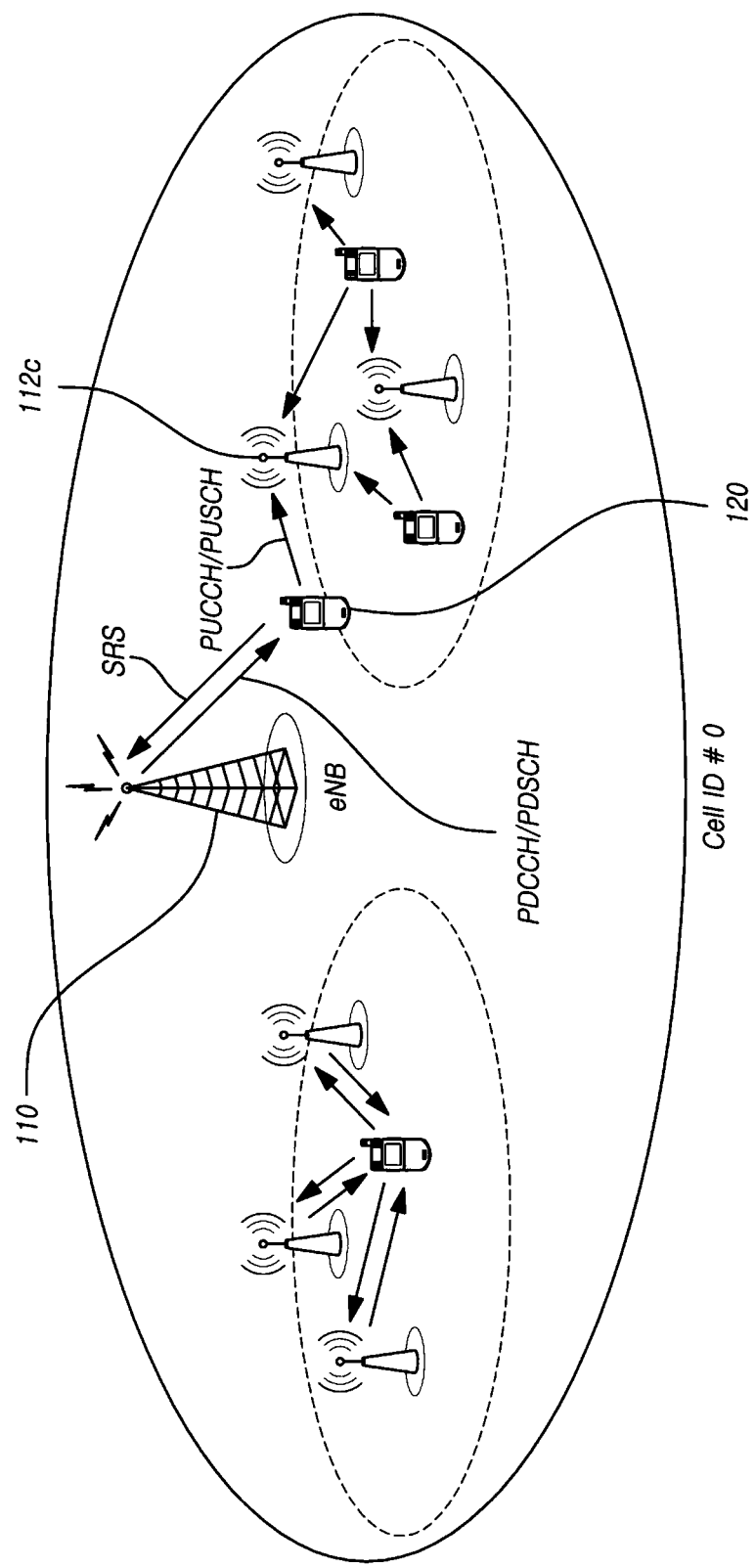
FIG. 17 illustrates transmitting an SRS to a serving transmission/reception point when PUSCH and PUCCH are transmitted to a transmission/reception point other than the serving transmission/reception point, in a CoMP environment in which transmission/reception points use the same cell identity (e.g., cell ID #0)

FIG. 17 illustrates transmitting an SRS to a serving transmission/reception point when PUSCH and PUCCH are transmitted to a transmission/reception point other than the serving transmission/reception point, in a CoMP environment in which transmission/reception points use the same cell identity (e.g., cell ID #0).

Referring to FIG. 16 and FIG. 17, in the case that DM-RS identities of PUSCH and PUCCH are defined to indicate a transmission/reception point different from a serving transmission/reception point, the SRS may be transmitted to the serving transmission/reception point. Accordingly, the SRS and PUSCH/PUCCH may be separately transmitted.

In an SRS transmission method as described in FIG. 11, an SRS generated based on a physical cell identity of a serving transmission/reception point may be at least one of a periodic SRS and an aperiodic SRS. Accordingly, the periodic SRS and the aperiodic SRS may be transmitted to the serving transmission/reception point, independently from an uplink channel. In at least one embodiment, one of the periodic SRS and the aperiodic SRS may be generated using the cell identity of the serving transmission/reception point, and the other SRS may be generated using an uplink reference signal identity.

That is, a sequence group number and a base sequence number of an aperiodic SRS sequence may be defined according to a sequence configuration of PUCCH or PUSCH. However, a sequence group number and a base sequence number of the periodic SRS sequence may be defined such that the periodic SRS is transmitted to the serving transmission/reception point.

In other words, an aperiodic SRS may be generated using a reference signal identity $n_{ID}^{RS}$ associated with PUCCH or a reference signal identity $n_{ID}^{RS'}$ associated with PUSCH, as described in Formula 1 to Formula 6. Meanwhile, a periodic SRS may be generated using a cell ID $N_{ID}^{cell}$. Hereinafter, a variety of embodiments for such SRS generation will be described with reference to FIG. 18 and FIG. 19.

Figure 18:
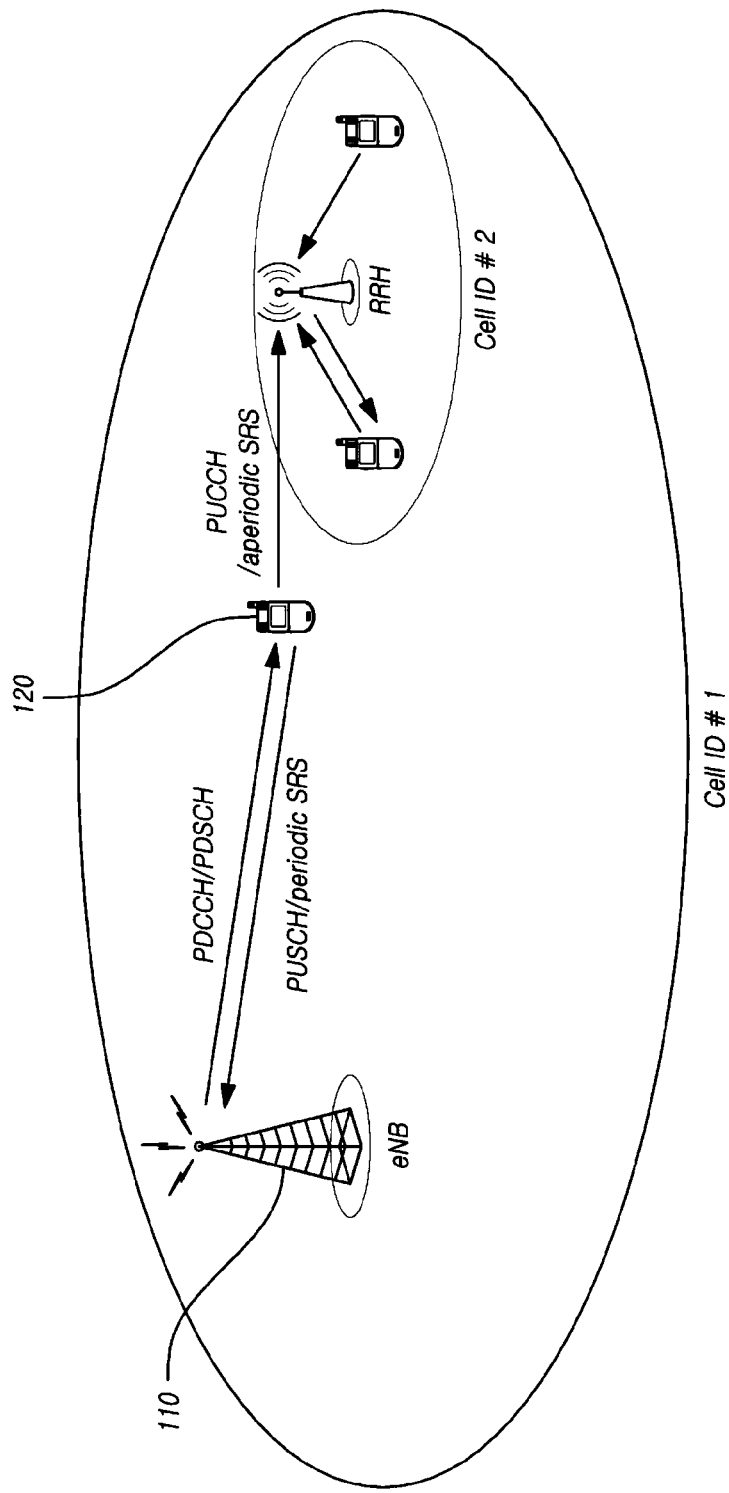
FIG. 18 illustrates transmitting a periodic SRS to a serving transmission/reception point and transmitting an aperiodic SRS in association with PUCCH when the PUCCH is transmitted to a transmission/reception point other than the serving transmission/reception point, in a CoMP environment in which transmission/reception points use different cell identities (e.g., cell ID #1 and cell ID #2)

FIG. 18 illustrates transmitting a periodic SRS to a serving transmission/reception point and transmitting an aperiodic SRS in association with PUCCH when the PUCCH is transmitted to a transmission/reception point other than the serving transmission/reception point, in a CoMP environment in which transmission/reception points use different cell identities (e.g., cell ID #1 and cell ID #2).

Figure 19:
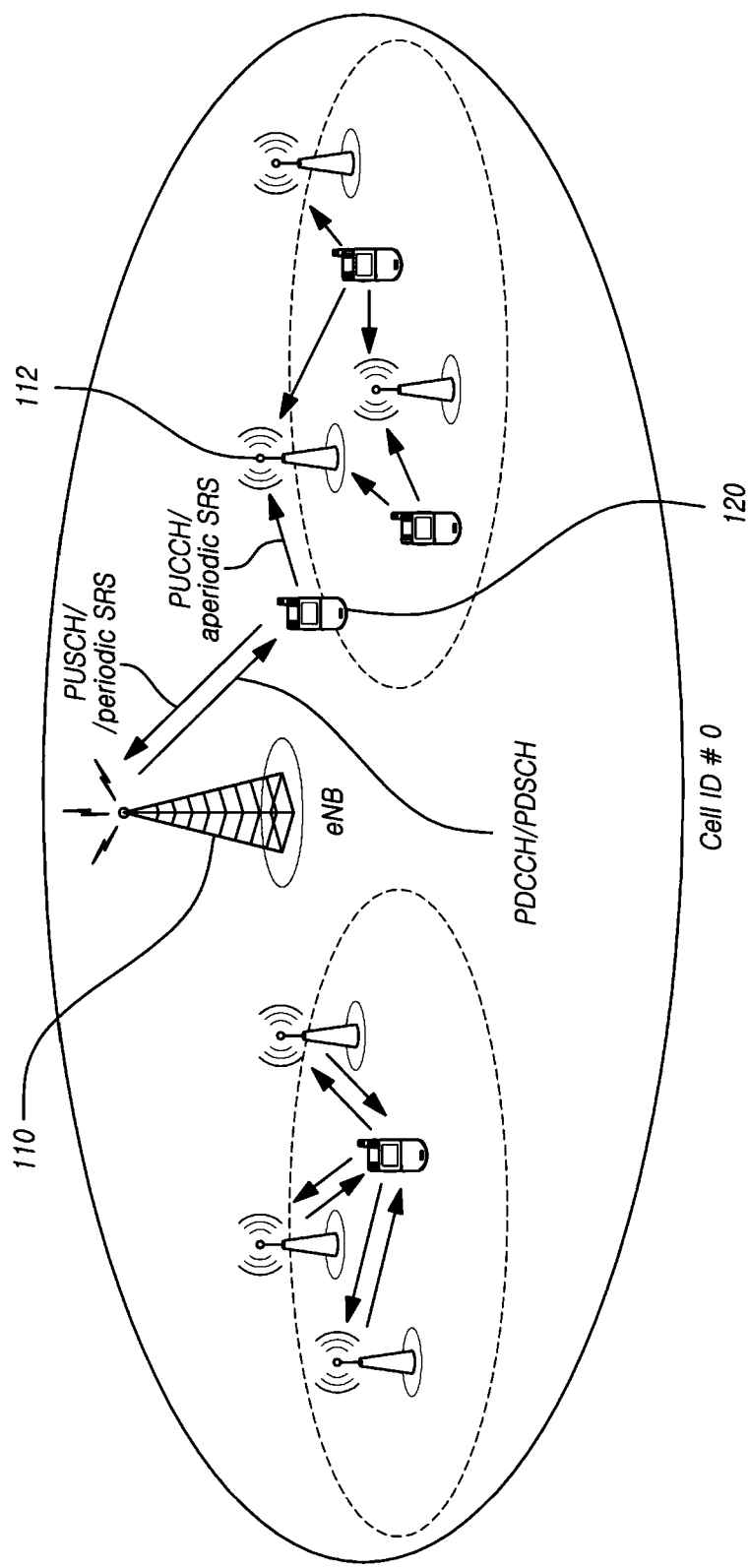
FIG. 19 illustrates transmitting a periodic SRS to a serving transmission/reception point and transmitting an aperiodic SRS in association with PUCCH when the PUCCH is transmitted to a transmission/reception point other than the serving transmission/reception point, in a CoMP environment in which transmission/reception points use the same cell identity (e.g., cell ID #0)

FIG. 19 illustrates transmitting a periodic SRS to a serving transmission/reception point and transmitting an aperiodic SRS in association with PUCCH when the PUCCH is transmitted to a transmission/reception point other than the serving transmission/reception point, in a CoMP environment in which transmission/reception points use the same cell identity (e.g., cell ID #0).

As described in FIG. 18 and FIG. 19, the periodic SRS may be transmitted to the serving transmission/reception point, and the aperiodic SRS may be transmitted in association with the PUCCH, but the present invention is not limited thereto. On the contrary, the aperiodic SRS may be transmitted to the serving transmission/reception point, and the periodic SRS may be transmitted in association with the PUCCH. In some embodiments of the present invention, the aperiodic SRS or the periodic SRS may be associated with PUSCH other than the PUCCH.

Referring to FIG. 11, FIG. 18, and FIG. 19, in an SRS generation procedure of step S1120, one of a periodic SRS and an aperiodic SRS may be generated using a physical cell identity of a serving transmission/reception point (e.g., eNB 110), and the other SRS may be generated using an uplink reference signal identity. In an SRS transmission procedure of S1140, one of the periodic SRS and the aperiodic SRS may be transmitted to the serving transmission/reception point (e.g., eNB 110), and the other SRS may be transmitted to a transmission/reception point (e.g., RRH 112) indicated by the uplink reference signal identity.

Referring back to FIG. 11, at step S1110, eNB 110 corresponding to a certain transmission/reception point may transmit UE-specific configuration information to user equipment 120 belonging to eNB 110. Accordingly, user equipment 120 may receive the UE-specific configuration information at step S1110.

The UE-specific configuration information may include UE-specific parameters which are specifically determined for user equipment 120 belonging to eNB 110. For example, the UE-specific configuration information may include UE-specific parameters indicating a reference signal identity $n_{ID}^{RS}$ associated with PUCCH and a reference signal identity $n_{ID}^{RS'}$ associated with PUSCH. Herein, the reference signal identity $n_{ID}^{RS}$ associated with the PUCCH may be used to determine a UE-specific PUCCH sequence and a UE-specific reference signal sequence associated with the PUCCH. The reference signal identity $n_{ID}^{RS'}$ associated with PUSCH may be used to determine a UE-specific PUSCH sequence and a UE-specific reference signal sequence associated with the PUSCH. UE-specific parameters indicating the reference signal identities $n_{ID}^{RS}$ and $n_{ID}^{RS'}$ associated with PUCCH/PUSCH may be different from a cell-specific parameter indicating a cell ID ($N_{ID}^{cell}$) of a cell to which user equipment 120 belongs.

eNB 110 may dynamically transmit the UE-specific configuration information to user equipment 120 through PDCCH/EPDCCH. Herein, the UE-specific configuration information may include UE-specific parameters indicating a reference signal identity $n_{ID}^{RS}$ associated with PUCCH and a reference signal identity $n_{ID}^{RS'}$ associated with PUSCH. Alternatively, the UE-specific configuration information may be determined semi-statically by higher layers such as RRC layer, or be determined in advance through RRC. In this case, eNB 110 may provide indication information for use of the pre-determined UE-specific configuration information, through PDCCH/EPDCCH.

For each of PUCCH and PUSCH, user equipment 120 may generate a base sequence for each of a reference signal associated with PUCCH and/or a reference signal associated with PUSCH, using UE-specific configuration information. Herein, the UE-specific configuration information may include a reference signal identity $n_{ID}^{RS}$ associated with PUCCH and/or a reference signal identity $n_{ID}^{RS'}$ associated with PUSCH. For example, in each case of PUSCH and PUCCH, user equipment 120 may generate base sequences $\bar{r}_{u,v}(n)$ for DM-RS. Such base sequences (e.g., a base sequence for PUSCH and a base sequence for PUCCH) may be differently generated according to a sequence group number u and a base sequence number v within a corresponding sequence group. The reference signal identity $n_{ID}^{RS}$ associated with the PUCCH and/or the reference signal identity $n_{ID}^{RS'}$ associated with the PUSCH may be used in place of a cell ID $N_{ID}^{cell}$ to determine the sequence group number u and the base sequence number v within the corresponding sequence group.

At step S1130, user equipment 120 may transmit a DM-RS through an assigned radio resource to a transmission/reception point (e.g., RRH 112) indicated by the reference signal identity $n_{ID}^{RS}$ associated with the PUCCH or the reference signal identity $n_{ID}^{RS'}$ associated with the PUSCH. Herein, the DM-RS may be generated using a base sequence, a cyclic shift, and an orthogonal code (or an orthogonal cover code). In case of an uplink DM-RS associated with PUCCH or PUSCH, user equipment 120 may transmit the uplink DM-RS using a maximum of three symbols per slot.

In addition, at step S1130, user equipment 120 may transmit PUCCH through the same frequency band as a frequency band assigned for an uplink DM-RS associated with the PUCCH. Furthermore, at step S1130, user equipment 120 may transmit PUSCH through the same frequency band as a frequency band assigned for an uplink DM-RS associated with the PUSCH. Only RRH 112 corresponding to a transmission/reception point capable of receiving DM-RS among transmission/reception points may receive the PUCCH or PUSCH using the received DM-RS.

At step S1120, user equipment 120 may generate an SRS using UE-specific configuration information including cell ID $N_{ID}^{cell}$ of a serving transmission/reception point such that a receiving subject of the SRS is the serving transmission/reception point regardless of configuration of a reception point for PUSCH or PUCCH. An SRS generation procedure described at step S1120 may be substantially the same as an SRS generation procedure (step S420) of Embodiment 1 described with reference to FIG. 4, except that the cell ID $N_{ID}^{cell}$ of the serving transmission/reception point is used when generating the SRS according to Formula 1 to Formula 6.

At step S1120, SRS sequence may be generated by Formula 1 using a base sequence defined by Formula 2 and a cyclic shift (CS) $\alpha_{\bar{p}}$ defined by Formula 6. Such SRS sequence generation procedure (S1120) may be performed by OFDM modulator 2010 shown in FIG. 20.

At step S1140, user equipment 120 may assign radio resources for SRS transmission, and transmit the generated SRS (S1120) through the assigned radio resources, to a transmission/reception point (e.g., eNB 110) indicated by $N_{ID}^{cell}$.

At step S1140, DM-RS sequences generated by Formula 1 may be mapped to corresponding symbols of a subframe. Such operation of S1140 may be performed through resource element mapper 2020 shown in FIG. 20.

As shown in FIG. 21 and FIG. 22, an SRS may be transmitted by the last symbol of a subframe. A sufficiently wideband SRS transmission may be performed such that channel quality of an entire frequency band of interest can be estimated with a single SRS transmission. Alternatively, a sequence of SRS transmissions may jointly cover the entire frequency band of interest, by transmitting a narrowband SRS using hopping in the frequency domain.

As described above, when the SRS is mapped to resource elements, SC-FDMA symbols may be generated by a SC-FDMA generator (not shown in FIG. 20). SRS signals corresponding to the generated SC-FDMA symbols may be transmitted to a corresponding transmission/reception point.

In Embodiment 2 described above, in the case that reception points of PUCCH or PUSCH are determined as a transmission/reception points different from a serving transmission/reception point, a receiving subject of an SRS may be determined as the serving transmission/reception point. That is, the SRS may be transmitted in a state that an association relation between the SRS and the PUCCH/

PUSCH is released. Such transmission of the SRS may allow for estimation of an uplink channel state of the serving transmission/reception point. Meanwhile, the PUCCH or PUSCH may be transmitted to a transmission/reception point different from the serving transmission/reception point such that MU-MIMO can be applied to secure channel reliability and to improve an uplink transmission speed. Herein, the different transmission/reception point may have a comparatively higher geometry. Accordingly, it may be possible to overcome a shortage of uplink coverage and to increase an uplink transmission speed.

As described in Embodiment 1 and Embodiment 2, in the case of transmitting a periodic SRS and/or an aperiodic SRS, an SRS sequence may be defined independently from the PUCCH and/or the PUSCH. In the case that receiving subjects of the PUCCH and/or the PUSCH are not a serving transmission/reception point, an SRS sequence may be defined such that a receiving subject of the SRS is the serving transmission/reception point.

In some embodiments different from Embodiment 1 and Embodiment 2, in the case of transmitting a periodic SRS and/or an aperiodic SRS, a sequence group number and a base sequence number of an SRS sequence for SRS generation may be generated in association with a PUCCH sequence or a PUSCH sequence.

Hereinafter, a transmission procedure of an uplink reference signal will be priorly described in order to explain a procedure transmitting an SRS in association with PUCCH or PUSCH.

Figure 23:
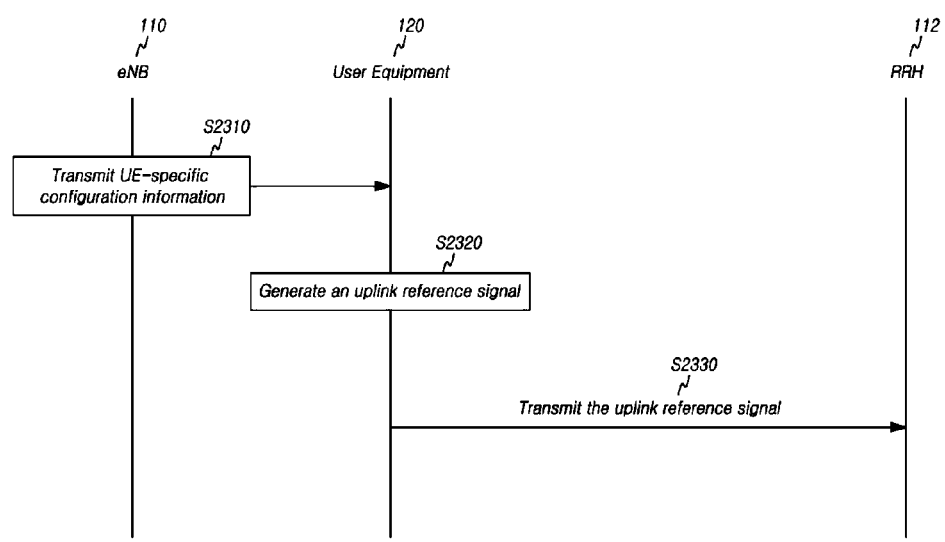
FIG. 23 is a flowchart illustrating a method of transmitting an uplink reference signal in accordance with at least one embodiment.

FIG. 23 is a flowchart illustrating a method of transmitting an uplink reference signal in user equipment in accordance with at least one embodiment.

Referring to FIG. 23, at step S2310, user equipment 120 may receive UE-specific configuration information indicating an uplink reference signal identity from one transmission/reception point (e.g., eNB 110) of a plurality of different transmission/reception points. Herein, the uplink reference signal identity may be independent of a physical cell identity of the one transmission/reception point (e.g., eNB 110) and be associated with an uplink channel. At step S2320, user equipment 120 may generate an uplink reference signal associated with the uplink channel, using the uplink reference signal identity. At step S2330, user equipment 120 may transmit the generated uplink reference signal to a transmission/reception point (e.g., RRH 112) indicated by the uplink reference signal identity.

In the above-described method of transmitting an uplink reference signal, the uplink reference signal may be a DM-RS for demodulation of a physical uplink channel. Herein, the physical uplink channel may be at least one of PUCCH and PUSCH.

According to an uplink reference signal transmission method described in FIG. 23, an uplink reference signal may be generated from an uplink reference signal identity. Herein, the uplink reference signal identity may be independent of a physical cell identity of a transmission/reception point (e.g., eNB 110) performing a downlink channel transmission to user equipment 120. Accordingly, a receiving subject of the uplink reference signal transmitted by user equipment 120 may be determined as a transmission/reception point (e.g., RRH 112) other than the transmission/reception point (e.g., eNB 110) performing a downlink channel transmission. In at least one embodiment, even though not shown in FIG. 4, as long as a receiving subject of an uplink reference signal is necessary to be independently determined, the receiving subject of the uplink reference signal may be the transmission/reception point (e.g., eNB 110) performing a downlink channel transmission.

When an uplink reference signal is generated from an independent uplink reference signal identity as described in FIG. 23, an SRS may also be generated from the same uplink reference signal identity.

As described above, when an uplink reference signal sequence and an SRS sequence are generated from the same uplink reference signal identity, receiving subjects of these sequences may be the same by establishing an association relation between a physical uplink channel and an SRS. That is, the SRS may be transmitted in association with the uplink channel.

As described above, the SRS may include at least one of a periodic SRS and an aperiodic SRS.

According to an uplink reference signal transmission method described in FIG. 23, receiving subjects of an uplink reference signal may be variously changed. In case of transmitting an SRS associated with such uplink reference signal, periodic or aperiodic SRSs may be associated with a physical uplink channel, i.e., PUCCH or PUSCH. In this case, a variety of embodiments may be present.

Hereinafter, a method of transmitting an SRS associated with an uplink reference signal as shown in FIG. 23 will be described according to each of Embodiment 3 and Embodiment 4 below.

Embodiment 3: Association with PUCCH

Embodiment 3 may represent a case in which a physical uplink channel is PUCCH. In other words, in Embodiment 3, an SRS may be transmitted in association with PUCCH. Embodiment 4 may represent a case in which a physical uplink channel is PUSCH. In other words, in Embodiment 4, an SRS may be transmitted in association with PUSCH.

Figure 24:
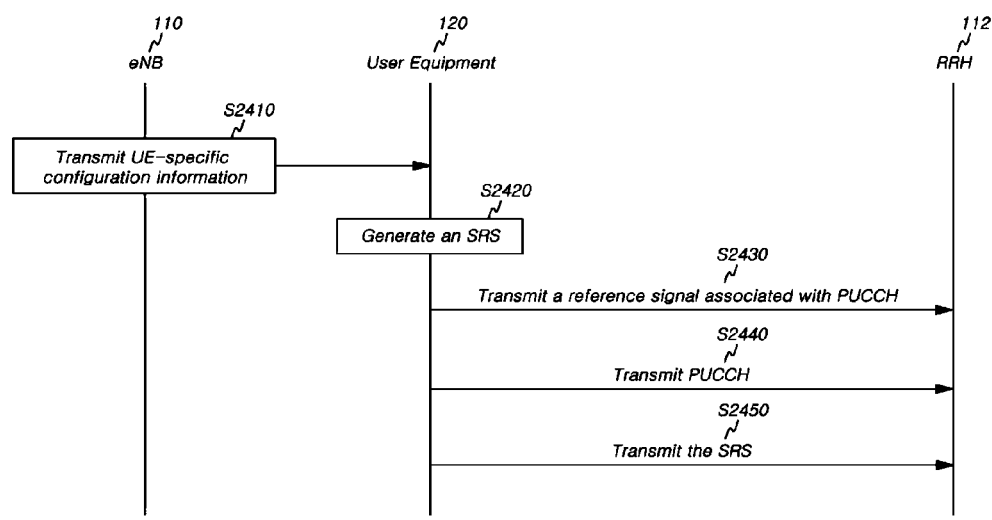
FIG. 24 is a flowchart illustrating a method of transmitting an SRS associated with PUCCH in accordance with at least one embodiment.

FIG. 24 is a flowchart illustrating a method of transmitting an SRS associated with PUCCH in accordance with at least one embodiment. In an SRS transmission method described in FIG. 24, an SRS may be transmitted in association with an uplink reference signal. Accordingly, the flowchart shown in FIG. 24 may include a transmission procedure transmitting an uplink reference signal and a physical uplink channel associated with the uplink reference signal as shown in FIG. 23.

Referring to FIG. 24, at step S2410 in an SRS transmission method according to Embodiment 3, user equipment 120 may receive UE-specific configuration information indicating an uplink reference signal identity from one transmission/reception point (e.g., eNB 110) of a plurality of different transmission/reception points. Herein, the uplink reference signal identity may be independent of a physical cell identity of the one transmission/reception point (e.g., eNB 110) and be associated with PUCCH. At step S2420, user equipment 120 may generate at least a portion of an SRS (i.e., all or a portion of an SRS), using the uplink reference signal identity. At step S2430, user equipment 120 may transmit a reference signal associated with the PUCCH, to a transmission/reception point (e.g., RRH 112) indicated by the uplink reference signal identity. At step S2440, user equipment 120 may transmit PUCCH to the transmission/reception point (e.g., RRH 112) indicated by the uplink reference signal identity. At step S2450, user equipment 120 may transmit the generated SRS to the transmission/reception point (e.g., RRH 112) indicated by the uplink reference signal identity.

In FIG. 24, steps S2430 and S2440 may be simultaneously performed. The SRS and the PUCCH may be transmitted together in one subframe.

According to Embodiment 3 shown in FIG. 24, a reception point of PUCCH may be determined as a transmission/reception point different from a serving transmission/reception point to which user equipment belongs. That is, a PUCCH transmission to the different transmission/reception points may performed by defining a UE-specific PUCCH sequence and a UE-specific reference signal sequence associated with the PUCCH when PUCCH sequence and a reference signal sequence associated with the PUCCH sequence are generated. In this case, a periodic SRS or an aperiodic SRS may be defined according to a sequence configuration for PUCCH and a reference signal associated with the PUCCH. Accordingly, the PUCCH and an SRS may be transmitted to the same target transmission/reception point through an uplink.

FIG. 25 to FIG. 30 illustrate a variety of embodiments transmitting at least a portion of an SRS associated with PUCCH, according to an SRS transmission method shown in FIG. 24.

Figure 25:
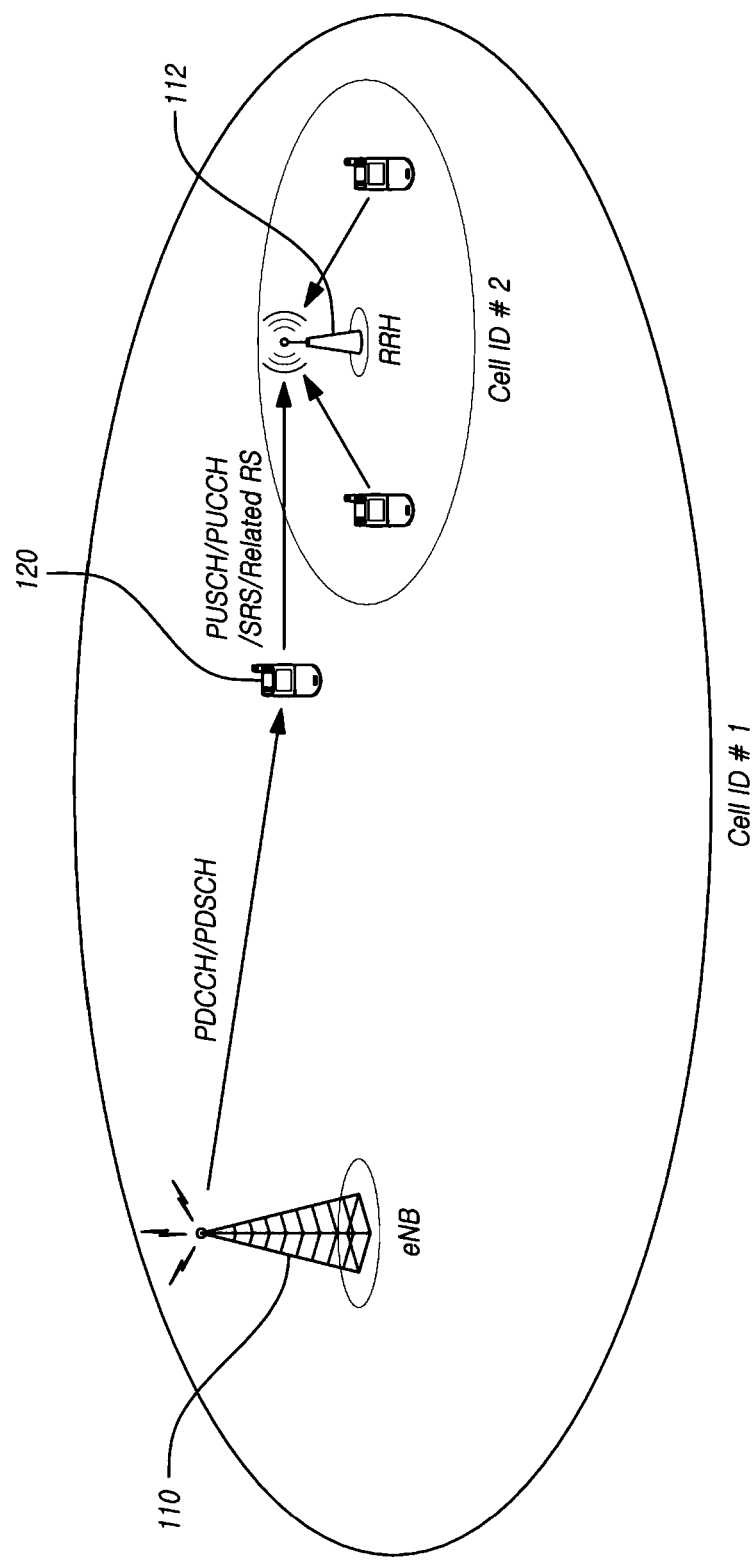
FIG. 25 illustrates transmitting all uplink-related channels to a transmission/reception point different from a serving transmission/reception point to which user equipment belongs, in a CoMP environment in which transmission/reception points use different cell identities (e.g., cell ID #1 and cell ID #2)

FIG. 25 illustrates transmitting all uplink-related channels to a transmission/reception point different from a serving transmission/reception point to which user equipment belongs, in a CoMP environment in which transmission/reception points use different cell identities (e.g., cell ID #1 and cell ID #2).

Figure 26:
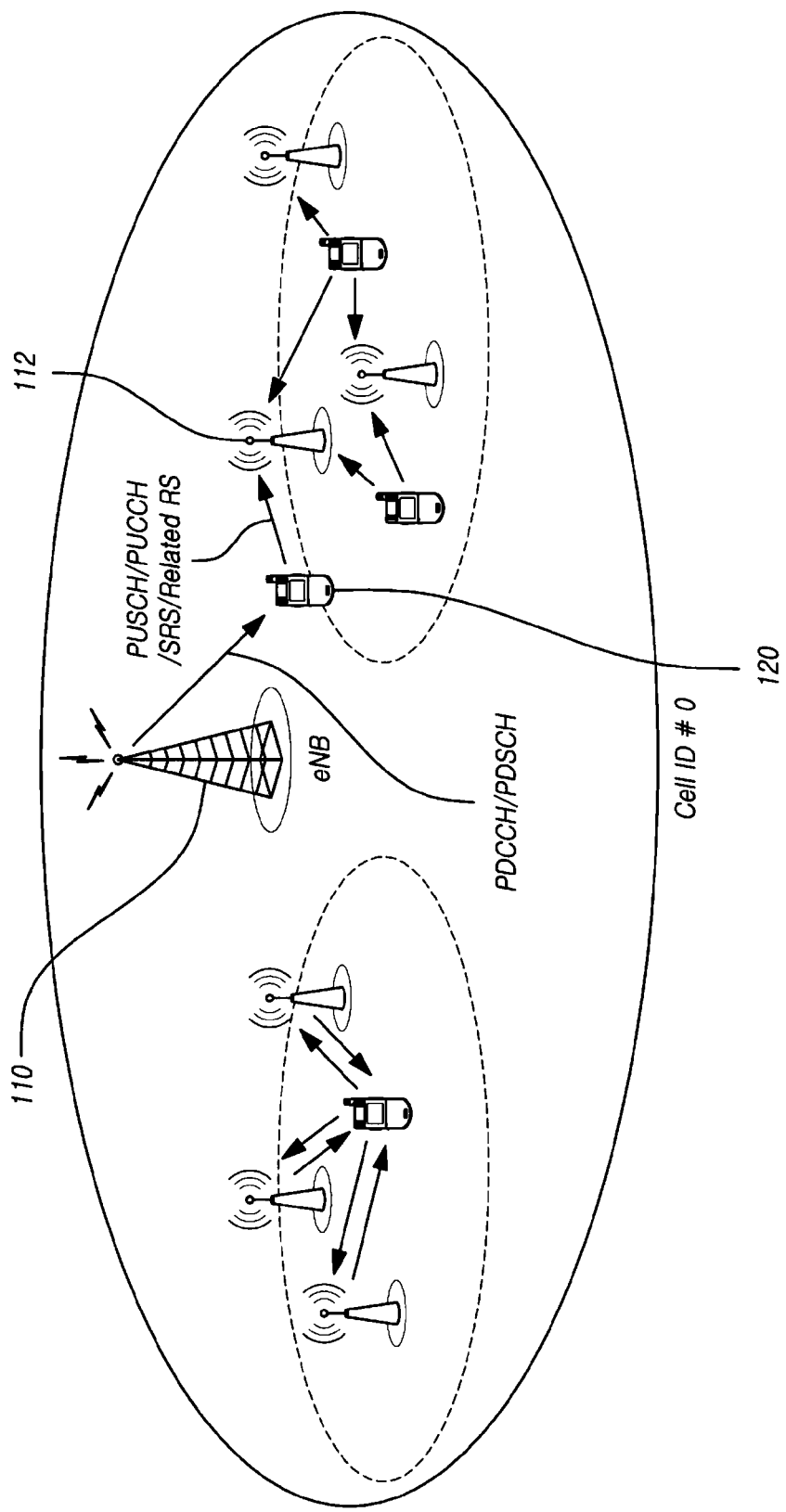
FIG. 26 illustrates transmitting all uplink-related channels to a transmission/reception point different from a serving transmission/reception point to which user equipment belongs, in a CoMP environment in which transmission/reception points use the same cell identity (e.g., cell ID #0)

FIG. 26 illustrates transmitting all uplink-related channels to a transmission/reception point different from a serving transmission/reception point to which user equipment belongs, in a CoMP environment in which transmission/reception points use the same cell identity (e.g., cell ID #0).

Referring to FIG. 25 and FIG. 26, an SRS and PUCCH may be transmitted to the same transmission/reception point due to association between the SRS and the PUCCH. When PUCCH and PUSCH are transmitted to a transmission/reception points (e.g., RRH 112) different from a serving transmission/reception point (e.g., eNB 110) to which user equipment 120 belongs, an SRS of user equipment 120 may be transmitted along with the PUCCH and the PUSCH, to the different transmission/reception point (e.g., RRH 112). Herein, the different transmission/reception points (e.g., RRH 112) may have a comparatively higher geometry and a comparatively better channel quality. Accordingly, all uplink channels (e.g., PUCCH. PUSCH, and SRS) may be transmitted to the different transmission/reception points (e.g., RRH 112).

Figure 27:
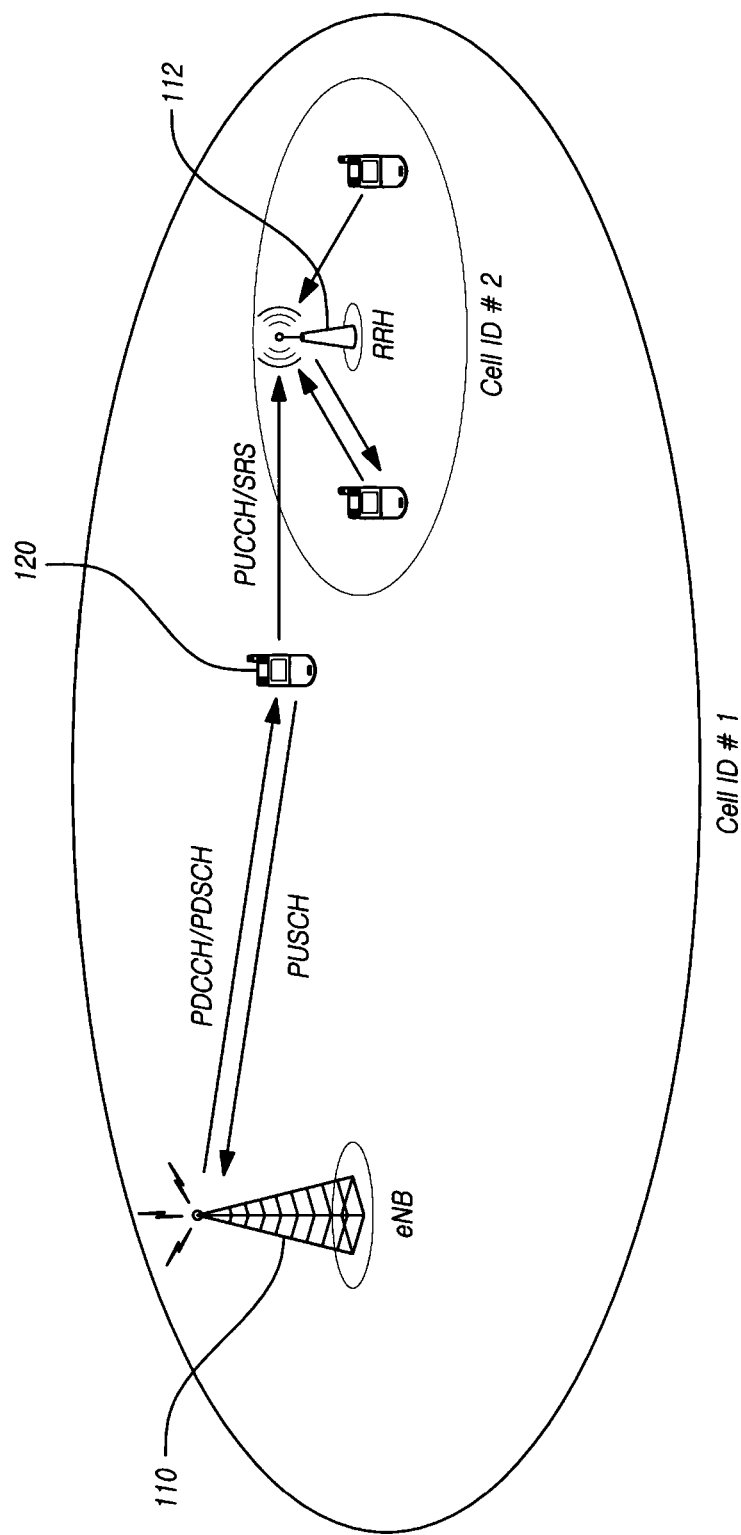
FIG. 27 illustrates transmitting an SRS in association with PUCCH, in a CoMP environment in which transmission/reception points use different cell identities (e.g., cell ID #1 and cell ID #2)

FIG. 27 illustrates transmitting an SRS in association with PUCCH, in a CoMP environment in which transmission/reception points use different cell identities (e.g., cell ID #1 and cell ID #2).

Figure 28:
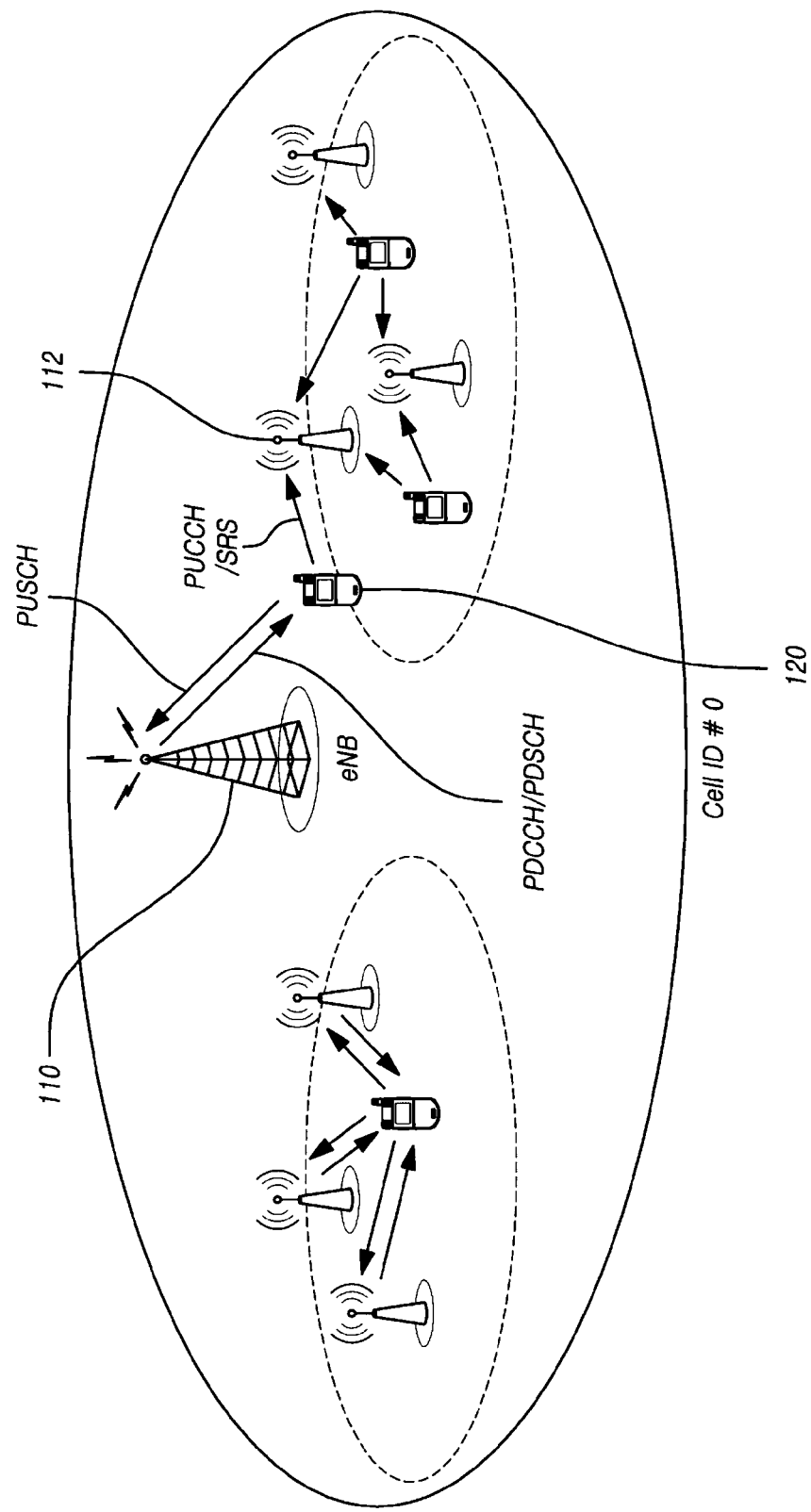
FIG. 28 illustrates transmitting an SRS in association with PUCCH, in a CoMP environment in which transmission/reception points use the same cell identity (e.g., cell ID #0)

FIG. 28 illustrates transmitting an SRS in association with PUCCH, in a CoMP environment in which transmission/reception points use the same cell identity (e.g., cell ID #0).

Referring to FIG. 27 and FIG. 28, a physical downlink control channel (PDCCH) and a physical downlink shared channel (PDSCH) may be received from a serving transmission/reception point (e.g., eNB 110) to which user equipment 120 belongs. PUSCH may be transmitted to the serving transmission/reception point (e.g., eNB 110) to which user equipment 120 belongs. PUCCH and an SRS may be transmitted to a transmission/reception point (e.g., RRH 112) different from the serving transmission/reception point (e.g., eNB 110) to which user equipment 120 belongs. Herein, the PUCCH corresponding to one of uplink channels may transmit ACK/NACK corresponding to a response to a downlink transmission, channel state information, and so forth.

Figure 29:
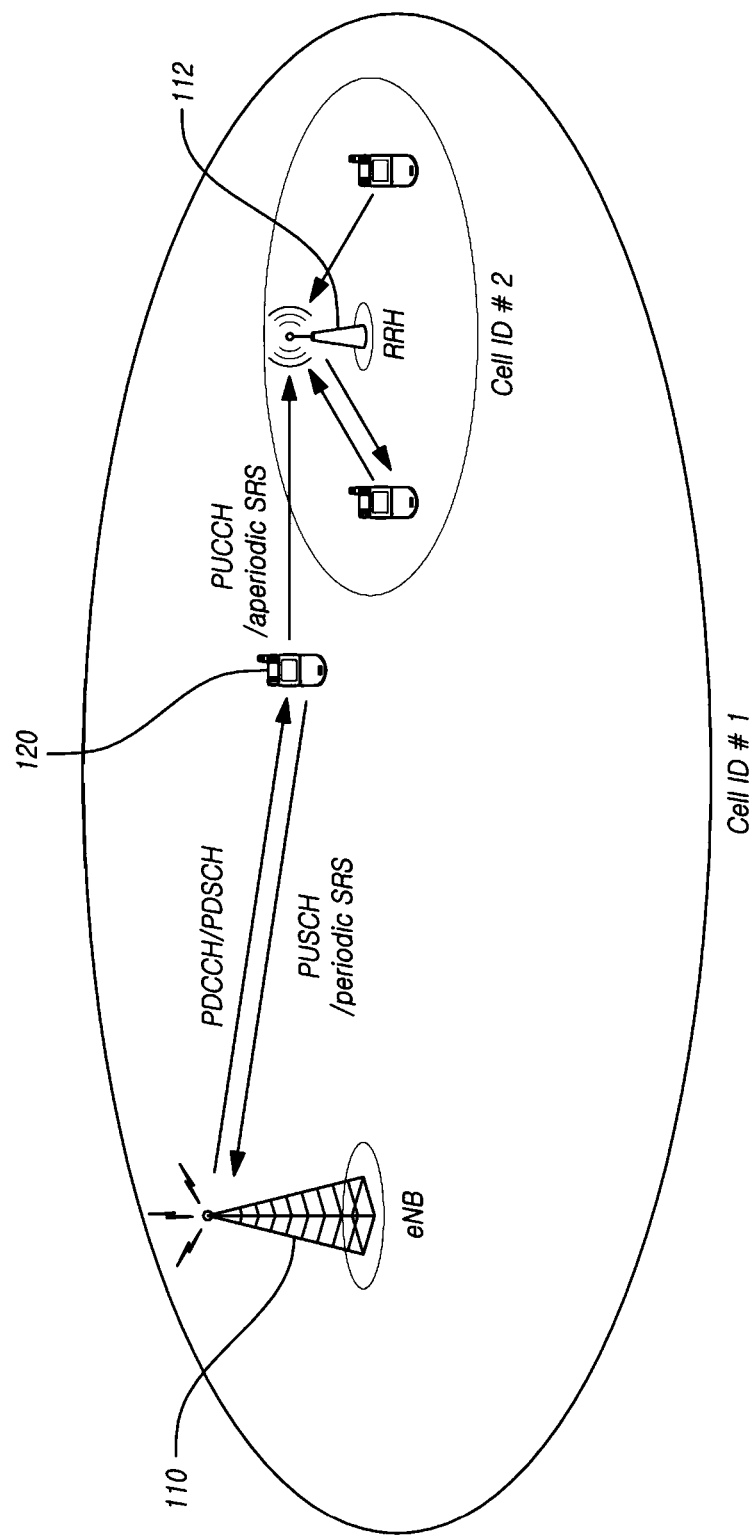
FIG. 29 illustrates transmitting an aperiodic SRS in association with PUCCH, in a CoMP environment in which transmission/reception points use different cell identities (e.g., cell ID #1 and cell ID #2)

FIG. 29 illustrates transmitting an aperiodic SRS in association with PUCCH, in a CoMP environment in which transmission/reception points use different cell identities (e.g., cell ID #1 and cell ID #2).

Figure 30:
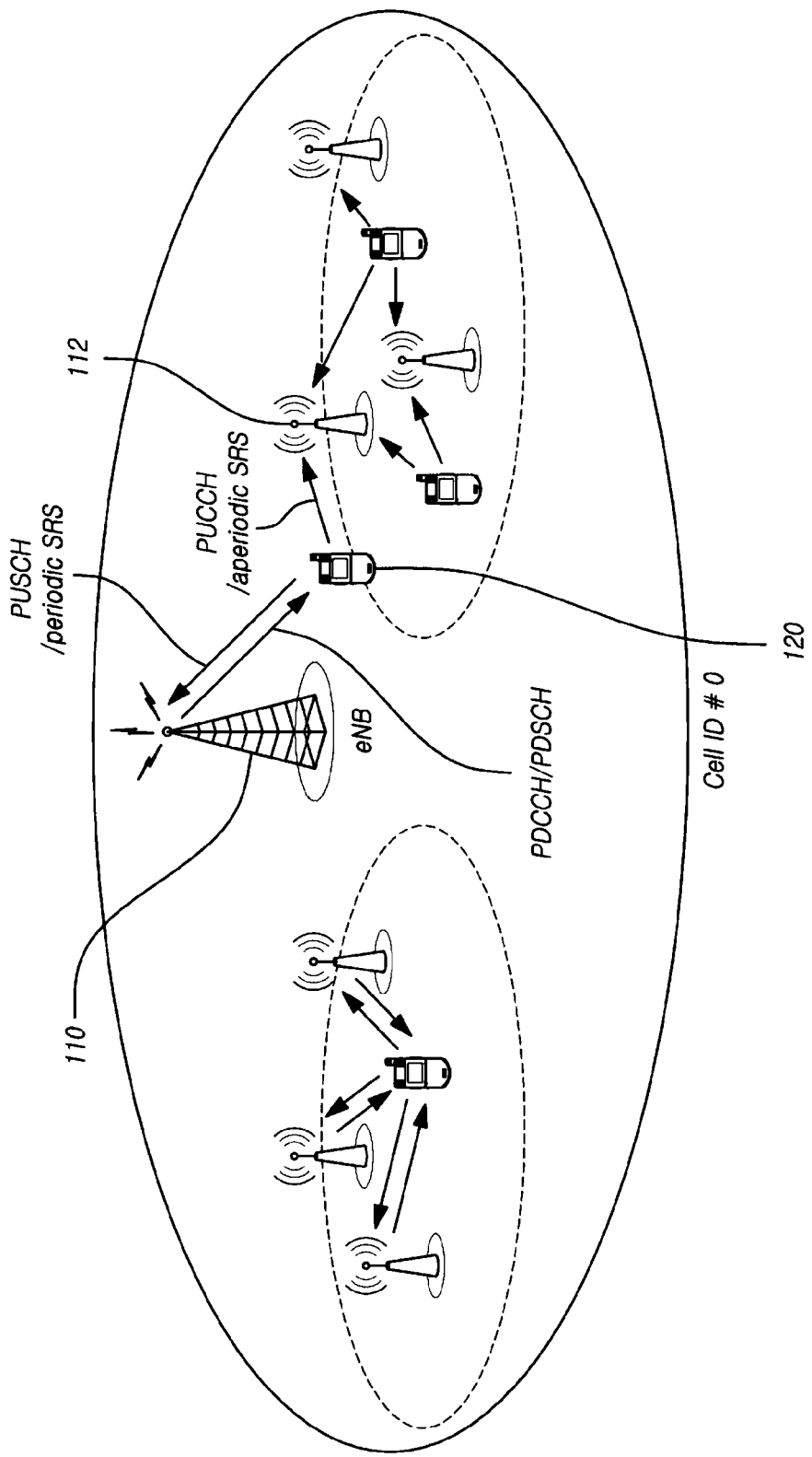
FIG. 30 illustrates transmitting an aperiodic SRS in association with PUCCH, in a CoMP environment in which transmission/reception points use the same cell identity (e.g., cell ID #0)

FIG. 30 illustrates transmitting an aperiodic SRS in association with PUCCH, in a CoMP environment in which transmission/reception points use the same cell identity (e.g., cell ID #0).

Referring to FIG. 29 and FIG. 30, PDCCH and PDSCH may be received from a serving transmission/reception point (e.g., eNB 110) to which user equipment 120 belongs. PUSCH and a periodic SRS may be transmitted to the serving transmission/reception point (e.g., eNB 110) to which user equipment 120 belongs. PUCCH and an aperiodic SRS may be transmitted to a transmission/reception point (e.g., RRH 112) different from the serving transmission/reception point (e.g., eNB 110) to which user equipment 120 belongs. Herein, the PUCCH corresponding to one of uplink channels may transmit ACK/NACK corresponding to a response to a downlink transmission, channel state information, and so forth.

According to an uplink reference signal transmission method described with reference to FIG. 23, and Embodiment 3 related to an SRS transmission described with reference to FIG. 24 to FIG. 30, UE-specific configuration information received by user equipment may include reference signal identities $n_{ID}^{RS}$ and $n_{ID}^{RS'}$. Herein, the reference signal identity $n_{ID}^{RS}$ may be used to determine a UE-specific PUCCH and a UE-specific reference signal identity associated with PUCCH. The reference signal identity $n_{ID}^{RS'}$ may be used to determine a UE-specific PUSCH and a UE-specific reference signal identity associated with PUSCH. In this case, the reference signal identity $n_{ID}^{RS}$ associated with the PUCCH and the reference signal identity $n_{ID}^{RS'}$ associated with the PUSCH may be different from or the same as a cell-specific parameter indicating a cell ID ($N_{ID}^{cell}$) of a cell to which user equipment 120 belongs. A receiving subject of a physical uplink channel (e.g., PUCCH or PUSCH) may be determined as a transmission/reception point different from a serving transmission/reception point (e.g., eNB 110) serving user equipment 120, by independently defining a reference signal identity for PUCCH/PUSCH generation. In the case that a reference signal identity associated with the PUCCH is $n_{ID}^{RS}$, an SRS identity may be identically defined as $n_{ID}^{RS}$. Accordingly, when generating an SRS, $n_{ID}^{RS}$ may be used in place of a serving cell ID $N_{ID}^{cell}$. That is, in Formula 1 to Formula 6 used in an SRS sequence generation procedure, an SRS may be generated using the reference signal identity $n_{ID}^{RS}$ associated with the PUCCH. The generated SRS may be transmitted to a transmission/reception point (e.g., RRH 112) indicated by the used reference signal identity. In addition, $n_{ID}^{RS}$ may not necessarily indicate a transmission/reception point (e.g., RRH 112) different from a serving transmission/reception point, and may indicate the serving transmission/reception point (e.g., eNB 110).

Furthermore, in FIG. 24, an SRS may be at least one of a periodic SRS and an aperiodic SRS. Accordingly, only the aperiodic SRS may be transmitted in association with PUCCH, as described with reference to FIG. 29 and FIG. 30.

Receiving subjects may be different according to whether an SRS to be transmitted is a periodic SRS or an aperiodic SRS. For example, the periodic SRS may be transmitted to a serving transmission/reception point serving user equipment 120. The aperiodic SRS may be defined according to a sequence configuration used for PUCCH. Accordingly, the PUCCH and the aperiodic SRS may be transmitted to the same target transmission/reception point.

In other words, the aperiodic SRS may be generated using the reference signal identity $n_{ID}^{RS}$ associated with PUCCH, in Formula 1 to Formula 6. The generated aperiodic SRS may be transmitted to a transmission/reception point (e.g., RRH 112) indicated by the reference signal identity $n_{ID}^{RS}$ associated with the PUCCH. Meanwhile, the periodic SRS may be generated using a cell ID ($N_{ID}^{cell}$) of a serving transmission/reception point (e.g., eNB 110) in Formula 1 to Formula 6. The periodic SRS may be transmitted to the serving transmission/reception point.

On the contrary, even though it is not shown in figures, an aperiodic SRS may be transmitted to a serving transmission/reception point serving user equipment 120. A periodic SRS may be defined according to a sequence configuration used for PUCCH. Accordingly, the PUCCH and the periodic SRS may be transmitted to the same target transmission/reception point.

In an SRS transmission method according to Embodiment 3, an SRS transmission associated with PUCCH may make it to estimate an uplink channel state of a transmission/reception points different from a serving transmission/reception point. Accordingly, overcoming a shortage of uplink coverage may be possible.

Further, a TDD system may independently measure downlink channel quality of a serving transmission/reception point and a downlink channel quality of a different transmission/reception point (i.e., a transmission/reception points different from a serving transmission/reception point). Herein, the TDD system may use an uplink channel quality measurement and a channel reciprocity for the serving transmission/reception point and the different transmission/reception point. Furthermore, the SRS transmission method may make it possible to recognize a location or a geometry of user equipment, using an SRS. Accordingly, in the case that user equipment is located on edge of a cell or at the center of the cell, it may be possible to improve data throughput for a downlink by using a UE-specific downlink transmission method.

In at least one embodiment, only an aperiodic SRS may be transmitted in association with PUCCH. In such embodiment, an aperiodic SRS transmission triggered by a base station may make it to estimate an uplink channel state of a transmission/reception point different from a serving transmission/reception point. Accordingly, overcoming a shortage of uplink coverage may be possible.

Embodiment 4: Association with PUSCH

Embodiment 4 may represent a case in which at least a portion of an SRS is transmitted in association with PUSCH. Hereinafter, Embodiment 4 will be described with reference to FIG. 31 to FIG. 35.

Figure 31:
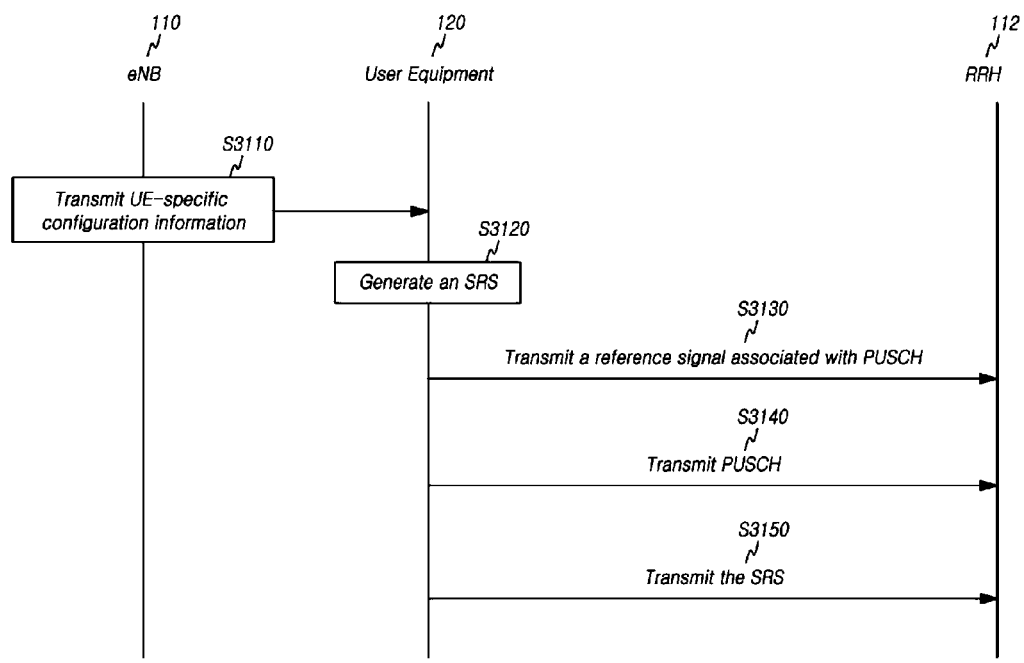
FIG. 31 is a flowchart illustrating a method of transmitting an SRS associated with PUSCH in accordance with Embodiment 2 of the present invention.

FIG. 31 is a flowchart illustrating a method of transmitting a sounding reference signal (SRS) associated with PUSCH in accordance with at least one embodiment.

Such as shown in FIG. 24, in an SRS transmission method described in FIG. 31, an SRS may be transmitted in association with an uplink reference signal. Accordingly, the flowchart shown in FIG. 31 may include a transmission procedure transmitting an uplink reference signal and a physical uplink channel associated with the uplink reference signal as shown in FIG. 23.

Referring to FIG. 31, at step S3110 in an SRS transmission method according to at least one embodiment, user equipment 120 may receive UE-specific configuration information indicating an uplink reference signal identity from one transmission/reception point (e.g., eNB 110) of a plurality of different transmission/reception points. Herein, the uplink reference signal identity may be independent of a physical cell identity of the one transmission/reception point (e.g., eNB 110) and be associated with PUSCH. At step S3120, user equipment 120 may generate at least a portion of an SRS, using the uplink reference signal identity. At step S3130, user equipment 120 may transmit a reference signal associated with the PUSCH, to a transmission/reception point (e.g., RRH 112) indicated by the uplink reference signal identity. At step S3140, user equipment 120 may transmit the PUSCH to the transmission/reception point (e.g., RRH 112) indicated by the uplink reference signal identity. At step S3150, user equipment 120 may transmit the generated SRS to the transmission/reception point (e.g., RRH 112) indicated by the uplink reference signal identity.

In FIG. 31, steps S3130 and S3140 may be simultaneously performed. The SRS and the PUSCH may be transmitted together in one subframe. Alternatively, the SRS, the PUSCH, and PUCCH may be simultaneously transmitted in one subframe.

According to Embodiment 4, a reception point of PUSCH may be determined as a transmission/reception point different from a serving transmission/reception to which user equipment belongs. That is, a PUSCH transmission to the different transmission/reception points may performed by defining a UE-specific PUSCH sequence and a UE-specific reference signal sequence associated with the PUSCH when PUSCH sequence and a reference signal sequence associated with the PUSCH sequence are generated. In this case, a periodic SRS or an aperiodic SRS may be defined according to a sequence configuration used for the PUSCH and a reference signal associated with the PUSCH. Accordingly, the PUSCH and an SRS may be transmitted to the same target transmission/reception point through an uplink.

In this case, receiving subjects of PUSCH may be the same as receiving subjects of periodic and/or aperiodic SRSs. In the case that receiving subjects of the PUSCH and PUCCH are the same, embodiments of an SRS transmission described with reference to FIG. 25 and FIG. 26 among descriptions of Embodiment 1 may be applied to Embodiment 4.

FIG. 32 to FIG. 35 illustrate a variety of embodiments transmitting an SRS associated with PUSCH, according to SRS transmission methods shown in FIG. 25, FIG. 26, and FIG. 31.

Figure 32:
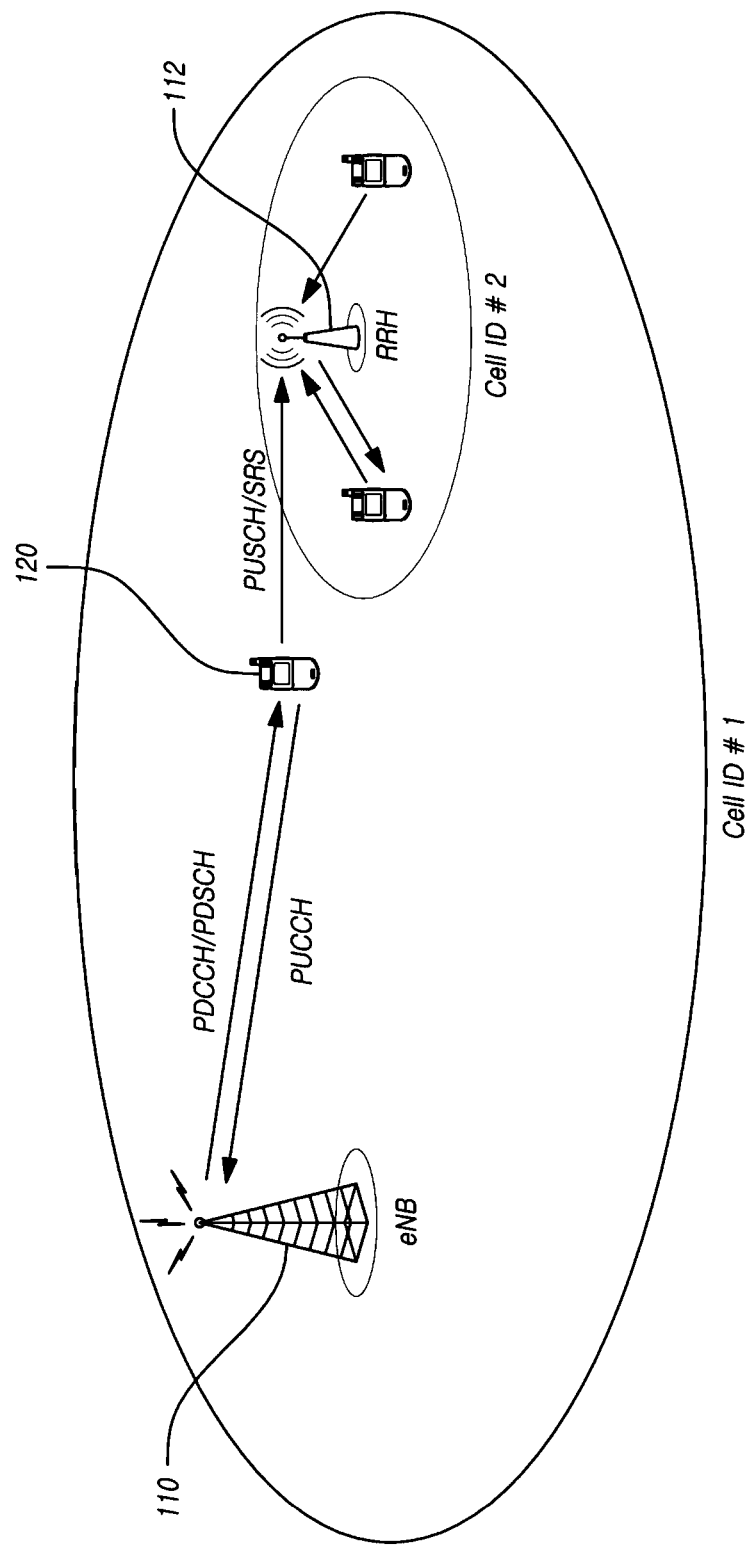
FIG. 32 illustrates transmitting an SRS in association with PUSCH, in a CoMP environment in which transmission/reception points use different cell identities (e.g., cell ID #1 and cell ID #2)

FIG. 32 illustrates transmitting an SRS in association with PUSCH, in a CoMP environment in which transmission/reception points use different cell identities (e.g., cell ID #1 and cell ID #2).

Figure 33:
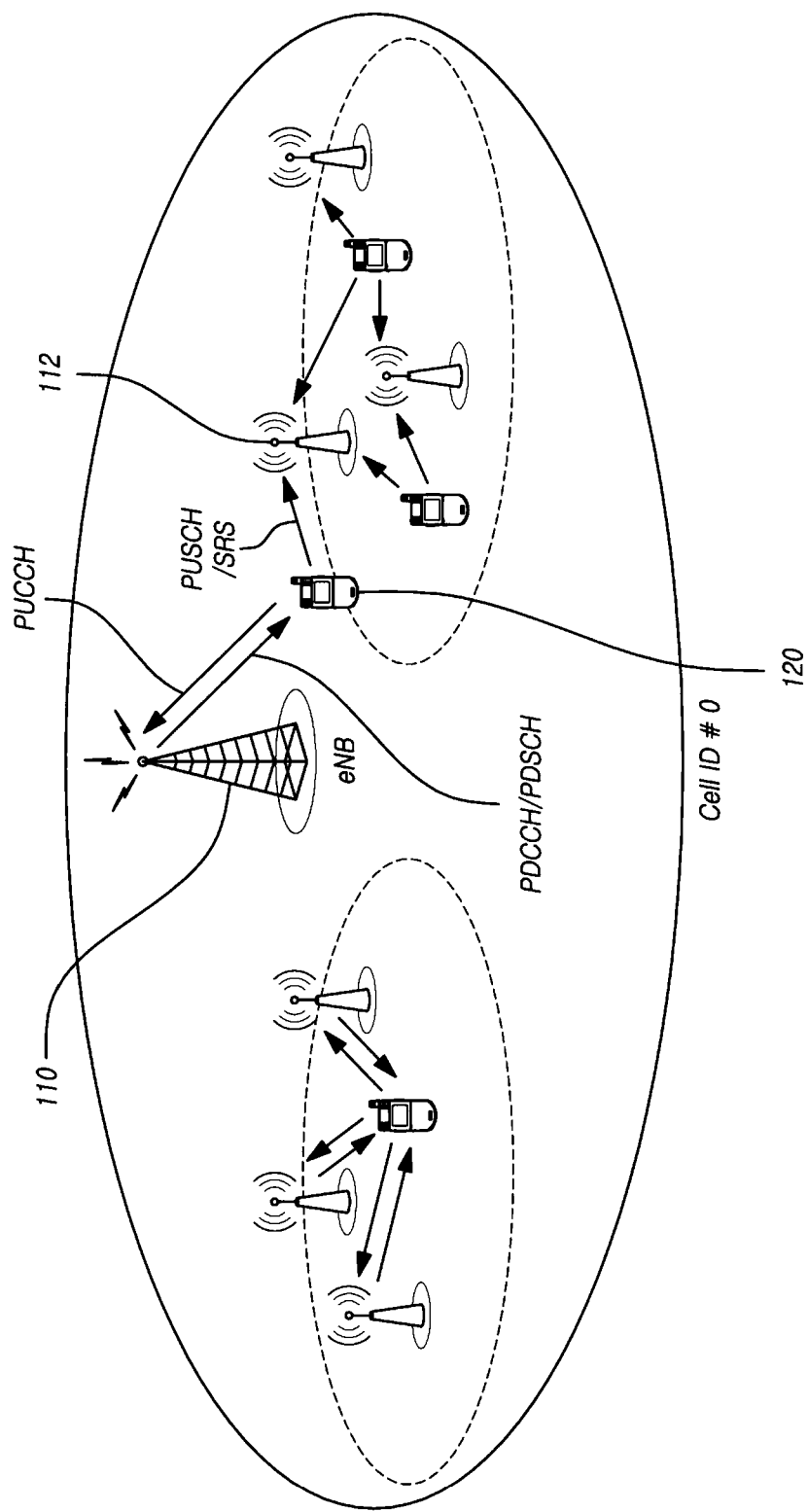
FIG. 33 illustrates transmitting an SRS in association with PUSCH, in a CoMP environment in which transmission/reception points use the same cell identity (e.g., cell ID #0)

FIG. 33 illustrates transmitting an SRS in association with PUSCH, in a CoMP environment in which transmission/reception points use the same cell identity (e.g., cell ID #0).

Referring to FIG. 32 and FIG. 33, PDCCH and PDSCH may be received from a serving transmission/reception point (e.g., eNB 110) to which user equipment 120 belongs. PUCCH corresponding to one of the uplink channels may be transmitted to the serving transmission/reception point (e.g., eNB 110) to which user equipment 120 belongs. Herein, the PUCCH may transmit ACK/NACK corresponding to a response to a downlink transmission, channel state information, and so forth. PUSCH and an SRS may be transmitted to a transmission/reception point (e.g., RRH 112) different from the serving transmission/reception point (e.g., eNB 110) to which user equipment 120 belongs.

Figure 34:
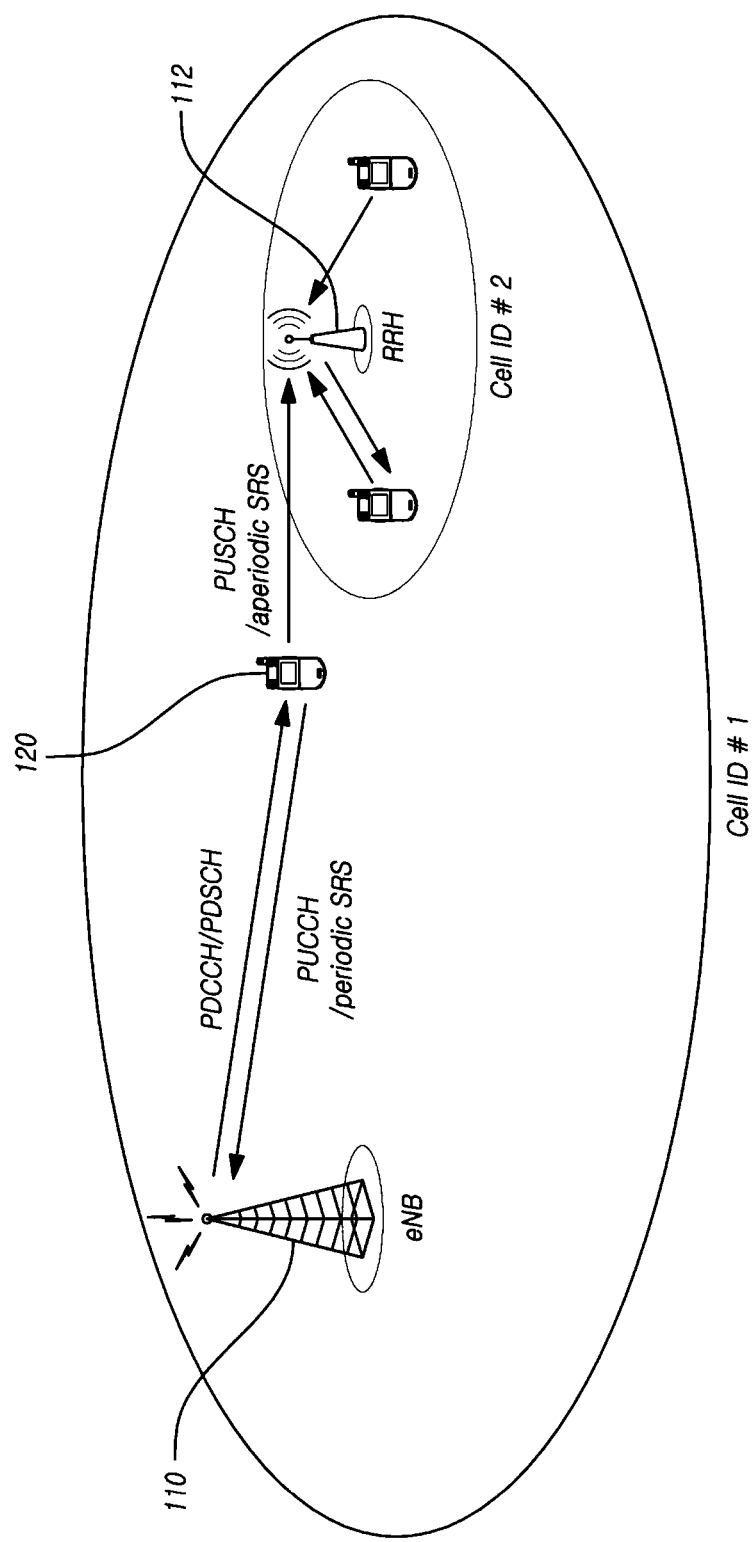
FIG. 34 illustrates transmitting an aperiodic SRS in association with PUSCH, in a CoMP environment in which transmission/reception points use different cell identities (e.g., cell ID #1 and cell ID #2)

FIG. 34 illustrates transmitting an aperiodic SRS in association with PUSCH, in a CoMP environment in which transmission/reception points use different cell identities (e.g., cell ID #1 and cell ID #2).

Figure 35:
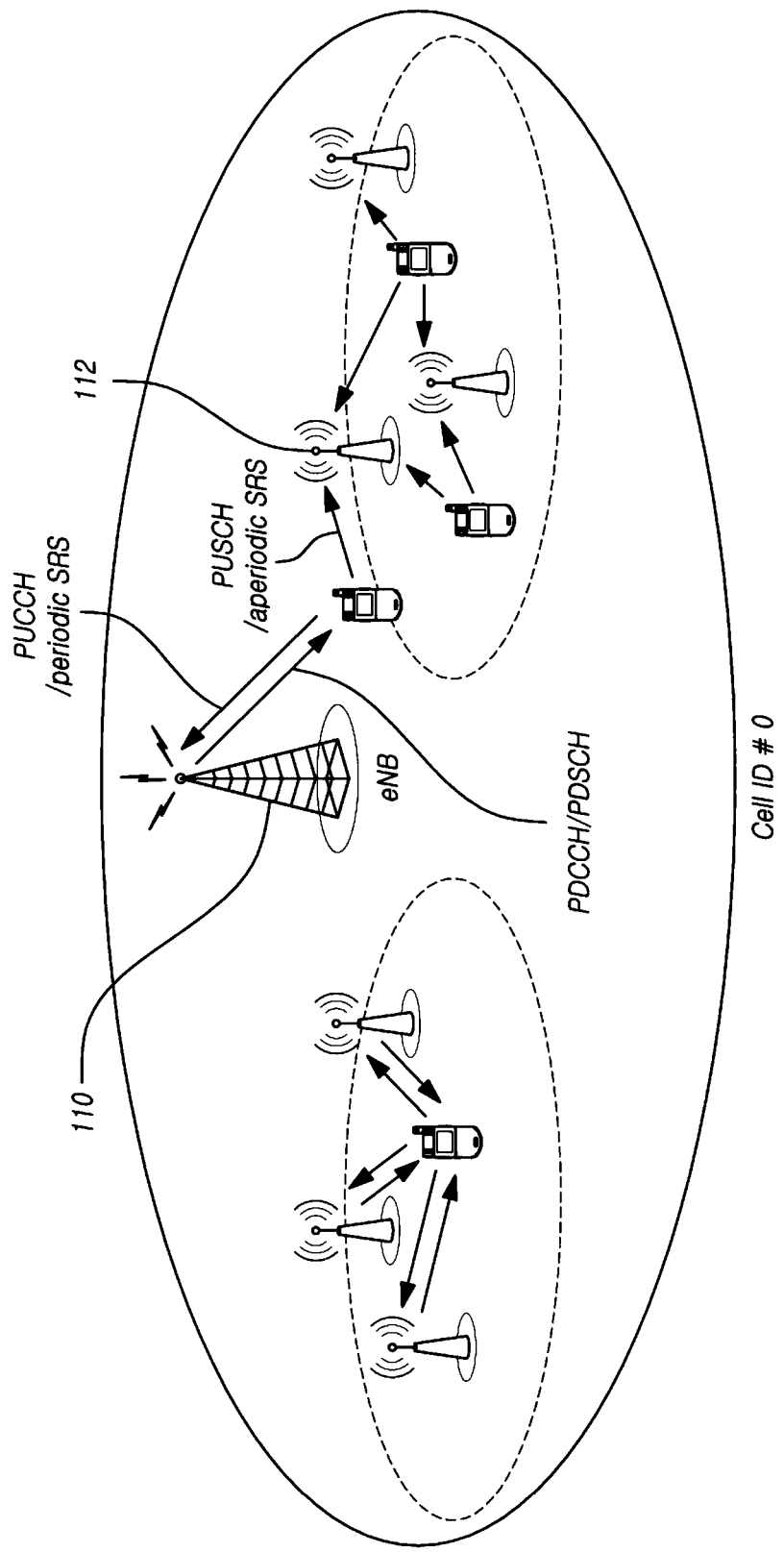
FIG. 35 illustrates transmitting an aperiodic SRS in association with PUSCH, in a CoMP environment in which transmission/reception points use the same cell identity (e.g., cell ID #0)

FIG. 35 illustrates transmitting an aperiodic SRS in association with PUSCH, in a CoMP environment in which transmission/reception points use the same cell identity (e.g., cell ID #0).

Referring to FIG. 34 and FIG. 35, PDCCH and PDSCH may be received from a serving transmission/reception point (e.g., eNB 110) to which user equipment 120 belongs. PUCCH and a periodic SRS may be transmitted to the serving transmission/reception point (e.g., eNB 110) to which user equipment 120 belongs. Herein, the PUCCH corresponding to one of uplink channels may transmit ACK/NACK corresponding to a response to a downlink transmission, channel state information, and so forth. PUSCH and an aperiodic SRS may be transmitted to a transmission/reception point (e.g., RRH 112) different from the serving transmission/reception point (e.g., eNB 110) to which user equipment 120 belongs.

According to Embodiment 4 described with reference to FIG. 31 to FIG. 35, in the case that a reference signal identity associated with PUSCH is $n_{ID}^{RS'}$, an SRS identity may be identically defined as $n_{ID}^{RS'}$. Accordingly, when generating an SRS, $n_{ID}^{RS'}$ may be used in place of a serving cell ID $N_{ID}^{cell}$. That is, in Formula 1 to Formula 6 used in an SRS sequence generation procedure, an SRS may be generated using the reference signal identity $n_{ID}^{RS'}$ associated with the PUSCH. The generated SRS may be transmitted to a transmission/reception point (e.g., RRH 112) indicated by the used reference signal identity $n_{ID}^{RS'}$. In addition, $n_{ID}^{RS'}$ may not necessarily indicate a transmission/reception point (e.g., RRH 112) different from a serving transmission/reception point, and may indicate the serving transmission/reception point (e.g., eNB 110).

Furthermore, in FIG. 31, an SRS may be at least one of a periodic SRS and an aperiodic SRS. Accordingly, only the aperiodic SRS may be transmitted in association with PUSCH, as described with reference to FIG. 34 and FIG. 35.

Receiving subjects may be different according to whether an SRS to be transmitted is a periodic SRS or an aperiodic SRS. For example, the periodic SRS may be transmitted to a serving transmission/reception point serving user equipment 120. The aperiodic SRS may be defined according to a sequence configuration used for PUSCH. Accordingly, the PUSCH and the aperiodic SRS may be transmitted to the same target transmission/reception point through an uplink.

In other words, an aperiodic SRS may be generated using the reference signal identity $n_{ID}^{RS'}$ associated with PUSCH, in Formula 1 to Formula 6. The generated aperiodic SRS may be transmitted to a transmission/reception point (e.g., RRH 112) indicated by the reference signal identity $n_{ID}^{RS'}$ associated with the PUSCH. Meanwhile, a periodic SRS may be generated using a cell ID ($N_{ID}^{cell}$) of a serving transmission/reception point (e.g., eNB 110) in Formula 1 to Formula 6. The periodic SRS may be transmitted to the serving transmission/reception point.

Alternatively, although not shown in figures, an aperiodic SRS may be transmitted to a serving transmission/reception point serving user equipment 120. A periodic SRS may be defined according to a sequence configuration used for PUSCH. Accordingly, the PUSCH and the periodic SRS may be transmitted to the same target transmission/reception point through an uplink.

In an SRS transmission method according to Embodiment 4, an SRS transmission associated with PUSCH may allow for estimation of an uplink channel state of a transmission/reception point different from a serving transmission/reception point. Accordingly, overcoming a shortage of uplink coverage may be possible.

Further, a TDD system may independently measure a downlink channel quality of a serving transmission/reception point and a downlink channel quality of a different transmission/reception point (i.e., a transmission/reception point different from the serving transmission/reception point). Herein, the TDD system may use an uplink channel quality measurement and a channel reciprocity for the serving transmission/reception point and the different transmission/reception point. Furthermore, the SRS transmission method may make it possible to recognize a location or a geometry of user equipment, using an SRS. Accordingly, in the case that user equipment is located on edge of a cell or at the center of the cell, it may be possible to improve data throughput for a downlink by using a UE-specific downlink transmission method.

In at least one embodiment, only an aperiodic SRS may be transmitted in association with PUSCH. In such embodiment, an aperiodic SRS transmission triggered by a base station may allow for estimation of a channel state of uplink associated with a transmission/reception points other than a serving transmission/reception point. Accordingly, overcoming a shortage of uplink coverage may be possible.

Figure 36:
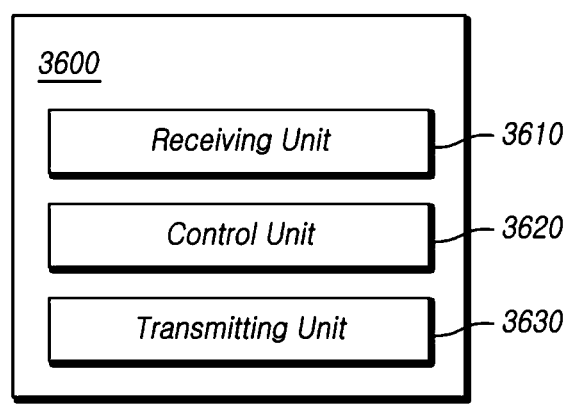
FIG. 36 illustrates user equipment in accordance with at least one embodiment.

FIG. 36 illustrates user equipment in accordance with at least one embodiment.

Referring to FIG. 36, user equipment 3600 may include receiving unit 3610, control unit 3620, and transmitting unit 3630 in accordance with at least one embodiment. Receiving unit 3610 may receive UE-specific configuration information indicating an SRS identity from one transmission/reception point of a plurality of different transmission/reception points. Herein, the SRS identity may be independently distinguished from an uplink reference signal identity for a physical uplink channel. Control unit 3620 may generate an SRS using the uplink reference signal identity. Transmitting unit 3630 may transmit the generated SRS to a transmission/reception point indicated by the SRS identity.

As shown in FIG. 36, user equipment 3600 in accordance with at least one embodiment may transmit an SRS independently from the physical uplink channel according to an SRS transmission method described in FIG. 4.

Figure 37:
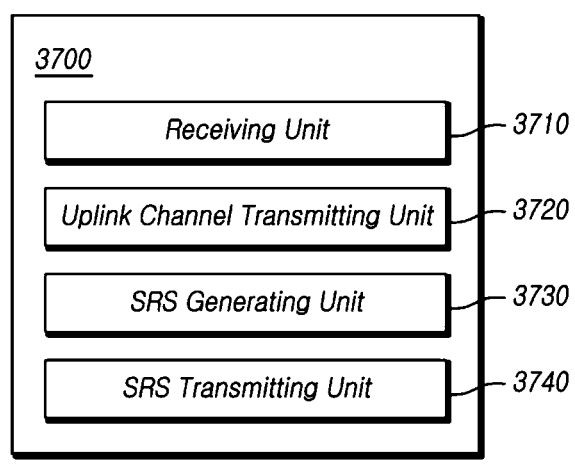
FIG. 37 illustrates user equipment in accordance with other embodiments of the present invention.

FIG. 37 illustrates user equipment in accordance with other embodiments of the present invention.

Referring to FIG. 37, user equipment 3700 may include receiving unit 3710, uplink channel transmission unit 3720, SRS generating unit 3730, and transmitting unit 3740 in accordance with at least one embodiment. Receiving unit 3710 may receive UE-specific configuration information indicating an uplink reference signal identity from one transmission/reception point of a plurality of different transmission/reception points. Herein, the uplink reference signal identity is independent of a physical cell identity of the one transmission/reception point and is associated with an uplink channel. Uplink channel transmission unit 3720 may transmit an uplink channel to a transmission/reception point indicated by the uplink reference signal identity, using the uplink reference signal identity. SRS generating unit 3730 may generate an SRS using a physical cell identity of the one transmission/reception point. SRS transmitting unit 3740 may transmit the generated SRS to the one transmission/reception point.

Herein, uplink channel transmission unit 3720 and transmitting unit 3740 may be implemented with the same hardware resource or different hardware resources.

Referring to FIG. 37, user equipment in accordance with at least one embodiment may transmit an SRS separately or independently from a physical uplink channel, to a serving transmission/reception point, according to an SRS transmission method described in FIG. 11.

Figure 38:
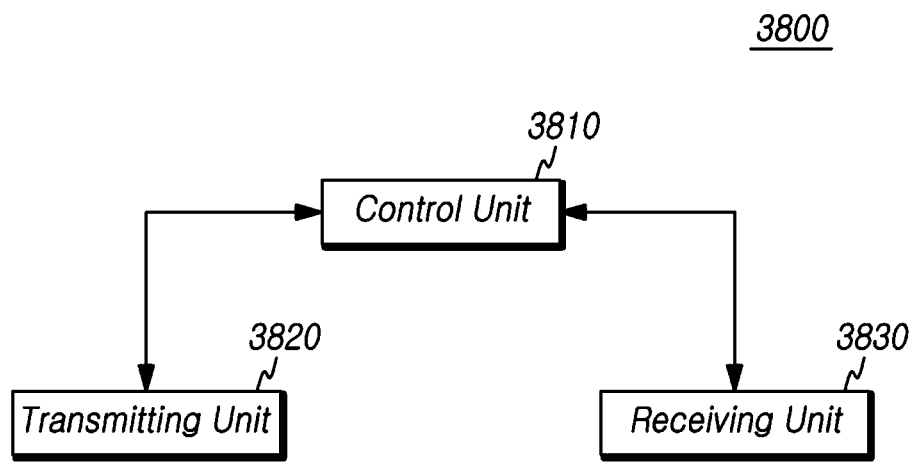
FIG. 38 illustrates a base station (BS) in accordance with at least one embodiment.

FIG. 38 illustrates a base station (BS) in accordance with at least one embodiment.

Referring to FIG. 38, a base station (BS) 3800 may control unit 3810, transmitting unit 3820, and receiving unit 3830 in accordance with at least one embodiment.

Control unit 3810 may control operations of base station 3800, according to a CoMP operation and an uplink reference signal transmission required for performing the present invention.

Transmitting unit 3820 and receiving unit 3830 may transmit or receive signals, messages, and/or data required for performing the present invention, in connection with user equipment.

Although contents of technical standards referred to in the above-described embodiments is omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the attached documents below may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of transmitting an uplink sounding reference signal (SRS) in user equipment (UE) in a coordinated multi-point transmission/reception system (CoMP system), the method comprising:
   receiving, by the user equipment, UE-specific configuration information including an uplink reference signal identity associated with an uplink channel, from a first transmission/reception point of a plurality of different transmission/reception points, wherein the uplink reference signal identity is independent of a physical cell identity of the first transmission/reception point and indicates a second transmission/reception point as a reception entity of the uplink channel; and
   performing, by the user equipment, an independent transmission of the uplink channel and an SRS to different transmission/reception points, using the uplink reference signal identity or the physical cell identity according to a type of an uplink transmission,
   wherein when the type of the uplink transmission is an uplink channel transmission,
   the performing includes:
      obtaining the uplink reference signal identity from the received UE-specific configuration information;
      determining the second transmission/reception point indicated by the uplink reference signal identity, as an uplink channel reception entity, wherein the second transmission/reception point is different from the first transmission/reception point; and
      transmitting, by the user equipment, the uplink channel to the determined second transmission/reception point, using the uplink reference signal identity;
   wherein when the type of the uplink transmission is an SRS transmission,
   the performing includes:
      generating, by the user equipment, an SRS independent of the uplink channel, using the physical cell identity of the first transmission/reception point;
      determining the first transmission/reception point which has transmitted the UE-specific configuration information to the user equipment, as an SRS reception entity; and
      transmitting, by the user equipment, the generated SRS to the determined first transmission/reception point;
   wherein:
   the SRS includes at least one of a periodic SRS and an aperiodic SRS,
   the generating an SRS includes generating both the periodic SRS and the aperiodic SRS using the physical cell identity of the first transmission/reception point, and
   the transmitting the generated SRS includes transmitting one of the periodic SRS and the aperiodic SRS to the first transmission/reception point indicated by the physical cell identity;
   wherein the uplink channel is at least one of a physical uplink shared channel and a physical uplink control channel; and
   wherein the receiving UE-specific configuration information includes receiving, from the first transmission/reception point, the UE-specific configuration information including the uplink reference signal identity, either through a UE-specific parameter, or dynamically through at least one of a physical downlink control channel (PDCCH) and an enhanced physical downlink control channel (EPDCCH).

2. The method of claim 1, wherein:
   the generating an SRS includes generating one of the periodic SRS and the aperiodic SRS using the physical cell identity of the first transmission/reception point, and the other SRS using the uplink reference signal identity; and
   the transmitting the generated SRS includes transmitting one of the periodic SRS and the aperiodic SRS to the first transmission/reception point, and the other SRS to the second transmission/reception point indicated by the uplink reference signal identity.

3. User equipment in a coordinated multi-point transmission/reception system (CoMP system), the user equipment comprising:
   a receiver configured to receive UE-specific configuration information including an uplink reference signal identity associated with an uplink channel, from a first transmission/reception point of a plurality of different transmission/reception points, wherein the uplink reference signal identity is independent of a physical cell identity of the first transmission/reception point and indicates a second transmission/reception point as a reception entity of the uplink channel; and a transmitter configured to perform an independent transmission of the uplink channel and a sounding reference signal (SRS) to different transmission/reception points, using the uplink reference signal identity or the physical cell identity according to whether a type of an uplink transmission is an uplink channel transmission or an SRS transmission, wherein the transmitter includes:
an uplink channel transmission unit configured to obtain the uplink reference signal identity from the received UE-specific configuration information; to determine the second transmission/reception point indicated by the uplink reference signal identity, as an uplink channel reception entity; and to transmit the uplink channel to the determined second transmission/reception point, using the uplink reference signal identity, wherein the second transmission/reception point is different from the first transmission/reception point;
an SRS generating unit configured to generate an SRS being independent of the uplink channel, using the physical cell identity of the first transmission/reception point; and
an SRS transmitting unit configured to determine the first transmission/reception point which has transmitted the UE-specific configuration information to the user equipment, as an SRS reception entity, and to transmit the generated SRS to the determined first transmission/reception point;

wherein:
the SRS includes at least one of a periodic SRS and an aperiodic SRS,
the SRS generating unit is configured to generate both the periodic SRS and the aperiodic SRS using the physical cell identity of the first transmission/reception point, and
the SRS transmitting unit is configured to transmit one of the periodic SRS and the aperiodic SRS to the first transmission/reception point indicated by the physical cell identity;
wherein the uplink channel is at least one of a physical uplink shared channel and a physical uplink control channel; and
wherein the receiver is configured to receive, from the first transmission/reception point, the UE-specific configuration information including the uplink reference signal identity, either through a UE-specific parameter, or dynamically through at least one of a physical downlink control channel (PDCCH) and an enhanced physical downlink control channel (EPDCCH).

4. The user equipment of claim 3, wherein:
the SRS generating unit is configured to generate one of the periodic SRS and the aperiodic SRS using the physical cell identity of the first transmission/reception point, and to generate the other SRS using the uplink reference signal identity; and
the SRS transmitting unit is configured to transmit one of the periodic SRS and the aperiodic SRS to the first transmission/reception point, and to transmit the other SRS to the second transmission/reception point indicated by the uplink reference signal identity.

5. A method of transmitting an uplink sounding reference signal (SRS) in user equipment (UE) in a coordinated multi-point transmission/reception system (CoMP system), the method comprising:

receiving, by the user equipment, UE-specific configuration information including a sounding reference signal (SRS) identity from a first transmission/reception point of a plurality of different transmission/reception points, wherein the SRS identity is independently determined to be distinguished from an uplink reference signal identity for an uplink channel and indicates a second transmission/reception point as a reception entity of an SRS; and
performing, by the user equipment, an independent transmission of the uplink channel and the SRS to different transmission/reception points, using the uplink reference signal identity or the SRS identity according to a type of an uplink transmission,
wherein when the type of the uplink transmission is an SRS transmission,
the performing includes:
obtaining, by the user equipment, the SRS identity from the received UE-specific configuration information;
generating, by the user equipment, an SRS using the SRS identity;
determining the second transmission/reception point UE-specifically indicated by the SRS identity, as an SRS reception entity, wherein the second transmission/reception point is different from the first transmission/reception point which has transmitted the UE-specific configuration information to the user equipment; and
transmitting, by the user equipment, the generated SRS to the determined second transmission/reception point;
wherein the SRS includes at least one of a periodic SRS and an aperiodic SRS;
wherein the generating an SRS includes generating both the periodic SRS and the aperiodic SRS using the SRS identity; and
wherein the receiving UE-specific configuration information includes receiving, from the first transmission/reception point, the UE-specific configuration information including the SRS identity, either through a UE-specific parameter, or dynamically through at least one of a physical downlink control channel (PDCCH) and an enhanced physical downlink control channel (EPDCCH).

6. The method of claim 5, wherein:
the UE-specific configuration information includes a same reference signal identity for the periodic SRS and the aperiodic SRS.

7. The method of claim 5, wherein:
the UE-specific configuration information includes a different reference signal identity for each of the periodic SRS and the aperiodic SRS.

8. The method of claim 5, wherein:
the generating an SRS includes generating one of the periodic SRS and the aperiodic SRS using the SRS identity, and the other SRS using a physical cell identity of the first transmission/reception point; and
the transmitting the generated SRS includes transmitting one of the periodic SRS and the aperiodic SRS to the second transmission/reception point indicated by the SRS identity, and the other SRS to the first transmission/reception point.

* * * * *